(12) United States Patent
Averbuch et al.

(10) Patent No.: US 7,548,588 B2
(45) Date of Patent: Jun. 16, 2009

(54) METHOD OF TRANSMITTING DATA USING SPACE TIME BLOCK CODES

(75) Inventors: Amir Averbuch, Tel Aviv (IL); Shmuel Rosset, Kfar Saba (IL); Yossi Zlotnick, Haifa (IL); Yossi Abarbanel, Holon (IL); Yaniv Shmueli, Kiryat Ono (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 742 days.

(21) Appl. No.: 10/518,766

(22) PCT Filed: Aug. 18, 2004

(86) PCT No.: PCT/IL2004/000758

§ 371 (c)(1),
(2), (4) Date: Jul. 6, 2005

(87) PCT Pub. No.: WO2005/074163

PCT Pub. Date: Aug. 11, 2005

(65) Prior Publication Data

US 2008/0063110 A1 Mar. 13, 2008

(51) Int. Cl.
*H04B 7/02* (2006.01)
*H04L 1/02* (2006.01)

(52) U.S. Cl. .................. 375/267; 375/295; 375/299; 375/347; 370/334

(58) Field of Classification Search .............. 375/260, 375/266, 295, 299; 370/310, 377
See application file for complete search history.

(56) References Cited

U.S. PATENT DOCUMENTS 6,185,258 B1 2/2001 Alamouti
6,801,579 B1 * 10/2004 Hassibi et al. .............. 375/264

OTHER PUBLICATIONS

Hassibi et al. "Representation Theory for High-Rate Multiple-Antenna Code Design", Mar. 2000.*
"Noncommutative Rings" Herstein. The Carus Mathematical Monographs, No. Fifteen.
"A Simple Transmit Deversity Technique For Wireless Communications" Alamouti; IEEE Journal on Select Areas In Communications vol. 16 No. 8 Oct. 1998.
"A Differential Detection Scheme for Transmit Deversity" Tarokh; IEEE Journal on Select Areas In Communications vol. 18 No. 7 Jul. 2000.
"Space-Time codes for High Data Rate Wireless Communication: Performance Criterion and Code Construction" Tarokh et al; IEEE Transactions on Information Theory vol. 44 No. 2 Jul. 1998.
"Space Time Block codes from orthogonal designs" Tarokh et al; IEEE Trans Info theory vol. 45, No. 5 pp. 1456-1467, Jul. 1999.

(Continued)

*Primary Examiner*—Mohammad Ghayour
*Assistant Examiner*—Sophia Vlahos
(74) *Attorney, Agent, or Firm*—Mark M. Friedman

(57) ABSTRACT

To transmit data, a set of at least $2^m$ n×n matrices that represent an extension of a fixed-point-free group is provided. To each of $2^m$ of the matrices is allocated one of the binary numbers from 0 to $2^m-1$. The data are mapped into the matrices according to the allocation. The mapped matrices are transmitted, preferably using n antennas, one antenna per row of each matrix.

12 Claims, 13 Drawing Sheets

OTHER PUBLICATIONS

Hochwald et al; "Unitary Space Time modulation for Multiple Antenna Communications in Rayleight Flat Fading" IEEE Transactions on Information Theory, Mar. 2000.

Hochwald et al ; "Differential Unitary space time modulation" IEEE Trans. Comm. vol. 48, pp. 2041-2052 Dec. 2000.

Shokrollahi et al; Representation theory for high rate multiple antenna code design IEEE Trans. Inform Theory , vol. 47, No. 6 pp. 2335-2367 Sep. 2001.

Hughes; "Differential space-time modulation" IEEE trans inform. Theory vol. 46 pp. 2567-2578 Nov. 2000.

Han et al; "Unitary constellations with large diversity sum and good diversity product" Department of Mathematics Univ; of Notre Dame Oct. 2002.

"The Finite Inner Automorphism Groups Of Division Rings" Shirvani; Math Proc. Camb. Phil. Soc. vol. 118 pp. 207-213, 1995.

"On Limits Of Wireless Communications In A Fading Enviroment When Using Multiple Antennas" Foschini et al; Wireless Personal Communications 6: 311-335 Mar. 1998.

Amitsur; "Finite Subgroups of Division Rings" Trans, Amer. Math. Soc. (1955) 361-386.

* cited by examiner

METHOD OF TRANSMITTING DATA USING SPACE TIME BLOCK CODES

FIELD AND BACKGROUND OF THE INVENTION

The present invention relates to the transmission of digital data and, more particularly, to a method of data transmission that uses space time block codes.

Communication data rates are increasing rapidly to support endpoint application requirements for ever-growing bandwidth and communication speed. First generation cellular telephony equipment supported a data rate of up to 9.6 kbps. Second generation cellular telephony equipment supported a data rate of up to 57.6 kbps. Now, the third generation cellular telephony standards support a data rate of up to 384 kbps, with a rate of up to 2 Mbps in local coverage. The WLAN 802.11a supports a data rate of up to 54 Mbps. The 802.11b supports a data rate of up to 11 Mbps. Both of these rates are much higher than the 3 Mbps data rate of the 802.11 standard.

Although the rates specified by the communication standards are increasing, the allowed transmit power remains low because of radiation limitations and collocation requirements. Higher data rates with fixed transmit power result in range degeradation. With modern error correction codes having almost achieved Shannon's limit, the desired data transmission rates can be achieved only via space diversity: MIMO (multiple input, multiple output), SIMO (single input, multiple output) or MISO (multiple input, single output) instead of SISO (single input single output). Size limitations on personal cellular telephony transceivers mandate that cellular telephony downlinks be MISO: several antennas at the base station transmitting to one antenna at the personal transceiver.

In U.S. Pat. No. 6,185,258, which patent is incorporated by reference for all purposes as if fully set forth herein, Alamouti et al. teach a block code for implementing both space and time diversity using two transmission antennas. Symbols are transmitted in pairs. Given two complex symbols $s_0$ and $s_1$ to transmit, first $s_0$ is transmitted via the first antenna and $s_1$ is transmitted via the second antenna, and then $-s_1$ is transmitted via the first antenna and $s_0$ is transmitted via the second antenna. At the receiver, a maximum likelihood detector recovers the two symbols from the received transmission.

One useful way of looking at the method of Alamouti et al. is that the two symbols are encoded as a matrix $$\begin{pmatrix} s_0 & -s_1^* \\ s_1 & s_0^* \end{pmatrix}.$$

Each row of this matrix corresponds to a different transmission antenna. Each column of this matrix corresponds to a different transmission time. If the symbols are normalized, as for example in PSK modulation, this matrix is unitary. The only constraint, however, on the matrix is that it is unitary. The two symbols $s_0$ and $s_1$ are otherwise independent. In other so-called "space time block codes", the matrix elements are selected in an effort to optimize channel diversity. For example, A. Shokrollahi et al., in "Representation theory for high rate multiple antenna code design (*IEEE Trans. Information Theory* vol. 47 no. 6 pp. 2335-2367, September 2001) studied the use of unitary matrix representations of fixed-point-free groups for this purpose. Given $2^m$ such matrices, each of the $2^m$ possible binary patterns for m bits is allocated to a respective one of the matrices. The data to be transmitted are partitioned into groups of m bits. For each group, the corresponding matrix is transmitted.

For example, one 2×2 representation of the quaternion group $Q_2$ is:

$$Q_i = \begin{pmatrix} 1 & 0 \\ 0 & 1 \end{pmatrix}$$

$$Q_j = \begin{pmatrix} 0 & 1 \\ -1 & 0 \end{pmatrix}$$

$$Q_k = \begin{pmatrix} i & 0 \\ 0 & -i \end{pmatrix}$$

$$Q_l = \begin{pmatrix} 0 & -i \\ -i & 0 \end{pmatrix}$$

and their negatives. The eight possible binary patterns of three bits are allocated as follows: (0,0,0) to $Q_i$, (1,0,0) to $Q_j$, (0,0,1) to $Q_k$, (1,0,1) to $Q_l$, (0,1,1) to $-Q_i$, (1,1,1) to $-Q_j$, (0,1,0) to $-Q_k$ and (1,1,0) to $-Q_l$. The data to be transmitted is partitioned into triplets of bits. To transmit the bit triplet "0,0,0", first the first transmitter transmits the number "1" while the second transmitter is silent, and then the second transmitter transmits the number "1" while the first transmitter is silent. To transmit the bit triplet "1,0,0", first the second transmitter transmits the number "−1" while the first transmitter is silent, and then the first transmitter transmits the number "1" while the second transmitter is silent. To transmit the bit triplet "0,0,1", first the first transmitter transmits the number "i" while the second transmitter is silent, and then the second transmitter transmits the number "−i" while the first transmitter is silent. To transmit the bit triplet "1,0,1", first the second transmitter transmits the number "−i" while the first transmitter is silent, and then the first transmitter transmits the number "−i" while the second transmitter is silent. To transmit the bit triplet "0,1,1", first the first transmitter transmits the number "−1" while the second transmitter is silent, and then the second transmitter transmits the number "−1" while the first transmitter is silent. To transmit the bit triplet "1,1,1", first the second transmitter transmits the number "1" while the first transmitter is silent, and then the first transmitter transmits the number "−1" while the second transmitter is silent. To transmit the bit triplet "0,1,0", first the first transmitter transmits the number "−i" while the second transmitter is silent, and then the second transmitter transmits the number "i" while the first transmitter is silent. To transmit the bit triplet "1,1,0", first the second transmitter transmits the number "i" while the first transmitter is silent, and then the first transmitter transmits the number "i" while the second transmitter is silent. "Transmitting" a complex number means modulating a carrier wave according to the number, for example by multiplying the amplitude of the carrier wave by the absolute value of the number and shifting the phase of the carrier wave by the phase of the number. (So in the above example, silencing an antenna is equivalent to transmitting the number "0" via that antenna.)

SUMMARY OF THE INVENTION

The present invention is a generalization of the prior art fixed-point-free matrix representations that further optimizes the diversity achieved using space time block codes.

According to the present invention there is provided a method of transmitting data, including the steps of: (a) providing a set of at least $2^m$ n×n matrices that represent an extension of a fixed-point-free group, each matrix including $n^2$ matrix elements, where m is a positive integer and n is an integer greater than 1; (b) allocating each binary number between 0 and binary $2^m-1$ to a respective one of the matrices; (c) mapping the data into the matrices according to the allocating; and (d) for each matrix into which the data are mapped, transmitting the matrix elements of the each matrix.

According to the present invention there is provided a transmitter for transmitting data, including: (a) a coder for mapping the data into a set of $2^m$ n×n matrices obtained by providing a set of at least $2^m$ n×n matrices that represent an extension of a fixed-point-free group and allocating each binary number between 0 and binary $2'-1$ to a respective one of the at least $2^m$ matrices, each matrix into which the data are mapped including $n^2$ matrix elements, m being a positive integer, n being an integer greater than 1, the mapping being according to the allocating; and (b) at least one antenna for transmitting the matrix elements.

According to the basic method of the present invention, a set of at least $2^m$ n×n matrices is provided, where m is a positive integer and n is an integer greater than 1. Each matrix includes $n^2$ (generally complex) matrix elements. The set represents an extension of a fixed-point-free group. In other words, the set includes a complete set of matrices that form a representation of a fixed-point-free group, and also includes at least one other matrix. To a respective one of each of $2^m$ of the matrices is allocated one of the binary numbers between binary 0 and binary $2^m-1$. To transmit a data stream of bits, the bits are mapped into the matrices according to the allocation, meaning that the bits are considered m at a time, and the matrix corresponding to each group of m bits is determined, e.g. using a lookup table. The matrix elements of each matrix into which the bits are mapped then are transmitted.

Preferably, the columns of a transmitted matrix are transmitted successively, with each matrix element of each row being transmitted via a respective antenna (space-time diversity). Alternatively, the matrix elements of each column of a transmitted matrix are transmitted via respective antennas, and the matrix elements of each row of a transmitted matrix are transmitted at respective frequencies (space-frequency diversity). As another alternative, the columns of a transmitted matrix are transmitted successively, with each matrix element of each row being transmitted at a respective frequency (time-frequency diversity).

In one preferred embodiment of the present invention, the fixed-point-free group is a quaternion group and the extension of the fixed-point-free group is a super quaternion set. In another preferred embodiment of the present invention, the fixed-point-free group is a $G_{m,r}$ group and the extension of the fixed-point-free group is a union of the fixed-point-free group and at least one coset determined by an element of an algebra in which the fixed-point-free group resides.

The transmitted matrix elements may be received at a receiver via either a known channel or an unknown channel.

The scope of the present invention also includes a transmitter for transmitting data. The transmitter includes a coder for mapping the data into a set of $2^m$ n×n matrices according to the method of the present invention and at least one antenna for transmitting the matrix elements. Preferably, the transmitter has n antennas, and each row of each matrix into which the data are mapped is transmitted using a respective one of the antennas.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of transmitting digital data using space time is block codes. Specifically, the present invention can be used to transmit digital data with a lower bit error rate (BER) at a given signal-to-noise ratio (SNR) than according to the prior art.

The principles and operation of digital data transmission according to the present invention may be better understood with reference to the drawings and the accompanying description.

Figure 21:
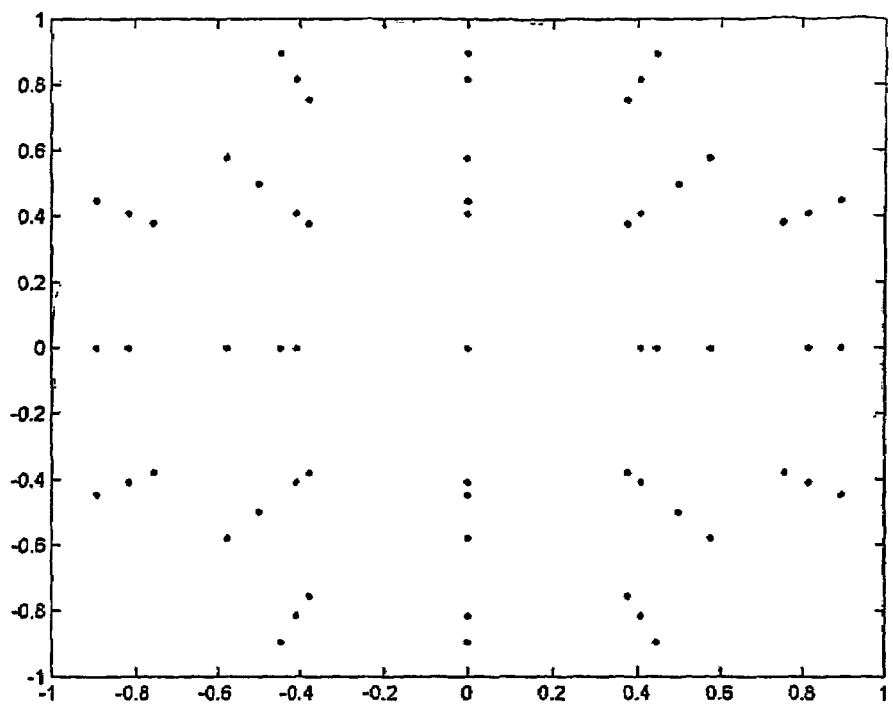
FIG. 21 is the constellation of the super-quaternion extension of Table 1.
Figure 22:
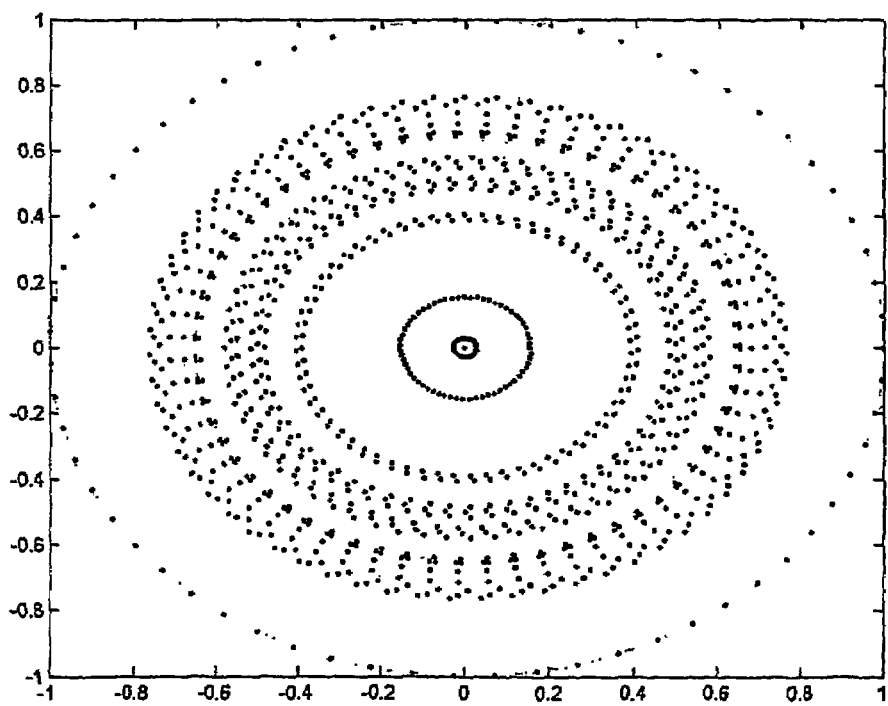
FIG. 22 is the constellation of the $G_{m,r}$ coset extension of Table 2

The theory of the present invention is described in the accompanying Theory Section. Two specific extensions of fixed-point-free groups are discussed in the Theory Section: super-quaternion extensions of quaternion groups and coset extensions of $G_{m,r}$ groups. Table 1 lists an exemplary set of 2×2 matrix representations of the super-quaternion extension $S_{Q_2,7,2}$, along with the associated bit allocations. Table 2 lists an exemplary set of 3×3 matrix representations of a coset extension of $G_{63,37}$, along with the associated bit allocations. The constellations of these two extensions are shown in FIGS. 21 and 22, respectively.

Figure 1:
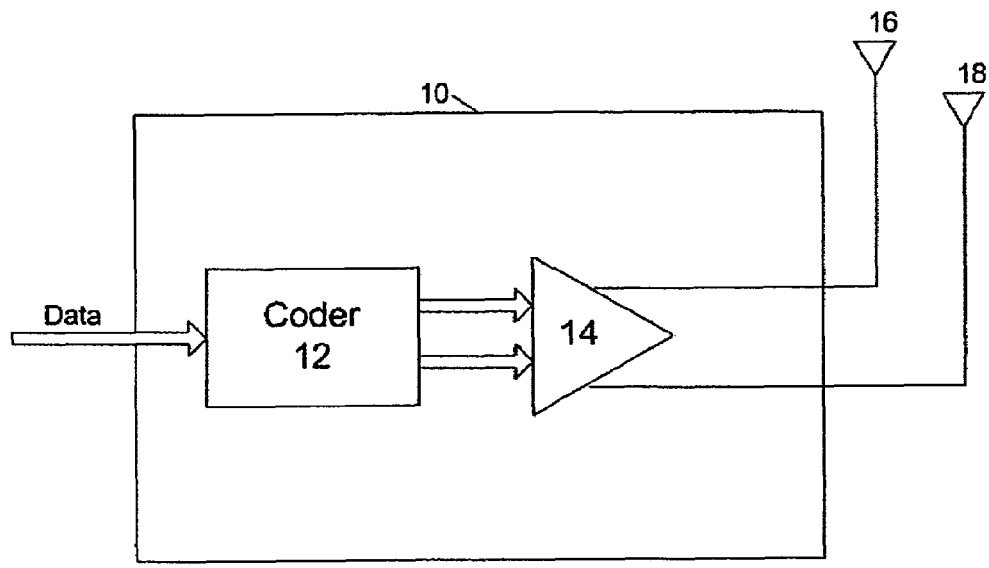
FIGS. 1 and 2 are high-level block diagrams of transmitters of the present invention.

Referring now to the drawings, FIG. 1, which is based on the Figures of U.S. Pat. No. 6,185,258, is a high-level block diagram of a transmitter 10 of the present invention. Transmitter 10 includes a coder 12, a modulation and transmission section 14 and two antennas 16 and 18. Coder 12 receives an incoming stream of data bits to transmit and maps the bits, eight at a time, into the matrices of Table 1. For each matrix, modulation and transmission section 14 modulates a carrier wave according to the elements of the matrix and transmits the modulated carrier wave via antennas 16 and 18. First, modulation and transmission section 14 modulates the carrier wave according to the 1,1 matrix element and transmits the thus-modulated carrier wave via antenna 16, while also modulating the carrier wave according to the 2,1 matrix element and transmitting the thus-modulated carrier wave via antenna 18. Then, modulation and transmission section 14 modulates the carrier wave according to the 1,2 matrix element and transmits the thus-modulated carrier wave via antenna 16, while also modulating the carrier wave according to the 2,2 matrix element and transmitting the thus-modulated carrier wave via antenna 18.

For example, to transmit the bit pattern "00100011" (binary 67), the matrix $$\begin{pmatrix} -0.8944i & -0.4472 \\ 0.4472 & 0.8944i \end{pmatrix}$$

is transmitted. First, modulation and transmission section 14 modulates the carrier wave by multiplying the amplitude of the carrier wave by 0.8944 and shifting the phase of the carrier wave by −90°, and transmits the thus-modulated carrier wave via antenna 16. Simultaneously, modulation and transmission section 14 modulates the carrier wave by multiplying the amplitude of the carrier wave by 0.4472 without shifting the phase of the carrier wave, and transmits the thus-modulated carrier wave via antenna 18. Then, modulation and transmission section 14 modulates the carrier wave by multiplying the amplitude of the carrier wave by 0.4472 and shifting the phase of the carrier wave by 180°, and transmits the thus-modulated carrier wave via antenna 16. Simultaneously, modulation and transmission section 14 modulates the carrier wave by multiplying the amplitude of the carrier wave by 0.8944 and shifting the phase of the carrier wave by 90°, and transmits the thus-modulated carrier wave via antenna 18.

At the receiver, the received signal is demodulated and conventional maximum likelihood estimation is used to estimate the transmitted matrix. Then the bit pattern associated with the closest matrix, in a look-up table identical to Table 1, to the estimated matrix is interpreted as the transmitted bit pattern.

The receiver may receive the signal via a known channel or via an unknown channel. In a known channel, the receiver knows the channel response from every transmitter antenna to every receiver antenna. For example, in some channels, before the transmission of a block of data, a predefined preamble is transmitted. The receiver learns the characteristics of the channel from the preamble. If the channel characteristics change much more slowly than the time it takes to transmit a block of data, the channel is considered "known". Otherwise, the channel is considered "unknown". Both cases are treated in the Theory Section.

Figure 10:
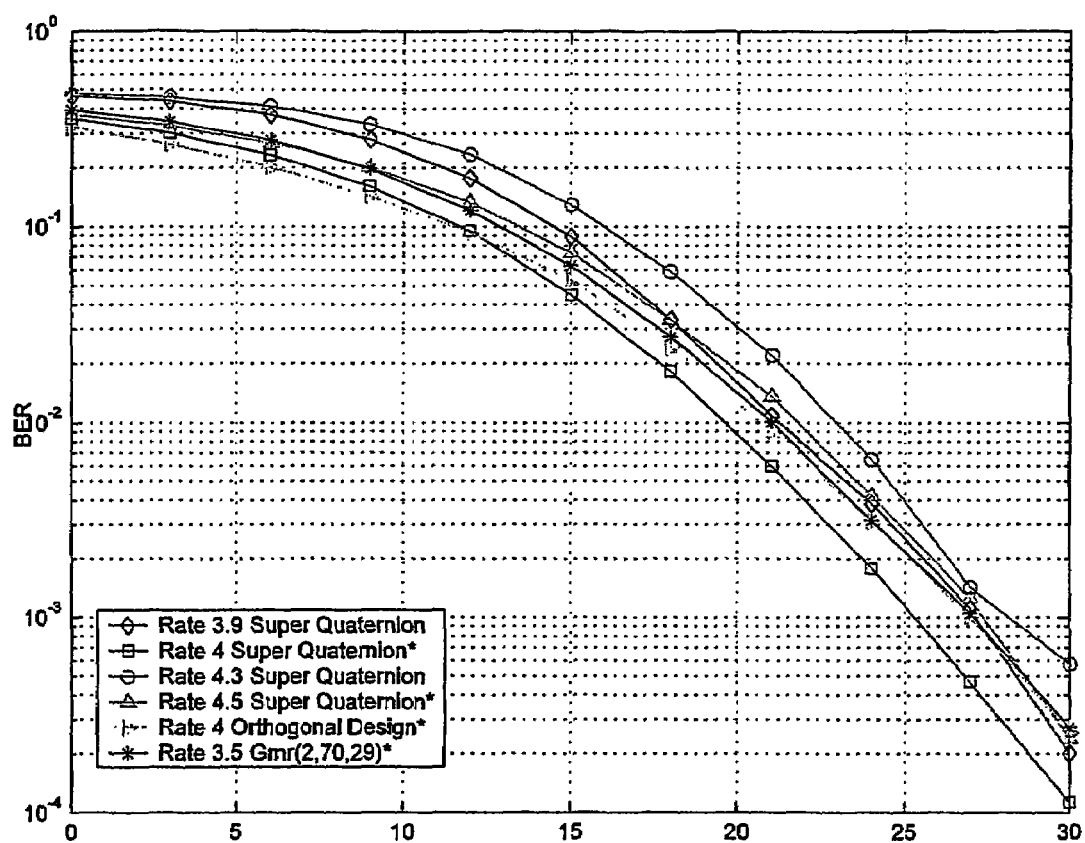

FIG. 10 shows the bit error rate (BER) obtained in several simulations of transmitting using super-quaternion extensions of quaternion groups, vs. signal-to-noise ratio (SNR), compared with simulations of transmitting using two prior art space time block codes. The results using the super-quaternion extension of Table 1 are labeled "Rate 4 Super Quaternion" in FIG. 10.

Figure 2:
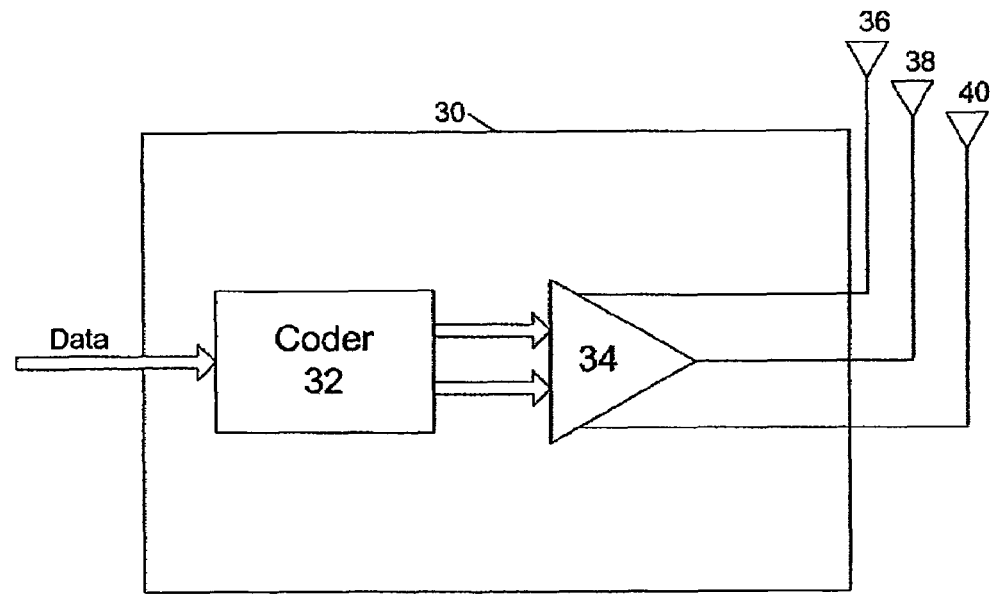

An alternative transmitter 30 of the present invention is illustrated in FIG. 2. Transmitter 30 includes a coder 32, a modulation and transmission section 34 and three antennas 36, 38 and 40. Coder 32 receives an incoming stream of data bits to transmit and maps the bits, nine at a time, into the matrices of Table 2. For each matrix, modulation and transmission section 34 modulates a carrier wave according to the elements of the matrix and transmits the modulated carrier wave via antennas 36, 38 and 40. First, modulation and transmission section 34 modulates the carrier wave according to the 1,1 matrix element and transmits the thus-modulated carrier wave via antenna 36, while also modulating the carrier wave according to the 2,1 matrix element and transmitting the thus-modulated carrier wave via antenna 38, and while also modulating the carrier wave according to the 3,1 matrix element and transmitting the thus-modulated carrier wave via antenna 40. Then, modulation and transmission section 34 modulates the carrier wave according to the 1,2 matrix element and transmits the thus-modulated carrier wave via antenna 36, while also modulating the carrier wave according to the 2,2 matrix element and transmitting the thus-modulated carrier wave via antenna 38, and while also modulating the carrier wave according to the 3,2 matrix element and transmitting the thus-modulated carrier wave via antenna 40. Finally, modulation and transmission section modulates the carrier wave according to the 1,3 matrix element and transmits the thus-modulated carrier wave via antenna 36, while also modulating the carrier wave according to the 2,3 matrix element and transmitting the thus-modulated carrier wave via antenna 38, and while also modulating the carrier wave according to the 3,3 matrix element and transmitting the thus-modulated carrier wave via antenna 40.

For example, to transmit the bit pattern "100111000" (binary 312), the matrix $$\begin{pmatrix} -0.4460 - 0.1866i & -0.5437 + 0.4109i & 0.3838 - 0.3929i \\ -0.05577 + 0.3449i & 0.0970 + 0.1204i & 0.2427 + 0.6980i \\ 0.1845 - 0.5497i & 0.5460 + 0.4621i & 0.3655 + 0.1364i \end{pmatrix}$$

is transmitted. First, modulation and transmission section 34 modulates the carrier wave by multiplying the amplitude of the carrier wave by 0.4835 (the absolute value of the 1,1 matrix element) and shifting the phase of the carrier wave by −156.0° (the phase of the 1,1 matrix element), and transmits the thus-modulated carrier wave via antenna 36. Simultaneously, modulation and transmission section 34 modulates the carrier wave by multiplying the amplitude of the carrier wave by 0.6557 (the absolute value of the 2,1 matrix element) and shifting the phase of the carrier wave by 148.3° (the phase of the 2,1 matrix element), and transmits the thus-modulated carrier wave via antenna 38. Also simultaneously, modulation and transmission section 34 modulates the carrier wave by multiplying the amplitude of the carrier wave by 0.5798 (the absolute value of the 3,1 matrix element) and shifting the phase of the carrier wave by −71.4° (the phase of the 3,1 matrix element), and transmits the thus-modulated carrier wave via antenna 40. Then, modulation and transmission section 34 modulates the carrier wave by multiplying the amplitude of the carrier wave by 0.6815 (the absolute value of the 1,2 matrix element) and shifting the phase of the carrier wave by 142.9° (the phase of the 1,2 matrix element), and transmits the thus-modulated carrier wave via antenna 36. Simultaneously, modulation and transmission section 34 modulates the carrier wave by multiplying the amplitude of the carrier wave by 0.1546 (the absolute value of the 2,2 matrix element) and shifting the phase of the carrier wave by 51.1° (the phase of the 2,2 matrix element), and transmits the thus-modulated carrier wave via antenna 38. Also simultaneously, modulation and transmission section 34 modulates the carrier wave by multiplying the amplitude of the carrier wave by 0.7153 (the absolute value of the 3,2 matrix element) and shifting the phase of the carrier wave by 40.20 (the phase of the 3,2 matrix element), and transmits the thus-modulated carrier wave via antenna 40. Finally, modulation and transmission section 34 modulates the carrier wave by multiplying the amplitude of the carrier wave by 0.5493 (the absolute value of the 1,3 matrix element) and shifting the phase of the carrier wave by −45.7 (the phase of the 1,3 matrix element), and transmits the thus-modulated carrier wave via antenna 36. Simultaneously, modulation and transmission section 34 modulates the carrier wave by multiplying the amplitude of the carrier wave by 0.7390 (the absolute value of the 2,3 matrix element) and shifting the phase of the carrier wave by 70.8° (the phase of the 2,3 matrix element), and transmits the thus-modulated carrier wave via antenna 38. Also simultaneously, modulation and transmission section 34 modulates the carrier wave by multiplying the amplitude of the carrier wave by 0.3501 (the absolute value of the 3,3 matrix element) and shifting the phase of the carrier wave by 20.5° (the phase of the 3,3 matrix element), and transmits the thus-modulated carrier wave via antenna 40.

At the receiver, the received signal is demodulated and conventional maximum likelihood estimation is used to estimate the transmitted matrix. Then the bit pattern associated with the closest matrix, in a look-up table identical to Table 2, to the estimated matrix is interpreted as the transmitted bit pattern.

Figure 23:
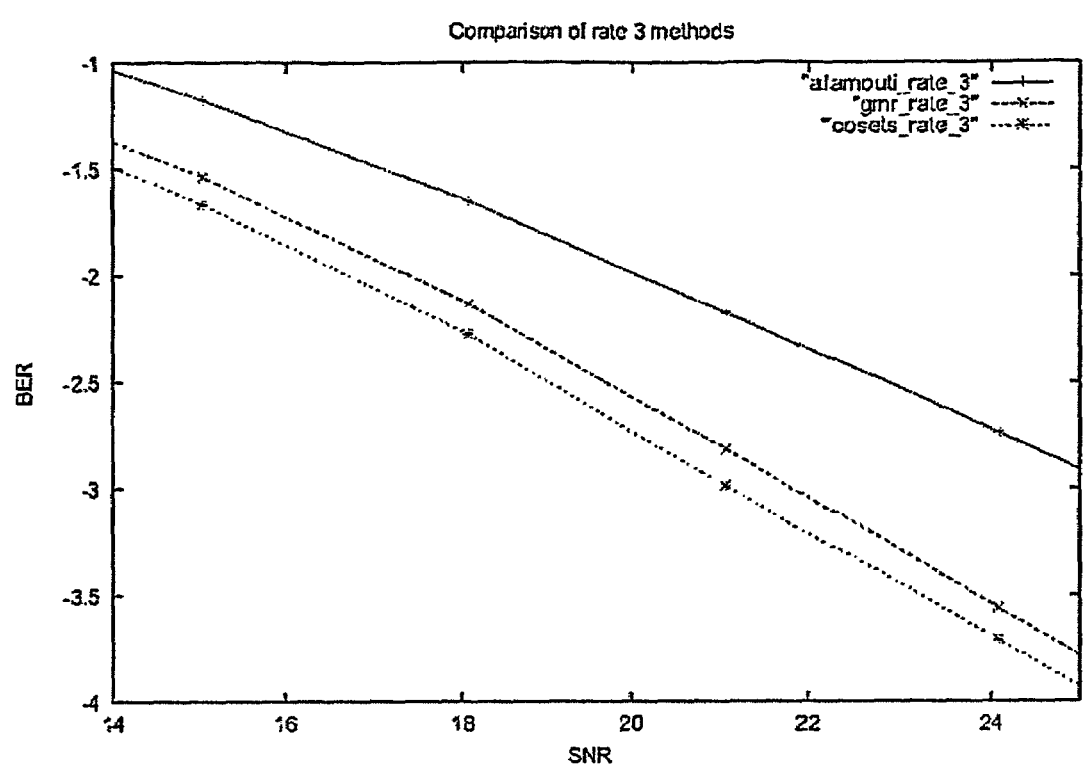
FIG. 23 is a plot of bit error rate vs. signal-to-noise ratio for simulations of transmission using a prior art $G_{m,r}$ space time block code and the $G_{m,r}$ coset extension space time block code of Table 2.

FIG. 23 shows the BER obtained in a simulation of transmitting using the $G_{m,r}$ coset extension of Table 2 vs. SNR, compared with a simulation of transmitting using a prior art $G_{m,r}$ group.

While the invention has been described with respect to a limited number of embodiments, it will be appreciated that many variations, modifications and other applications of the invention may be made.

THEORY SECTION

Abstract

Space Time Block Codes (STBC) are designed for Multiple Input—Multiple Output (MIMO) channels. The recently developed advanced codes (Turbo codes and LDPC) have been able to achieve rates at almost the channels' capacity in Single Input—Single Output (SISO) channels. Given a fixed transmit power and bandwidth it is necessary to take advantage of space diversity if one wishes to exceed the Shannon limit for data rate. Furthermore, in order to avoid errors, SISO fading channels require long coding blocks and interleavers that result in high delays. STBC codes take advantage of space-time diversity to reduce errors. Joined STBC with error correction codes can achieve high rates with low Bit Error Rate (BER) at low delays.

Early STBC, that where developed by Alamouti [2] for known channels and by Tarokh [3] for unknown channels, have been proven to increase the performance of channels characterized by Rayleigh fading. It has been shown in [4,6] that the diversity of STBC codes is a good criterion for its performance. Codes that are based on groups or division algebras have by definition non-zero diversity and therefore they are suitable for STBC in order to achieve high rates at low Symbol to Noise Ratio (SNR). This work presents a new high diversity group based on STBC with improved performance both in known and unknown channels.

1. Introduction

Current communications data rates increase rapidly in order to support endpoint application requirements for ever growing bandwidth and communication speed. While 1st generation cellular equipment supported up to 9.6 kbps data rate, 2nd generation cellular supported up to 57.6 kbps rates, and today, 3rd generation standards support up to 384 kbps rates (local area coverage of up to 2 Mbps). The WLAN standard 802.11a supports up to 54 Mbps and 802.11b supports up to 11 Mbps, while the maximal data rate of the 802.11 standard is 3 Mbps.

Figure 3:
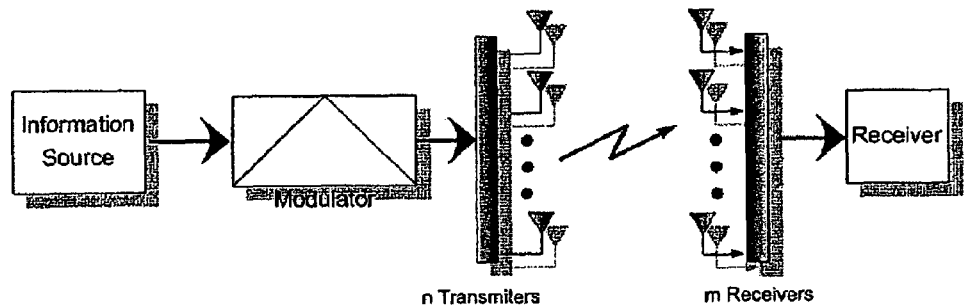
FIG. 3 is a high-level block diagram of a MIMO system.

Although the rates of the communication standards are increasing, the transmit power remains low due to radiation limitations and collocation requirements. Naturally, higher data rates with fixed transmit power result in range degradation. Since Shannon's limit has almost been achieved by recently developed error correction codes, it is necessary to exceed SISO channels performance by taking advantage of space diversity. FIG. 3 illustrates a typical MIMO system.

2. Preview on STBC

In this section we give a short preview on STBC and the motivation for using receive and transmit diversity.

2.1. STBC Constellation

The STBC codes, that we presented here are based on constellations of the form $\alpha \cdot e^{i\beta} = a + i \cdot b$, where $\alpha$ is the amplitude of the modulation and $\beta$ is the phase of the modulation. When we refer to a code we mean a set of matrices, where each matrix is a codeword.

The matrices represent $n^2$ constellations each (for n-transmit diversity) where the column represents the transmission antenna and the row represents the time. If the matrix $\{c_{ij}\}_{i,j=1}^{n}$ is transmitted at times T, T+1, ..., T+n−1 then the symbol $c_{ij}$ will be transmitted at time i from antenna j. The following example illustrates the transmission of a code word $c_{ij}$ for 2-transmit diversity (n=2) at times T, T+1:

| Time | Antenna 1 | Antenna 2 |
|---|---|---|
| T | $C_{11}$ | $C_{12}$ |
| T + 1 | $C_{21}$ | $C_{22}$ |

Transmit diversity refers to multiple transmitter antennas, and receive diversity refers to multiple receiver antennas. The STBC codes are usually designed according to the Transmit diversity, while receive diversity has merely effect on the performance. The receiver estimates the transmitted codeword according to n (n is the number of transmitter antennas) time samples from the receiver antennas.

We consider two channel types:

Known Channel: In a known channel the receiver knows the channel response from every transmitter antenna to every receiver antenna. For example, in some channels before the transmission of every data block, a predefined preamble is transmitted and the receiver learns the channel from the preamble. If the channel changes much slower than the data block length then the channel is considered to be known.

Unknown Channel: In this case the receiver has no knowledge of the channel, and the data has to be decoded differentially as shown in section 9.

2.2 Channel Model

Multipath channels in urban and suburban areas are very difficult to estimate. Beside the specific dependency on place, speed, and surrounding moving objects (cars, people) the channels characteristics are specific to topography, building style and density, frequency, antenna height, type of terrain and other parameters. Small change in one of these parameters may affect completely the channel response. Many channel response simplification models have been introduced to estimate the channel performance. Some of the most commonly used models are given below.

Free Space The only accurate model. The path loss L (power loss due to channel response) in this case depends entirely on the distance R (and on the atmosphere at frequencies above 20 Ghz):

$$L \propto \frac{1}{R^2}.$$

Flat Land: Mathematical estimation of a path loss for a line of sight channels over flat land with low antennas (the height of antennas is much smaller than the distance between them). The loss is given by $$L \propto \frac{1}{R^4}.$$

Egli: This propagation model takes into account experimental dependency of the path loss on the frequency f:

$$L \propto \frac{1}{R^4 f^2}$$

TIREM, ITU-R: Experimental models that give path loss estimation based on field experiments.

Rice: A random model for a line of sight channel that involves multipath.

Rayleigh: A random model for multipath channels without line of sight. The channel's response in this model (for a SISO channel) is $$Y = \alpha \cdot \frac{1}{\sqrt{2}} (v_1 + iv_2) X \qquad (1)$$

where X is the transmitted symbol, Y the received symbol, $\alpha$ is a constant that equals the average absolute path loss, and $v_1, v_2$ are i.i.d. normal Gaussian variables.

The model used in our simulations is the Rayleigh model [12], which is adequate for urban communications with no line of sight. The channel's response of a MIMO channel (FIG. 3) is represented by the matrix $$R = \begin{pmatrix} r_{11} & r_{12} & \cdots & r_{1m} \\ r_{21} & r_{22} & \cdots & r_{2m} \\ \vdots & \vdots & \ddots & \vdots \\ r_{n1} & r_{n2} & \cdots & r_{nm} \end{pmatrix}$$

where $r_{ij}$ is the path loss from transmitter antenna i to receiver antenna j, i=1, ..., n, j=1, ..., m, n is the transmit diversity, and m is the receive diversity. $r_{ij}$ are assumed to be independent (this is usually the case when all the antennas are placed more than half wavelength from each other) and the distribution of $r_{ij}$ is given by EQ. 1.

The channel's noise at the receiver antennas is assumed to be i.i.d normal Gaussian noise, with random, uniformly distributed phase. Since the total transmission power over all the transmitter's antennas is normalized to 1, the average SNR at the receiver antennas is a from EQ. 1, given in dB.

Figure 4:
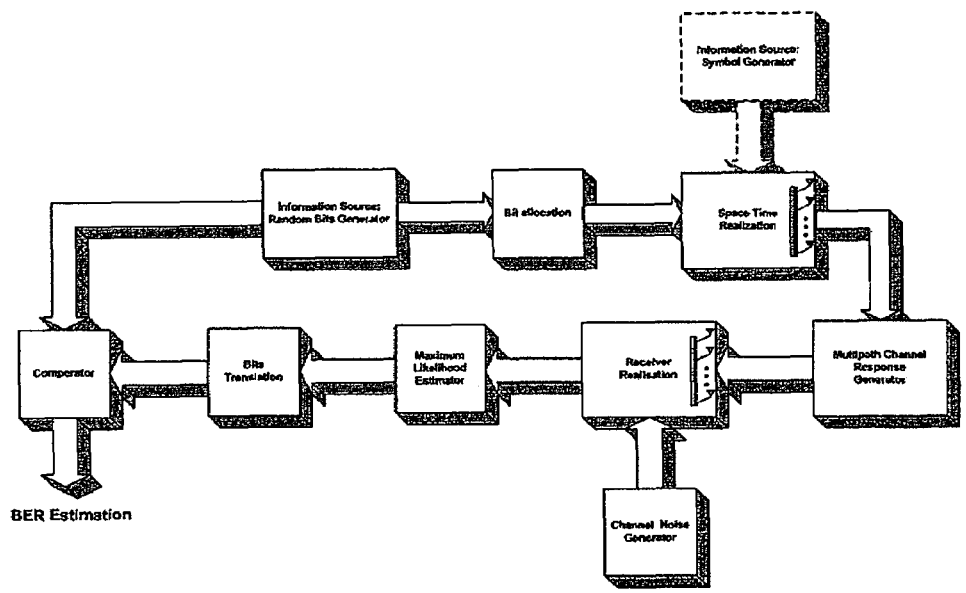
FIG. 4 is a flow chart of simulation of the present invention.

The new proposed algorithms were simulated to estimate their performance. The simulations were performed over a large number of independent tests to assure accurate results. All symbols/bits at the bit/symbol generator were chosen randomly and independently and the channel noise was generated as i.i.d. normal Gaussian noise for all time samples and receiver antennas. At the known channel simulations the channel response was generated independently for each codeword and was also delivered to the receiver as side information. At the unknown channel simulations the channel response was generated for a block of codewords, while the first codeword in every block was transmitted as reference and was not estimated in order to eliminate simulation dependency (for large enough number of tests) on block length. The bit allocation was decided prior to the simulation according to numerical optimization simulations. In cases bit allocation was not possible the symbols were generated directly and the BER was estimated according to chapter 7. The flow of the simulation scheme is given in FIG. 4.

Random Bit Generator: Simulates the information bits of an information source for codes with integral rate. The bits are equally distributed and independent.

Bit Allocation: This procedure allocates the bits into channel symbols. The bits are allocated optimally to achieve minimal error probability. The algorithm allocates closer symbols to codewords with smaller hamming distance (section 7).

Symbol Generator: In the case of codes with a non-integral rate the symbols are generated directly with no bit allocation. All symbols are i.i.d.

Space Time Realization: This procedure represents the codewords as matrices, as described in section 2.1.

Channel Response Generator: Simulates Rayleigh fading channel. Every transmitted symbol is multiplied by the channel response (elaborated at section 2.2). The variance of the channel's response is calculated according to the SNR (EQ. 1).

Channel Noise Generator: Gaussian white noise is added to the receiver antennas. The variance of the noise is set to 1.

Receiver realization: This procedure calculates the received symbols for every receiver antenna according to the transmitted codewords, the channel response and the channel noise.

Maximum Likelihood Estimator: For every Block of received symbols (the size of the block is the number of transmitter antennas) we estimate the maximum likelihood transmitted codeword. When known channel is simulated all the channel response parameters are given to the 'Maximum Likelihood Estimator' as side information. When unknown channel is simulated the estimation is made differentially according to the previous received symbols (section 9).

Bit Translation: The symbols are translated back into bits (for codes with whole rates).

Comparator: The BER is calculated by comparing the transmitted symbols/bits to the received symbols/bits and averaging over a large number of samples. The calculations of BER are elaborated in section 7.

2.3. Diversity and Error Probability

In this section we will assume that the receiver has perfect knowledge of the channel (i.e. in noiseless channel there would have been a perfect reconstruction). We assume that the number of transmitters is n and the number of receivers is m. Given that the codeword $$\vec{c} = c_1^1 c_1^2 \ldots c_1^n c_2^1 c_2^2 \ldots c_2^n c_3^1 \ldots c_n^1 \ldots c_n^n$$

was transmitted, then the received signal, $$\vec{d} = d_1^1 d_1^2 \ldots d_1^m d_2^1 d_2^2 \ldots d_2^m d_3^1 \ldots d_n^1 \ldots d_n^m$$

is given by $$d_t^j = \sum_{i=1}^{n}(\alpha_{i,j}c_t^i\sqrt{E_s}) + v_t^j, \ 1 \le j \le m \quad (5)$$

where j is the receiver antenna and t is the time sample, $\alpha_{i,j}$ is the channel response from transmitter i to receiver j, $c_t^i$ is the transmitted signal from transmitter i at time t, $E_s$ is the normalization factor for the transmission power in order to keep the average constellation equal to 1, $v_t^j$ is a Gaussian white noise at the receiver antenna.

Consider that the following signal $$\vec{e} = e_1^1 e_1^2 \ldots e_1^n e_2^1 e_2^2 \ldots e_2^n e_3^1 \ldots e_k^1 \ldots e_k^n$$

is the receiver's decision upon maximum-likelihood criteria. When white Gaussian noise is present, the probability of deciding in favor of e, when c was transmitted is ([6,4]):

$$P(\vec{c} \rightarrow \vec{e} \mid \alpha_{i,j}) = \frac{1}{\sqrt{\pi N_0}} \int_{d(c,e) \le d(c,e')}^{\infty} e^{-\frac{d^2(c,e')}{N_0}} de' \le e^{-d^2(c,e)E_s/4N_0},$$

$$1 \le i \le n, 1 \le j \le m$$

where $N_0/2$ is the noise variance per receiver's element and $$d^2(c,e) = \sum_{j=1}^{m}\sum_{t=1}^{k}\left|\sum_{i=1}^{n}\alpha_{i,j}(c_j^i - e_t^i)\right|^2.$$

Define $\Omega_j = (\alpha_{1,j}, \ldots, \alpha_{n,j})$. We get after some manipulations that $$d^2(\vec{c}, \vec{e}) = \sum_{j=1}^{m} \Omega_j A(\vec{c}, \vec{e}) \Omega_j^*$$

where $$A_{pq} = (c_1^p - e_1^p, c_2^p - e_2^p, \ldots, c_k^p - e_k^p)(c_1^q - e_1^q, c_2^q - e_2^q, \ldots, c_k^q - e_k^q)^*$$

and * is the conjugate-transpose (conjugate for scalars). Thus, the error probability can be estimated to be $$P(\vec{c} \rightarrow \vec{e} \mid \alpha_{i,j}) \le \prod_{j=1}^{m} e^{-\Omega_j A(\vec{c},\vec{e})\Omega_j^* E_s/4N_0}, \ 1 \le i \le n, 1 \le j \le m. \quad (2)$$

Since $A(\vec{c}, \vec{e})$ is a Hermitian matrix there exists a unitary matrix V, which consists of the eigenvectors of A, such that $VA(c,e)V^* = D$ is diagonal. $D_{i,i} = \Lambda_i$ are the eigenvalues.

Clearly, the matrix $$B(\vec{c}, \vec{e}) = \begin{pmatrix} c_1^1 - e_1^1 & c_2^1 - e_2^1 & \ldots & c_k^1 - e_k^1 \\ \vdots & \vdots & \ddots & \vdots \\ c_1^n - e_1^n & c_2^n - e_2^n & \ldots & c_k^n - e_k^n \end{pmatrix}.$$

is a square root of A(c,e), i.e $A(\vec{c}, \vec{e}) = B(\vec{c}, \vec{e})^* B(\vec{c}, \vec{e})$.

Let $$\overline{B_j} \triangleq (B_{1,j}, \ldots, \beta_{n,j}) = \Omega_j V^* \quad (3)$$

then $$\Omega_j A(\vec{c}, \vec{e}) \Omega_j^* = \sum_{i=1}^{n} \lambda_i |\beta_{i,j}|^2.$$

Now we can estimate the probability of EQ. 2 by:

$$P(\vec{c} \rightarrow \vec{e} \mid \{a_{i,j}\}) \le \prod_{j=1}^{m} e^{-\frac{E_s}{4N_0} \sum_{i=1}^{n} \lambda_i |\beta_{i,j}|^2}, \ 1 \le i \le n, 1 \le j \le m. \quad (4)$$

Assume we have an independent channel response among different paths (i.e. $\alpha_{i,j}$ are independent). Since V is unitary, it is easy to show using definition 3 that $\beta_{i,j}$ are i.i.d. After averaging over $\beta_{i,j}$, we get for Rayleigh fading the following expression:

$$P(\vec{c} \rightarrow \vec{e} \mid \alpha_{i,j}) \le \left( \frac{1}{\prod_{i=1}^{n}(1 + \lambda_i E_s/4N_0)} \right)^m, \ 1 \le i \le n, 1 \le j \le m.$$

We can assume for high SNR that $1 + \lambda_i E_s/4N_0 \approx \lambda_i E_s/4N_0$, then $$P(\vec{c} \rightarrow \vec{e} \mid \alpha_{i,j}) \le \left( \prod_{i=1}^{r} \lambda_i \right)^{-m} (E_s/4N_0)^{-rm}, \ 1 \le i \le n, 1 \le j \le m \quad (5)$$

where r is the number of non-zero eigenvalues of A.

By assuming that A is regular (r=n), we get $$\prod_{i=1}^{r} \lambda_i = \det(A),$$

but $|A| = |B|^2$ and therefore $$P(\vec{c} \rightarrow \vec{e} \mid \alpha_{i,j}) \le |B|^{-2m}(E_x/4N_0)^{-rm}, \ 1 \le i \le n, 1 \le j \le m.$$

Since B is the difference between two distinct signals, c and e, we define the diversity to be $$\zeta \triangleq \frac{1}{2} \min |\det(C_l - C_{l'})|^{\frac{1}{m}}$$

(5)

for all distinct code words $C_l$ and $C_{l'}$. It is obvious that codes that assure maximal diversity will achieve smaller error probabilities.

2.4. Receive and Transmit Diversity

The STBC codes are designed to take advantage of the transmit diversity. However, it is a well known fact that the capacity and the performance of a MIMO channel depends on the receive diversity. The standard formula for Shannon capacity is given by:

$$C = \log_2(1 + \rho |H|^2)$$ (6)

where $\rho$ is the transmission power (normalized to the channel noise) and H is the channel transfer power characteristic. Assume that the transmitted signals at the transmitter's antennas are independent, have equal power and mutually Gaussian distributed. The capacity of a MIMO channel [12] is:

$$C = \log_2[\det(I_N + (\rho/N) HH^*)] \text{ bps/Hz.}$$ (7)

For example, for N independent deterministic channels, i.e. $H = I_N$, we get $$\lim_{N \to \infty} C_N = \lim_{N \to \infty} N \cdot \log_2(1 + (\rho/N)) = \rho/\ln(2).$$ (8)

The capacity in this case is linear with $\rho$, while the dependency is logarithmic in Eq. 6. Next we consider the case of M receiver antennas and a single transmitter antenna. The capacity is:

$$C = \log_2\left(1 + \rho \sum_{i=0}^{M} |H_i|^2\right).$$ (9)

For a Rayleigh fading channel the capacity of this channel is:

$$C = \log_2(1 + \rho \cdot \chi_{2M}^2).$$ (10)

where $$\chi_{2M}^2 \propto \sum_{i=0}^{2M} X_i^2 \text{ and } X_i \text{ are i.i.d, } X_i = \text{NORMAL}(0, 1/\sqrt{2}).$$

The capacity of a MIMO channel with N transmitter antennas and a single receiver antenna in a fading channel is $$C = \log_2(1 + \rho \chi_2^2).$$ (11)

The inferior capacity of transmit diversity, compared to receive diversity, is due to the constraint on the overall transmit power.

The capacity of a SISO fading channel is $$C = \log_2(1 + \rho \chi_2^2).$$ (12)

Due to the convexity of the log function the MIMO channel with transmit diversity has in average a larger capacity than the SISO channel.

Figure 20:
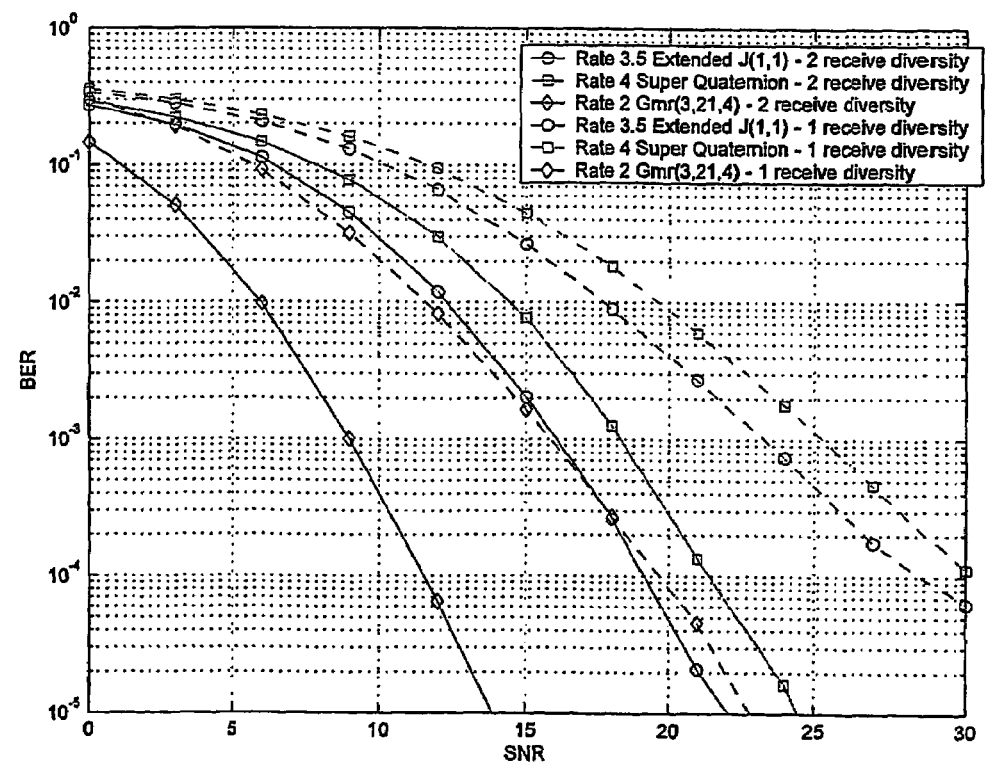

From EQ. 5 we can see that the error probability depends exponentially on the number of receiver antennas, for a fixed transmit diversity. FIG. 20 shows the improved performance when two receiver antennas are used.

3. Prior Related Work

In this section we present a short review of known STBC constellations that are based on algebraic structures. The new STBC codes, developed in this invention, resemble some of the codes presented in this section.

3.1. Usage of Group Structures for Space Time Coding

The usage of groups to design unitary space-time constellations has high potential to provide constellations with good diversity product. We will review some of these groups which were analyzed in [8].

Cyclic Groups:

Cyclic groups are used for differential modulation in [7], and also referred to as "diagonal designs". The elements of these groups are diagonal Lth roots of unity.

$$V_l = V_s^l \text{ and } V_s = diag[e^{i2\pi u_1/L}, \ldots, e^{i2\pi u_m/L}].$$

The $u_m$ are chosen to maximize the diversity product $\zeta_V$, which is given by $$\zeta_V = \frac{1}{2} \min_{0 \leq l < l' < L} |\det(V_l - V_{l'})|^{\frac{1}{M}}$$

$$= \frac{1}{2} \min_{l=1,\ldots,L-1} |\det(I - V_l)|^{\frac{1}{M}}$$

$$= \frac{1}{2} \min_{l=1,\ldots,L-1} |\det(diag[1 - e^{i2\pi u_i/L}, \ldots, 1 - e^{i2\pi u_m/L}])|^{\frac{1}{M}}$$

$$= \frac{1}{2} \min_{l=1,\ldots,L-1} \left| \prod_{i=1}^{M} 1 - e^{i2\pi u_i/L} \right|^{\frac{1}{M}}$$

$$= \frac{1}{2} \min_{l=1,\ldots,L-1} \left| \prod_{i=1}^{M} e^{i\pi u_i/L} (e^{-i\pi u_i/L} - e^{i\pi u_i/L}) \right|^{\frac{1}{M}}$$

$$= \min_{l=1,\ldots,L-1} \left| \prod_{i=1}^{M} \frac{e^{i\pi u_i/L} - e^{-i\pi u_i/L}}{2} \right|^{\frac{1}{M}}$$

$$= \min_{l=1,\ldots,L-1} \left| \prod_{i=1}^{M} \sin\frac{\pi u_i l}{L} \right|^{\frac{1}{M}}.$$

In this constellation, the transmitter's antennas are activated one at a time, sequentially, and in the same order. Notice that these groups are Abelian (commutative), and that they have full diversity, i.e. positive diversity. Diagonal designs perform well in low rates, but other works such as in [8] tried to find designs with matrices that are not "sparse" and will achieve good diversity at high rates.

Quaternion Groups:

The quaternion groups are also called "dicyclic groups" in [9], and have the form $$Q_p = \langle \alpha, \beta | +^{2^p} = 1, \beta^2 = \alpha^{2^{p-1}}, \beta\alpha = \alpha^{-1}\beta \rangle, p \geq 1$$

where $\langle \cdot \rangle$ refers to the groups generated from the elements that are in the brackets. The group order is $L = 2^{p+1}$. The matrix representation for the 2×2 quaternion group appears in [9], so the rate of the constellations will be R=(p+1)/2 and the group is generated from two unitary matrices:

$$\left\{ \begin{pmatrix} e^{2\pi i/2^p} & 0 \\ 0 & e^{-2\pi i/2^p} \end{pmatrix}, \begin{pmatrix} 0 & 1 \\ -1 & 0 \end{pmatrix} \right\}.$$

These groups will be used in our work for the development of new constellations, which are not necessarily groups, but have high diversity, and exceedingly good performance at low SNR.

Fixed Point Free Groups:

A necessary condition for a finite group of matrices to have full diversity ($\zeta > 0$) is that it be fixed point free. These types of groups were explored by Burnside, Zassenhaus, Amitsur and others. Cyclic groups and quaternion groups are specific examples of such groups. A recent comprehensive survey is [8]. There are six types of fix-point free groups: $G_{m,r}$, $D_{m,r,l}$, $E_{m,r,l}$, $F_{m,r,l}$, $J_{m,r}$ and $K_{m,r,l}$. $G_{m,r}$, for example, has the form of $$G_{m,r} = \langle a, b | a^m = 1, b^n = a^t, ba = a^r b \rangle \qquad (13)$$

where n is the order of r modulo m (i.e. n is the smallest positive integer such that $r^n \equiv 1 \mod m$), $t = m/\gcd(r-1,m)$, and $\gcd(n,t)=1$. The matrix representation of $G_{m,r}$ is $A^s B^k$, s= 0, ..., m−1, k=0, ..., n−1 where $$A = \begin{pmatrix} \xi & 0 & 0 & \cdots & 0 \\ 0 & \xi^r & 0 & \cdots & 0 \\ 0 & 0 & \xi^{r^2} & \cdots & 0 \\ \vdots & \vdots & \vdots & \ddots & \vdots \\ 0 & 0 & 0 & \cdots & \xi^{r^{n-1}} \end{pmatrix}, \qquad (14)$$

$$B = \begin{pmatrix} 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \\ \xi^t & 0 & 0 & \cdots & 0 \end{pmatrix} \text{ and}$$

$$\xi = e^{2\pi i/m}.$$

It can be proved that a finite group is fixed-point-free if and only if it is isomorphic to one of the above six groups [8]. Many of the fixed-point-free group representations have good diversity product and therefore provide high rate constellations.

3.2. Extensions for Group-Related Structures

Although we saw that group constellations have better chance to have full diversity, sometimes the group constraint does not really help, and we may want to look at matrix sets that are not necessarily groups. Moreover, there is a strong motivation to develop group-related structures, that still have small number of distinct pairwise distances.

Orthogonal Designs:

Orthogonal designs were introduced in the early stages of space-time codes development (see [5,2]). A complex orthogonal design of size N is an N×N unitary matrix whose rows are permutations of complex numbers $\pm x_1, \pm x_2, \ldots, \pm x_n$, their conjugates $\pm x_1^*, \pm x_2^*, \ldots, \pm x_n^*$, or multiples of these indeterminates by $\pm\sqrt{-1}$. The matrix representation of orthogonal designs for two transmitter antennas is:

$$OD(x, y) = \frac{1}{\sqrt{2}} \begin{pmatrix} x & -y^* \\ y & x^* \end{pmatrix} \qquad (15)$$

where x and y are subject to a power constraint. In order to have unitary matrices we can use the constraint that $|x|^2 = |y|^2 = 1$. The unitary constellations are then obtained by letting x,y be the Qth roots of unity, so $$V = \{OD(x,y) | x, y \in \{1, e^{2\pi i/Q}, \ldots, e^{2\pi i(Q-1)/Q}\}\}. \qquad (16)$$

These constellations do not generally form a group, but perform well as space-time block codes [5].

Nongroup Generalizations of $G_{m,r}$:

As shown in this section $G_{m,r}$ (Eq. 6) has a matrix representation of dimension n, where n is a function of m and r. We can try and relax the constraint on the elements of the matrices that form $G_{m,r}$ and look at the general case of the set $S_{m,s}$, consisting of the matrices $A^l B^k$ where $l=0, \ldots, m-1$, $k=0, \ldots, \min(s,n)$, $$A = \begin{pmatrix} \alpha^{u_1} & 0 & 0 & \cdots & 0 \\ 0 & \alpha^{u_2} & 0 & \cdots & 0 \\ 0 & 0 & \alpha^{u_3} & \cdots & 0 \\ \vdots & \vdots & \vdots & \ddots & \vdots \\ 0 & 0 & 0 & \cdots & \alpha^{u_n} \end{pmatrix}, B = \begin{pmatrix} 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \\ \beta & 0 & 0 & \cdots & 0 \end{pmatrix} \qquad (17)$$

where $\alpha, \beta$ are the primitive mth and sth roots of unity, and $u_1, \ldots, u_n$ are integers. Deeper analysis of these constellations can be found in [8].

Products of Group Representations:

Consider two fixed-point free groups $S_A$ and $S_B$ and their unitary M×M matrix representations $\{A_1, \ldots, A_{L_A}\}$ and $\{B_1, \ldots, B_{L_B}\}$, respectively. Now we look at the set of pairwise product $$S_{A,B} = \{A_j B_k | j=1, \ldots, L_A, k=1, L_B\}. \qquad (18)$$

$S_{A,B}$ has at most $L_A L_B$ distinct elements, and the constellation rate is at most $R = R_A + R_B$. The diversity product is then:

$$\zeta_s = \frac{1}{2} \min_{(j,k) \neq (j',k')} |\det(A_j B_k - A_{j'} B_{k'})|^{\frac{1}{M}}$$

$$= \frac{1}{2} \min_{(j,k) \neq (j',k')} |\det(A_{j'}^{-1}) \det(A_j B_k - A_{j'} B_{k'}) \det(B_k^{-1})|^{\frac{1}{M}}$$

$$= \frac{1}{2} \min_{(j,k) \neq (j',k')} |\det(A_{j'}^{-1} A_j - B_{k'} B_k^{-1})|^{\frac{1}{M}}$$

$$= \frac{1}{2} \min_{(l,l') \neq (0,0)} |\det(A_l - B_{l'})|^{\frac{1}{M}}$$

Notice that we use the fact that the determinant of the unitary matrix equals 1, and that $S_A$ and $S_B$ are groups. Finally, we see that even though $S_{A,B}$ is not a group, it has at most L−1, rather then L(L−1)/2, distinct pairwise distances. Therefore, it has a good chance of having full diversity. Deeper analysis of group products can be found in [8].

3.3. Projective Groups and Their Performances

In order to achieve high performance space-time coding we design a code that is based on unitary matrices that provide us with good diversity product values. One of the structure that we explore is the projective groups. A projective group is a collection of elements V that satisfies the property that if A,B∈V, then AB=αC where C∈V and α is a scalar. In other words, the product of every two elements in V, is also an element of V, multiplied by a scalar. Projective groups have a less strict requirement to satisfy for a collection of signal matrices, but can still maintain the decoding complexity criterion. This is because for differential space time modulation, the matrix multiplication can be replaced by a group lookup table. For example, $S_{a_1} S_{a_2} S_{a_3} S_{a_4} = \alpha_1 \alpha_2 \alpha_3 S_{a_5}$.

We design a set of matrices that form a projective group by the following construction: let α,β be some non rational numbers, and let $\zeta = e^{2\pi i/3}$. The elements of the projective group $P_{\alpha,\beta,3}$ are given by $A^i B^j$ where j=0, 1, 2, i=0, 1, 2 and $$B = \begin{pmatrix} 0 & 1 & 1 \\ 0 & 0 & 1 \\ \beta & 0 & 0 \end{pmatrix}, A = \begin{pmatrix} \sqrt[3]{\alpha} & 0 & 0 \\ 0 & \zeta\sqrt[3]{\alpha} & 0 \\ 0 & 0 & \zeta^2\sqrt[3]{\alpha} \end{pmatrix}.$$

The relation between α,β and the diversity product ζ seems to be chaotic. Some of the diversity products for different α and β are given in the following table. In this table. R is the transmission rate, L is the size of the group, M is the number of transmitting antennas and ζ is the diversity product.

| R | L | M | ζ | Group structures |
|---|---|---|---|---|
| 1.06 | 9 | 3 | 0.3971 | $P_{\alpha,\beta,3}$ with $\alpha = e^{2\pi i/5}, \beta = e^{2\pi i/11}$ |
| 1.06 | 9 | 3 | 0.4273 | $P_{\alpha,\beta,3}$ with $\alpha = e^{2\pi i/6}, \beta = e^{2\pi i/32}$ |
| 1 | 4 | 2 | 0.3741 | $P_{\alpha,\beta,2}$ with $\alpha = e^{2\pi i/5}, \beta = e^{2\pi i/7}$ |
| 1 | 4 | 2 | 0.7053 | $P_{\alpha,\beta,2}$ with $\alpha = e^{2\pi i/42}, \beta = e^{2\pi i/90}$ |

4. Extensions of the Quaternion Groups—New STBC

This section presents new STBC codes, that are based on extensions of the quaternion groups and the performance of STBC, both for known and unknown channels.

4.1. Super Quaternion Sets

When we examine the diversity product of the matrices in the constellations that form a group with respect to matrix multiplication, we realize that the performance of the quaternion group outperforms other structures. This fact led us to search extended sets of quaternion that have more elements while preserving a high diversity product. We may lose the group structure in this construction. However, if we think of the diversity product as the minimum distance between the elements of the constellation, we can design a structure where the elements are "well-spaced", in the sense that the distance between every two elements is sufficiently big.

We begin with 2×2 matrix representation of the quaternion group $Q_2$. It has eight elements. The transmission rate is $R = \log_2 \sqrt[8]{2}$ and the diversity product is $\zeta_{Q_2} = 0.7071$. The group is constructed from the set of matrices ±1, ±$Q_i$, ±$Q_j$, ±$Q_k$ where:

$$1 = \begin{pmatrix} 1 & 0 \\ 0 & 1 \end{pmatrix} Q_i = \begin{pmatrix} 0 & 1 \\ -1 & 0 \end{pmatrix} Q_j = \begin{pmatrix} i & 0 \\ 0 & -i \end{pmatrix} Q_k = \begin{pmatrix} 0 & -i \\ -i & 0 \end{pmatrix}.$$

We now define the super-quaternion of $Q_2$ with n layers (explained later), for matrices of degree 2, as a set of all linear combinations of the matrices $Q_i$ that satisfy:

$$S_{Q_2,n,2} = \left\{ \frac{x_1 Q_i + x_2 Q_j + x_3 Q_k + x_4 Q_l}{\sqrt{x_1^2 + x_2^2 + x_3^2 + x_4^2}} \middle| \begin{array}{c} 0 < x_1^2 + x_2^2 + x_3^2 + x_4^2 \leq n, \\ x_i \in Z \end{array} \right\}. \quad (19)$$

The matrices in $S_{Q_2,n,2}$ are unitary. Indeed, if q is a linear combination of matrices in $Q_2$, $q = x_1 Q_i + x_2 Q_j + x_3 Q_k + x_4 Q_l$, and $\bar{q}$ is the conjugate matrix, $\bar{q} = x_1 Q_i - x_2 Q_j - x_3 Q_k - x_4 Q_l$ then $q\bar{q} = \|q\|^2 = (x_1^2 + x_2^2 + x_3^2 + x_4^2) Q_i = kI$. Therefore, all the elements in $S_{Q_2,n,2}$ are normalized by $1/\sqrt{k}$ and they become unitary matrices.

Super-quaternions are constructed by Layers. Assume that the quaternion group $Q_p$ has a matrix representation of m×m matrices. Let $S_{Q_p,n,m}$ be the collection of m×m matrices, which are all linear combinations of the matrices in $Q_p$, where the coefficients of the matrices are all integers and the sum of square roots of them is at most n. Then, $S_{Q_p,n,m}$ is written as a sequence of the layers $$\bigcup_{i=1}^{n} L_i, \text{ where}$$

$$L_i = \left\{ \sum_{s=1}^{2^p} \frac{x_s Q_s}{\sqrt{i}} \middle| \sum_{s=1}^{2^p} x_s^2 = i, x_s \in Z \right\}. \quad (20)$$

When p=2 and m=2 then $S_{Q_2,n,2}$ is a special case of this family. In this case, the set is the union of the layers $L_1, \ldots, L_n$. $L_i$ is the set of all linear combinations of the matrices in $Q_2$, where the coefficients $x_i$ are integers that satisfy $$x_1^2 + x_2^2 + x_3^2 + x_4^2 = 1. \quad (21)$$

In this case, $L_1$ is $Q_2$ in Eq. 2 and it has eight elements. The calculation of the number of elements in each layer (which is the number of solutions to EQ. 21), shows that $|L_2|=24$, $|L_3|=32$, $|L_4|=24$, etc.

By examining the layers $L_i$ of the super quaternion, we observe that in some cases the same matrix element can exist in more than one layer. If $(x_1, \ldots, x_n)$ is in layer $L_i$, then $(\alpha x_1, \alpha x_2, \ldots, \alpha x_n)$ must be in layer $L_{\alpha^2 i}$, and since the elements are normalized, the matrices are equal. Therefore, for α>1 we have $L_i \subseteq L_{\alpha^2 i}$. For example, the element $Q_a \in L_1$ (the solution (1,0,0,0)), is equal to element $2Q_a/\sqrt{4} \in L_4$ (the solution (2,0,0, 0)). To eliminate the duplicate elements, we have to reduce these solutions in order to calculate correctly $S_{Q_2,n,2}$ and its diversity product (gcd of all $x_i$ is 1).

The Quaternion is a division algebra over R defined by $D = \{a + b\hat{i} + c\hat{j} + d\hat{k} | a,b,c,d \in R\}$, where the product of elements in D is defined by $\hat{i}\hat{j} = -\hat{j}\hat{i} = \hat{k}$, $\hat{i}^2 = -1$. Define $f: D \rightarrow M_2$ such that f is a ring homomorphism from D to $M_2$, where $M_2$ is a set of 2×2 matrices over the complex field:

$$f(a + b\hat{i} + c\hat{j} + d\hat{k}) = a \cdot 1 + bQ_i + cQ_j + dQ_k.$$

If we define the $M_2$ norm as determinant, then it is easy to see that f is a homomoiphism. Since D is a division algebra every element in D is invertible, so D has no two sided ideals. This means that f is either an injection or the trivial zero transform (which it is obviously is not). Since f is an injection, all the matrices in its image are regular and furthermore the difference between any two matrices in $M_2$ is also regular. In other words, we construct a full diversity STBC code for two transmit elements.

4.2. Super Quaternion Diversity

In this section we present the diversity of the Super Quaternion structure. First we calculate the diversity of the commonly used orthogonal design for comparison. For each couple of constellation symbols $S_1, S_2$ we transmit the matrix $$C_{S_1 S_2} = \begin{pmatrix} S_1 & S_2 \\ -S_2^* & S_1^* \end{pmatrix}.$$

The diversity is defined by $$\zeta = \frac{1}{2} \mindet(C_{S_1 S_2} - C_{S_1' S_2'}) \Big|^{\frac{1}{m}} = \frac{1}{2} \min\sqrt{|S_1 - S_1'|^2 + |S_2 - S_2'|^2}$$

where the min is over all the codewords $C_{S_1 S_2}$ and $C_{S_1' S_2'}$. Without loss of generality, we can assume that $S_1 \neq S_1'$. In this case, we minimize the expression above by choosing $S_2 = S_2'$. We can write $\zeta$ as:

$$\zeta = \qquad (22)$$
$$\frac{1}{2}\min|S_1 - S_1'| = \frac{1}{2}\min|(S_1 - S_1')S_1^*/|S_1\|| = \frac{1}{2}\min\||S_1|^2 - S_1'S_1^*/|S_1\||.$$

$$\text{Let } S_1 = \frac{1}{\sqrt{2}} e^{2k\pi i/n}, S_1' = \frac{1}{\sqrt{2}} e^{2k'\pi i/n}$$

for n-PSK code (the normalization by $1/\sqrt{2}$ aims to maintain transmit power of 1).

$$\zeta = \frac{1}{2}\min_{k \neq k'} \frac{1}{\sqrt{2}} |1 - e^{2(k'-k)\pi i/n}|. \qquad (23)$$

$$|1 - e^{2(k'-k)\pi i/n}|^2 = |1 - e^{2k''\pi i/n}|^2 \qquad (24)$$
$$= (1 - \cos(2k''\pi/n))^2 + (\sin(2k''\pi/n))^2$$
$$= 2(1 - \cos(2k''\pi/n)) = 4\sin^2(k''\pi/n).$$

Substituting EQ. 24 in EQ. 23 we have $$\zeta = \frac{1}{2}\min_{k \neq k'} \frac{1}{\sqrt{2}} |1 - e^{2(k'-k)\pi i/n}| = \frac{1}{2}\min_{k'' \neq 0} \frac{1}{\sqrt{2}} |2\sin(k''\pi/n)|$$
$$= \frac{1}{\sqrt{2}} \min_{k'' \neq 0} |\sin(k''\pi/n)| = \frac{1}{\sqrt{2}} \sin(\pi/n).$$

The following table summarizes the diversity of some of the quaternion structures: In this table, R is the transmission rate, L is the size of the constellation, M is the number of antennas and $\zeta$ is the diversity product.

| R | L | M | $\zeta$ | Group structure |
|---|---|---|---|---|
| 1.5 | 8 | 2 | 0.7071 | $Q_2$ |
| 2.5 | 32 | 2 | 0.3827 | $S_{Q_2,2,2}$ |
| 3 | 64 | 2 | 0.3029 | $S_{Q_2,3,2}$ |
| 3.161 | 80 | 2 | 0.2588 | $S_{Q_2,4,2}$ |
| 3.5 | 128 | 2 | 0.1602 | $S_{Q_2,5,2}$ |
| 3.904 | 224 | 2 | 0.1602 | $S_{Q_2,6,2}$ |
| 4.085 | 288 | 2 | 0.1602 | $S_{Q_2,7,2} = S_{Q_2,8,2}$ |
| 4.292 | 384 | 2 | 0.1374 | $S_{Q_2,9,2}$ |
| 4.522 | 528 | 2 | 0.0709 | $S_{Q_2,10,2}$ |
| 2.5 | 32 | 2 | 0.4082 | $L_3$ |
| 2.29 | 24 | 2 | 0.5 | $L_2$ |
| 2.79 | 48 | 2 | 0.3827 | $Q_2 \cup L_2 \cup L_4$ |

For comparison, the quaternion groups $Q_2, Q_4$ and $Q_5$ diversity is shown in the following table:

| R | L | M | $\zeta$ | Group structure |
|---|---|---|---|---|
| 1.5 | 8 | 2 | 0.7071 | Quaternion group $Q_2$ |
| 2.5 | 32 | 2 | 0.1951 | Quaternion group $Q_4$ |
| 3 | 64 | 2 | 0.0951 | Quaternion group $Q_5$ |

Generally, the diversity decreases as the rate increases, as can be seen from the table above.

4.2.1. Quaternion Group Example

In $Q_2$ there are eight code words (eight matrices):

$$\begin{pmatrix} -1 & 0 \\ 0 & -1 \end{pmatrix}, \begin{pmatrix} -i & 0 \\ 0 & i \end{pmatrix}, \begin{pmatrix} 0 & -1 \\ 1 & 0 \end{pmatrix}, \begin{pmatrix} 0 & -i \\ -i & 0 \end{pmatrix}, \begin{pmatrix} 0 & i \\ i & 0 \end{pmatrix}, \begin{pmatrix} 0 & 1 \\ -1 & 0 \end{pmatrix},$$
$$\begin{pmatrix} i & 0 \\ 0 & -i \end{pmatrix}, \begin{pmatrix} 1 & 0 \\ 0 & 1 \end{pmatrix}.$$

The rate for this code is $\frac{1}{2} \log_2(8) = 1.5$ bits per channel use. The diversity of this code is $\zeta\{Q_2\} = 0.707$, which is equal to the diversity of Orthogonal Design [2] code for BPSK constellation that has a mere 1 bit per channel use rate.

Figure 5:
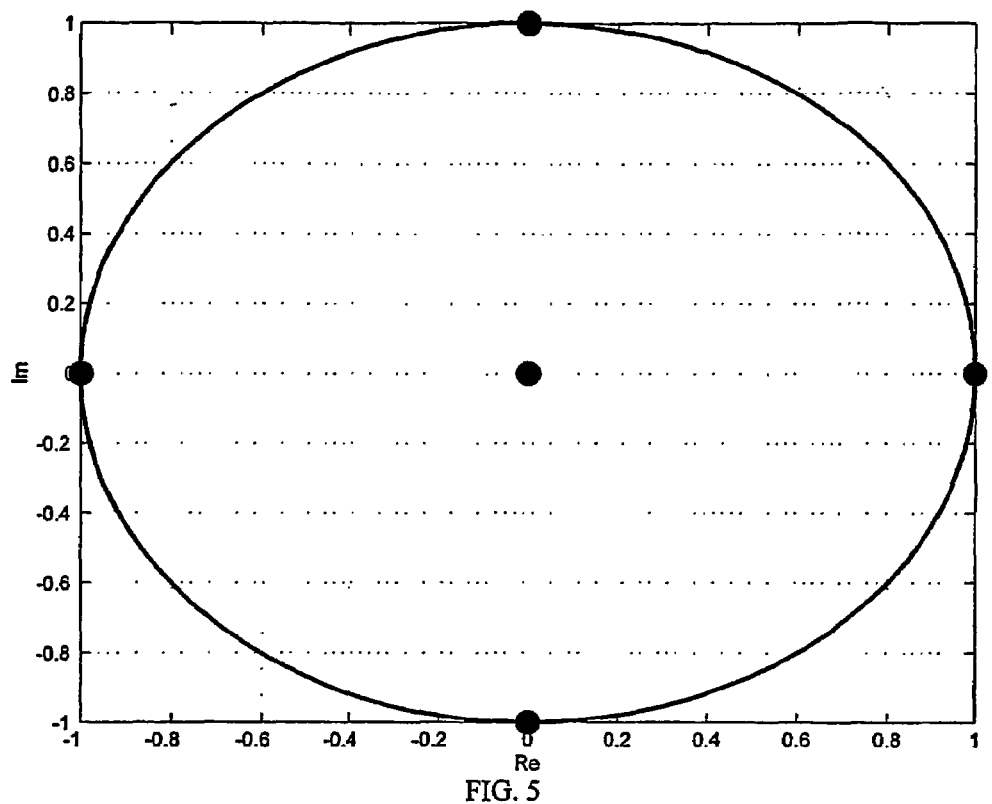
FIG. 5 is the constellation of the quaternion group $Q_2$.

FIG. 5 illustrates the Quaternion group constellation for rate 1.5.

4.2.2. Super Quaternion Set Example

Figure 6:
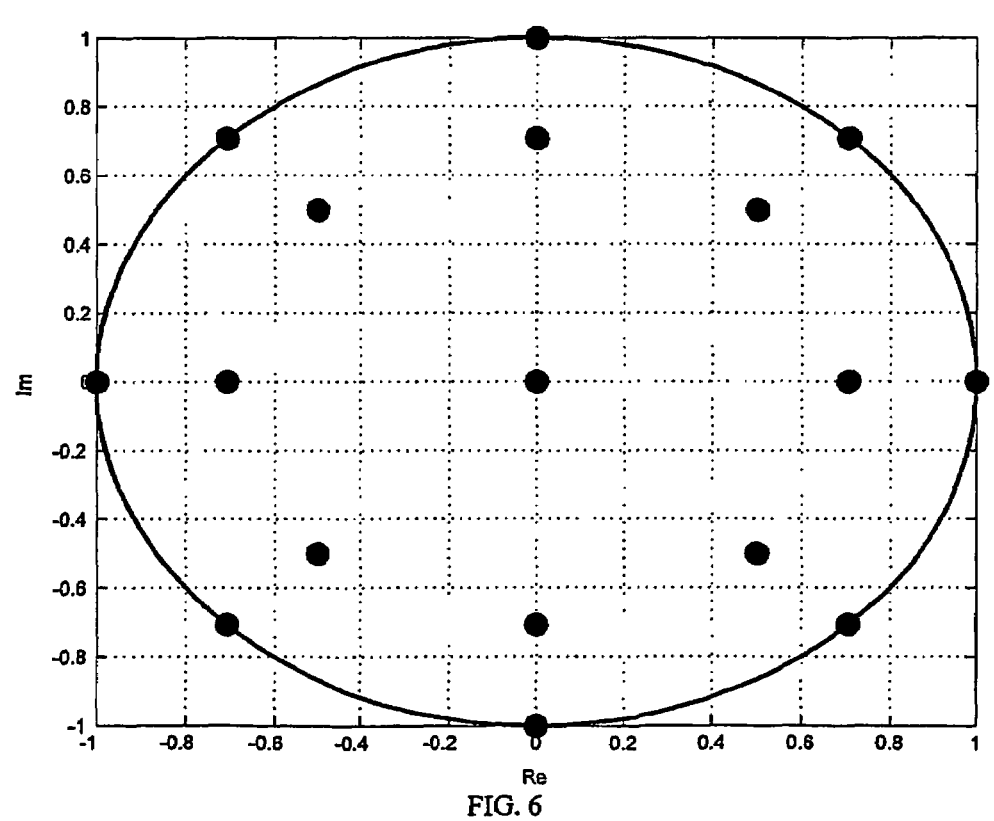
FIG. 6 is the constellation of the super-quaternion extension $Q_2 \cup L_2 \cup L_4$.

The Super Quaternion set $Q_2 \cup L_2 \cup L_4$ contains 48 code words. The rate of this code is 2.7925 and the code diversity is 0.3827. By applying Orthogonal Design to 6-PSK we get merely a 0.3536 diversity for a lesser rate of 2.585. FIG. 6 illustrates the corresponding constellation.

5. Fixed-Point-Free Groups

This section elaborates on the groups $G_{m,r}$ and $J_{m,r}$. We have chosen in the invention some of these groups, with the best performance and performed on them bit allocation. In some cases the groups were united with Super Quaternion codewords or some of the groups' members were removed in order to achieve optimal integral rate codes. Section 6 elaborates on methods to improve the performance of codes based on $G_{m,r}$ groups.

5.1. The $G_{m,r}$ Groups

Let $$G_{m,r} = \langle a, b : a^m = 1, b^n = a^t, bab^{-1} = a^r \rangle.$$

Since $$(bab^{-1})^r = ba^r b^{-1} = b(bab^{-1})b^{-1} \Rightarrow ba^r b^{-1} = b^{n+1}$$
$$ab^{-n-1} \Rightarrow a^{r^n} = b^n ab^{-n} = \Rightarrow a^{r^n} = a^t aa^{-t} \Rightarrow a^{r^n} = a.$$

We get the following restriction on r, n and m:

$$r^n \equiv (\bmod\, m). \tag{25}$$

Raising $a^r$ to the power of t we get:

$$ba^t b^{-1} = a^{rt} \Rightarrow bb^n b - 1 = a^{rt} \Rightarrow b^n = a^{rt} \Rightarrow a^t = a^{rt}.$$

Therefore, $$(r-1)t \equiv 1 (\bmod m)$$

$$t = \frac{m}{\gcd(m, r-1)} z, z \in Z. \tag{26}$$

To assure irreducible group we demand $$\gcd(n,t)=1. \tag{27}$$

We choose n such that n is the smallest integer that satisfies EQ. 25. We define z=1 in EQ. 26. The group is Fixed-Point-Free if all the prime divisors of n divide $\gcd(r-1,m)$ ([8]). The group $G_{mr}$ has mn elements because it contains the subgroup $<a>$ of order m and n distinct cosets:

$$G_{m,r} = \{a\} \cup \{a\}b \cup \ldots \cup \{a\}b^{n-1}.$$

There is an embedding $$L_G : G_{m,r} \to K_G$$

of $G_{m,r}$ in the division algebra $K_G$ defined as follows. Let K be the cyclotomic of by an m-th root of 1, $\zeta$, and $K_G$ the cyclic algebra defined by the relations $b^n = \zeta_m{}^t = \gamma$, $b\zeta_m b^{-1} = \sigma(\zeta_m)bb^{-1} = \zeta_m{}^r$.

$L_G$ is defined by the formulas $$L_G(a) = \zeta_m, L_G(b) = b.$$

We take $\zeta_m = e^{2\pi i/m}$.

A matrix representation of $K_G$:

$$\Pi : K_G \to M_n()$$

where $M_n$ is the algebra of n×n matrices over is given by:

$$\prod(\xi_m) = \begin{pmatrix} \xi_m & 0 & 0 & \ldots & 0 \\ 0 & \xi_m^r & 0 & \ldots & 0 \\ 0 & 0 & \xi_m^{r^2} & \ldots & 0 \\ \vdots & \vdots & \vdots & \ddots & \vdots \\ 0 & 0 & 0 & \ldots & \xi_m^{r^{n-1}} \end{pmatrix}, \tag{28}$$

$$\prod(b) = \begin{pmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ \xi_m^t & 0 & 0 & \ldots & 0 \end{pmatrix}.$$

Explicitly, the element $a_0 + a_1 b + a_2 b^2 + \ldots + a_{n-1} b^{n-1}$ maps to $$\begin{pmatrix} a_0 & a_1 & a_2 & \ldots & a_{n-1} \\ \gamma\sigma(a_{n-1}) & \sigma(a_0) & \sigma(a_1) & \ldots & \sigma(a_{n-2}) \\ \gamma\sigma^2(a_{n-2}) & \gamma\sigma^2(a_{n-1}) & \sigma^2(a_0) & \ldots & \sigma^2(a_{n-3}) \\ \ldots & \ldots & \ldots & \ldots & \ldots \\ \gamma\sigma^{n-1}(a_1) & \gamma\sigma^{n-1}(a_2) & \gamma\sigma^{n-1}(a_3) & \ldots & \sigma^{n-1}(a_{n-2}) \end{pmatrix}$$

The element '1' is transformed to the identity matrix $I_{n \times n}$. All the matrices in this representation are unitary and therefore this code can be implemented for unknown channels as well as for known channels.

5.2. The $J_{m,r}$ Groups

We present here a specific fixed point group with exceedingly good performance which are due to Amitsur ([13])

$$J_{m,r} = SL_2(F_5) \times G_{m,r} \tag{29}$$

where m,r are as in section 5.1, $\gcd(mn,120)=1$, and $SL_2(F_5)$ is the group of 2×2-matrices over $F_5$ with determinant 1. $SL_2(F_5)$ has a presentation $$SL_2(F_5) = \langle u, \gamma | \mu^2 = \gamma^3 = (\mu\gamma)^5, \mu^4 = 1 \rangle \tag{30}$$

The order of $J_{m,r}$ is 120mn.

We define the following matrix representation:

$$\Pi : J_{m,r} \to M_{2n}(F_5)$$

where $M_{2n}(F_5)$ is the set of 2n×2n-matrices over $F_5$.

$$\prod(\mu) = P = P_0 \otimes I_n, P_0 = \frac{1}{\sqrt{5}} \begin{pmatrix} \eta^2 - \eta^3 & \eta - \eta^4 \\ \eta - \eta^4 & \eta^3 - \eta^2 \end{pmatrix},$$

$$\prod(\gamma) = Q = Q_0 \otimes I_n, Q_0 = \frac{1}{\sqrt{5}} \begin{pmatrix} \eta - \eta^2 & \eta^2 - 1 \\ 1 - \eta^3 & \eta^4 - \eta^3 \end{pmatrix}$$

where $\eta = \zeta_5 = e^{2\pi i/5}$, $I_n$ is the n×n and $\otimes$ denotes the Kronecker product.

$$\prod(a) = A = I_2 \otimes \begin{pmatrix} \xi_m & 0 & 0 & \ldots & 0 \\ 0 & \xi_m^r & 0 & \ldots & 0 \\ 0 & 0 & \xi_m^{r^2} & \ldots & 0 \\ \vdots & \vdots & \vdots & \ddots & \vdots \\ 0 & 0 & 0 & \ldots & \xi_m^{r^{n-1}} \end{pmatrix}$$

$$\prod(b) = B = I_2 \otimes \begin{pmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ \xi_m^t & 0 & 0 & \ldots & 0 \end{pmatrix}$$

where $\zeta_m$ is defined in section 5.1. The constellation consists of the matrices $$A^s B^k (PQ)^j X, s=0,\ldots, m-1, k=0,\ldots, n-1, j=0,\ldots, 9$$

and $X \in \{I_{2n}, P, Q, QP, QPQ, QPQP, QPQ^2, QPQPQ, QPQPQ^2, QPQPQ^2P, QPQPQ^2PQ, QPQPQ^2PQP\}$.

Figure 13:
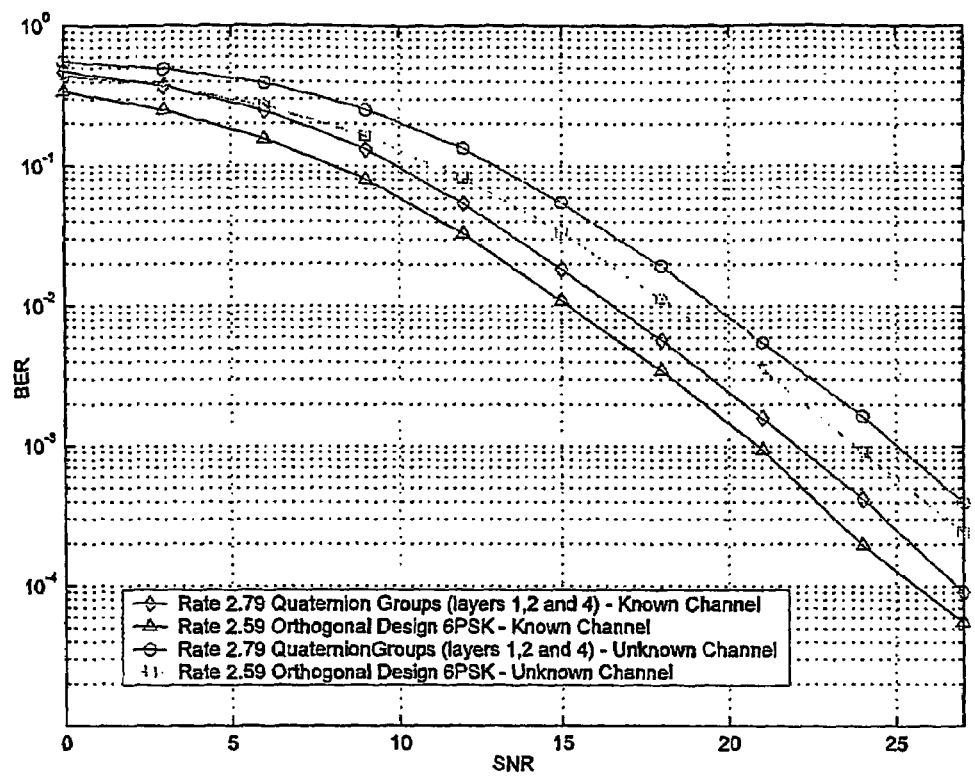

The smallest group of type $J_{m,r}$ is $J_{1,1}$, which is isomorphic to $SL_2(F_5)$, and has 120 elements (3.5 rate). This group is given by the matrices $(PQ)^j X$. This group has diversity of 0.3090 and exceeding performance in comparison to all other methodologies shown in this invention for rate 3.5 and 2-transmit diversity as shown in FIG. 13. In order to enable bit-allocation we extended the $J_{1,1}$ group to a 128-element set using Quaternion matrices from layers 2 and 3 (EQ. 20).

6. Cosets of Fixed-Point-Free Groups—New STBC

The basic idea in using cosets is that if we have a unitary matrix that has good diversity with a specific group, then this diversity will be preserved when taking the union of the group and the coset determined by this element. Indeed, if G is a group of unitary matrices, and h is a unitary matrix not in G, we can take the coset determined by h, i.e. all the elements of the form hg, where g ∈ G. If $|h-g|>d, \forall g \in G$, and the diversity of G is at least d, then we claim that this will be the diversity of the union. This is true since $$|hg_1 - hg_2| = |h||g_1 - g_2| = |g_1 - g_2| > d$$

and $$|hg_1 - g_2| = |(h - g_2 g_1^{-1})g_1| = |h - g_2 g_1^{-1}||g_1| > d.$$

We can now repeat this process, choosing a unitary matrix that has good diversity with the union already chosen. In fact, there are cases where it is advantageous to choose a pair of matrices simultaneously and add the cosets of both matrices. In this section we construct large sets of "unitary" elements in division algebras that are finite dimensional over Q. The construction will occur in "cyclic algebras" which we now describe. In Particular we will elaborate on the implementations of this method on the groups $G_{mr}$.

6.1. Cyclic algebras

Let K/k be a cyclic Galois extension of dimension n, so that its Galois group is cyclic of order n. Let σ be a generator of the Galois group. Assume that $0 \neq \gamma \in k$. The cyclic algebra associated with this data is defined, as a left K vector space, as $$K \oplus Kb \oplus \ldots \oplus Kb^{n-1}.$$

The multiplication is be defined by the following equations $$b^n = \gamma$$

$$ba = \sigma(a)b \; \forall a \in K$$

We will denote such an algebra as $(K/k, \gamma)$.

Let m,r be relatively prime integers, and let n be the order of r in the multiplicative group $(Z/(m))^*$. Let $s=(r-1,m)$ and $t=m/s$. Suppose that $(n,t)=1$ and $n|s$. We can now define a central simple algebra over Q. This algebra is constructed by taking the cyclotomic extension, K, generated by the roots of unity of order m. The Galois group of this extension is the multiplicative group $(Z/(m))$, and r defines a cyclic subgroup of order n in the Galois group, whose generator is an automorphism, σ, which raises roots of unity to the $r^{th}$ power. The center of our algebra will be the fixed subfield of this automorphism, k, and σ is a generator of the Galois group of the extension K/k. Let ζ be a primitive root of unity of order m, and denote $\gamma = \zeta^t$. The algebra is defined as the cyclic algebra $A_{m,r} = (K/k, \gamma)$. For certain values of m,r, $A_{m,r}$ is a division algebra, for instance (m,r)=(21,4). The precise conditions are quite complicated, and are spelled out completely by Amitsur [13].

There is a natural embedding of this algebra in $M_n()$, which comes from the regular representation of the algebra as a left vector space of dimension n over K. Explicitly, the element $a_0 + a_1 b + a_2 b^2 + \ldots + a_{n-1} b^{n-1}$ maps to $$\begin{pmatrix} a_0 & a_1 & a_2 & \ldots & a_{n-1} \\ \gamma\sigma(a_{n-1}) & \sigma(a_0) & \sigma(a_1) & \ldots & \sigma(a_{n-2}) \\ \gamma\sigma^2(a_{n-2}) & \gamma\sigma^2(a_{n-1}) & \sigma^2(a_0) & \ldots & \sigma^2(a_{n-3}) \\ \vdots & \vdots & \vdots & \ddots & \vdots \\ \gamma\sigma^{n-1}(a_1) & \gamma\sigma^{n-1}(a_2) & \gamma\sigma^{n-1}(a_3) & \ldots & \sigma^{n-1}(a_0) \end{pmatrix}$$

A quick check shows that all the fixed-point-free groups of type $G_{m,r}$ can be embedded into $A_{m,r}$ so we will be looking for "unitary" elements in

6.2. Finding Unitary Elements in Cyclic Algebras

In order to find "unitary" elements in $A_{m,r}$ we define an anti-automorphism, τ, of the algebra, which corresponds to taking the conjugate transpose of a matrix. The "unitary" elements will be those such that $\tau(x) = x^{-1}$. The field k will be invariant under τ. Thus, it is enough to define τ on a primitive root of unity, and we take $\tau(\zeta) = \zeta^{-1}$. This is simply the restriction of complex conjugation to K under a fixed embedding of K in C. It remains to define τ on b, and since b should be unitary, we must have $\tau(b) = b^{-1} = \gamma^{-1} b^{n-1}$. From the requirement that τ be an anti-automorphism, this defines τ completely, and it is easy to see that it is well defined. Note that $\tau^2 = \text{id}$.

We are now in a position to find many unitary n X n matrices that have positive diversity, since all the elements we find will be in a division algebra. In fact, we will need to divide by square roots. If n is odd, then adding a square root cannot split the algebra, hence we will still have a division algebra.

When looking for unitary elements, we are looking for $$x = \sum_{i=0}^{n-1} a_i b^i$$

Note that $$\tau(x) = \tau(a_0) + \sum_{i=1}^{n-1} \gamma^{-1} \sigma^i(\tau(a_{n-i})) b^i.$$

Now, we require $x\tau(x) = 1$. If $z = x\tau(x)$ then let $$z = \sum_{i=0}^{n-1} \alpha_i b^i.$$

It is easy to see that $\tau(z) = z$ so we get $\alpha_0 = \tau(a_0)$ and $\alpha_i = \gamma^{-1} \sigma_i(\tau(\alpha_{n-i}))$. For instance, if n=3, the equation $x\tau(x)=1$ is really just two (and not three) equations, because if $\alpha_1 = 0$ then automatically $\alpha_2 = 0$.

Continuing with the case n=3, let us consider the case where $a_0$, $a_1$ are known, and are in our extended algebra. In this case we get $$x\tau(x) = (a_0 + a_1 b + a_2 b^2)(\tau(a_0) + \gamma^{-1}\sigma(\tau(a_2))b + \gamma^{-1}\sigma^2(\tau(a_1))b^2) = (a_0\tau(a_0) + a_1\tau(a_1) + a_2\tau(a_2)) + (\gamma^{-1}a_0\sigma(\tau(a_2)) + a_1\sigma(\tau(a_0)) + \gamma^{-1}\sigma(\tau(a_1)a_2))b + a_2 b^2$$

so there are really only two equations, the second of which is of the form $$\alpha\sigma(\tau(a_2))+\beta a_2=\delta$$

where $\alpha=\gamma^{-1}a_0$, $\beta=\gamma^{-1}\sigma(\tau(a_1))$, $\delta=-a_1\sigma(\tau(a_0))$, and in particular $\alpha,\beta,\delta \in K$.

Since K is a vector space over Q of dimension $\phi(m)$, we get $\phi(m)$ linear equations in the $\phi(m)$ coordinates of $a_2$ as an element in K.

Thus, given $a_0, a_1 \in K$, we check if there are solutions to the linear set of equations. For each solution, $a_2$, we calculate $$a_0\tau(a_0)+a_1\tau(a_1)+a_2\tau(a_2)=s(a_0,a_1,a_2)\in K.$$

We divide all three values by $\sqrt{s(a_0,a_1,a_2)}$, to get a unitary matrix. Note, that to calculate $\sigma(\sqrt{s})$ we can simply take $\sqrt{\sigma(s)}$.

If $a_0, a_1$ are rational, it can be seen that if $a_0^2 \neq a_1^2$ then there is a solution. Indeed, if we set $a_2=x\gamma+y\gamma^{-1}$, we have $\sigma(a_2)=a_2$ and $\tau(a_2)=y\gamma+x\gamma^{-1}$. The equation becomes $$\gamma^{-1}a_0(y\gamma+x\gamma^{-1})+\gamma^{-1}a_1(x\gamma+y\gamma^{-1})=-a_0a_1.$$

Thus, we have in fact two equations $a_0y+a_1x=-a_0a_1$ and $a_1y+a_0x=0$. There is one $$x=\frac{a_0a_1^2}{a_0^2-a_1^2}, \quad y=-\frac{a_0^2a_1}{a_0^2-a_1^2}.$$

6.3. Finding Elements for Cosets

The following refers to trying to find a good coset extension of some $G_{m,r}$ group, which has n=3 (i.e. describes 3×3 matrices). Using the terminology above, we know that there is an infinite number of unitary matrices we can try, simply by taking $a_0, a_1$ to be rational. In fact, if we take $a_0=1$ and $a_1$ very small, we will get a unitary matrix that is very close to being the identity. This gives us the ability to make small "changes" to elements of the algebra.

We can now describe two different methods for trying to find cosets. In the first method, we construct a number of elements of the algebra in the way described above. We then simply take random multiplications of these elements. For each new element we get we check the diversity against the set of matrices we have so far. It is easy to see that this will be the diversity of the entire coset. We do this many times, and choose the coset that has the best diversity.

The second method is to construct a set of matrices that are close to the identity. One way to do this is to take $a_1=1$, and for each basis element of K over Q and each of the three elements of the first row of the matrix, we add a small rational multiple of this basis element. We can decrease this multiple as we go along, so that we make smaller and smaller changes. If we have a set of matrices, and a trial matrix, we try changing it "slightly" in all the directions, and take the best one. If we can no longer improve, we decrease the multiple and try again. We can also try to add two or more cosets at a time, and try changes in one or more of the matrices. So far, when attempting to add two cosets, the best method seems to be taking two additional elements and trying to change both of them slowly.

The following refers to trying to find a coset extension of some $G_{m,r}$ group, which has n=3 (i.e. describes 3×3 matrices). This fixed-point-free group resides in a cyclic algebra, which has the following structure. Take F to be the cyclotomic extension of the rationals by the roots of unity of order m. Let $\zeta$ be a primitive root of unity of order m, and we can assume that $r^3=1$ modulo m (n=3). Thus, we can also assume that 3 divides m, and we set s=gcd(m,r−1), t=m/s. We now define the cyclic algebra A over F by adjoining an element b such that $b^3=\zeta^t$. The fixed-point-free group will be the group generated by $\zeta$ and b, and will be of order 3m. When we want to take cosets of the group, we would like to find some more unitary elements in the algebra (since when the algebra is a division ring, we know that the diversity will remain non-zero). In order to do so, we simply check what will have a unitary image. Any element of the algebra will be defined by 3 elements in F, $a_1, a_2, a_3$. They define the matrix $$\begin{pmatrix} a_1 & a_2 & a_3 \\ \gamma\sigma(a_3) & \sigma(a_1) & \sigma(a_2) \\ \gamma\sigma^2(a_2) & \gamma\sigma^2(a_3) & \sigma^2(a_1) \end{pmatrix}$$

where $\gamma=\zeta^t$ and $\sigma$ is the Galois automorphism of F over the rationals. For such a matrix to be unitary we need that each row has absolute value (as complex numbers) 1, and that each pair of rows are orthogonal, in the sense that the dot product of row by the complex conjugate of the other row is zero. A simple calculation shows that in the matrices given above, it is enough to check the absolute value of the first row, and whether the first two rows are orthogonal (note that this is true only for 3×3 matrices. If n is larger, there are conditions that need to be met). Note, that if we have a matrix where the two first rows are orthogonal, but the absolute value is k, then we can always divide the first row by the square root of k, the second row by the square root of $\sigma(k)$, and the last row by the square root of $\sigma^2(k)$. Note that adjoining these square roots to F cannot split the algebra, since if is of odd degree over F. Suppose now that we give $a_1$ and $a_2$ some set values. The orthogonality condition becomes (note that $\sigma$ and the complex conjugate commute)

$$\bar{y}a_1\sigma(\overline{a_3})+\sigma(\overline{a_2})a_3=-a_2\sigma(\overline{a_1})$$

Since $a_1$ and $a_2$ are known, we get linear equations in $a_3$ and $\sigma(\overline{a_3})$. However, if we consider $a_3$ as a rational linear of the basis of F over the rationals, then both $a_3$ and $\sigma(\overline{a_3})$ are linear combinations of the coefficients. F is of dimension $\phi(m)$ over the rationals, and we get a set of $\phi(m)$ equations in $\phi(m)$ variables. If the equations are of full rank, then there will be exactly one solution. If they are not of full rank we might get no solutions. In the case where $a_1$ and $a_2$ are both rational, it is easily seen that if $a_1^2 \neq a_2^2$ then there is exactly one solution. This already shows us that there is an infinite number of unitary elements we can use, and in fact, if we take $a_1=1$ and $a_2$ very small, we will get a unitary matrix that is very close to being the identity. This gives us the ability to make small "changes" to elements of the algebra.

We can now describe two different methods for trying to find cosets. In the first method, we construct a number of elements of the algebra in the way described above. We then simply take random multiplications of these elements. For each new element we get we check the diversity against the set of matrices we have so far It is easy to see that this will be the diversity of the entire coset. We do this many times, and choose the coset that has the best diversity.

The second method is to construct a set of matrices that are close to the identity. One way to do this is to take $a_1=1$, and for each basis element of F over the rationals and each of the three elements of the first row of the matrix, we add a small multiple of this basis element. We can decrease this multiple as we go along, so that we make smaller and smaller changes. If we have a set of matrices, and a trial matrix, we try changing it "slightly" in all the directions, and take the best one. If we can no longer improve, we decrease the multiple and try again. We can also try to add two or more cosets at a time, and try changes in one or more of the matrices. So far, when needing three cosets in total (including the original group) the best method seems to be taking two additional elements and trying to change both of them slowly.

6.4. Results of Coset Search

When attempting to find a good set of 512 3×3 unitary matrices, using the $G_{m,r}$ groups, the best diversity we can get is 0.184, for m=186,r=25 (there are actually 558 matrices, but for practical purposes it is often best to take a power of 2 number of matrices). However, when taking m=63,r=37 and adjoining two additional cosets (using the second method mentioned above, adding both cosets at the same time), we achieved a diversity of 0.224. When running simulations of error rates compared to SNR, we see that around an error rate of $10^{-2}$, the new set has an SNR that is better by almost 1 db than the best $G_{m,r}$ group.

7. Bit Allocation

An important issue in any code constellation (higher than 2) is the bit allocation. Bit allocation is the look-up table that assigns bits to symbols. In codes with integral rate, i.e. codes that have $2^n$ code words (i.e. the code rate is an integer number), the bit allocation is simple. In MIMO channels, if the rate is N (m is the transmit diversity), we can still allocate bits for each symbol using look-up table, because each matrix includes m channel uses. In order to take better advantage of the rate, for other rates, we have to allocate bits for sequences of symbols. This allocation may result in a very high complexity. In this work we will limit ourselves to an integral rate bit allocation.

In cases we would use codes with not integral rates, the allocation is made by maximizing the diversity over the maximal subgroup of code words that has an integral rate. For example the Super Quaternion structure $S_{Q_2,8,2}$ has 288 code words. By selecting 256 code words we create an integral rate(4) code with improved performance.

Consider a code with $2^n$ code words and rate n/m. First we calculate the BER from the FRAME ERROR if we choose a random bit allocation. Assume we have mistakenly reconstructed in the receiver a code word e, while c was transmitted. Since the bit allocation was randomly chosen, we can calculate the average number of bits interpreted wrongly by $$E\{c \; XOR \; e \mid c \neq e\} =$$

$$E\{c \; XOR \; e \mid c \; XOR \; e \geq 1\} = \frac{2^n n}{2(2^n-1)} = \frac{n}{2} + \frac{n}{2(2^n-1)}.$$

It follows that for random bit allocation the ratio between BER and FER(Frame Error Rate) is $$\frac{1}{2}\left(1 + \frac{1}{2^n-1}\right).$$

However in channels with small noise most of the errors occur due to reconstruction of symbols, which are close to the transmitted original. If the bit allocation is optimally made, close symbols will differ by minimal number of bits (merely a single bit if possible) and at high SNR the ratio between BER and FER will be approximately 1/n. Thus, we can reach the same BER as in random bit allocation with lower SNR (adjusted for FER higher by $$\frac{n}{2}\left(1 + \frac{1}{2^n-1}\right).$$

Figure 7:
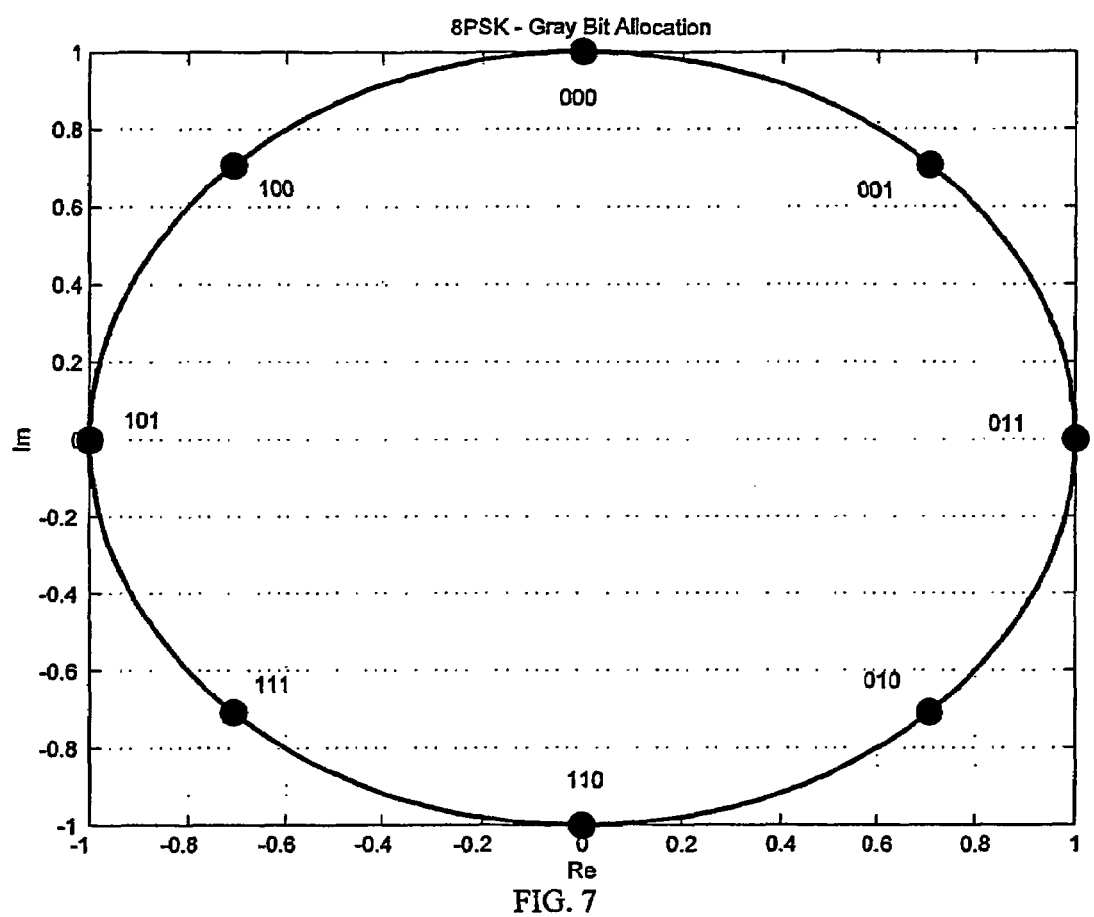
FIG. 7 is an example of bit allocation for an 8PSK gray code.

FIG. 7 shows an example for Gray-code allocation for 8PSK constellation, which preserves a single bit difference between neighboring symbols. The significance of bit allocation can be seen in FIGS. 9 and 12.

8. Rate Bound for 2-Transmit Diversity and Exhaustive Search

This section presents general bounds for 2-transmit diversity both for the case of orthogonal design and the specific case of unitary design.

8.1. Isometry to $R^4$

Let $M_2$ be a set of orthogonal matrices of the form $$m_2 = \begin{pmatrix} S_1 & S_2 \\ -S_2^* & S_1^* \end{pmatrix}$$

for each $m_2 \in M_2$ where $S_1$, $S_2$ are some complex symbols.

We define the following isometry $$g: M_2 \to R^4 \quad (31)$$

Let $$m_2 = \begin{pmatrix} S_1 & S_2 \\ -S_2^* & S_1^* \end{pmatrix}$$

where $S_1 = a+bi$ and $S_2 = c+di$. Then $g(m_2)=(a,b,c,d)$. It is easy to see that g is an isometry if we define the distance between two matrices $m_2$, $m_2'$ in $M_2$ to be $$d(m_2, m_2') = \frac{1}{2}\sqrt{\det(|m_2 - m_2'|)} \quad (32)$$

and the distance between two vectors in $R^4$ to be half the Euclidian distance:

$$d((a,b,c,d),(a',b',c',d')) = \frac{1}{2}\sqrt{\begin{array}{l}(a-a')^2 + (b-b')^2 + \\ (c-c')^2 + (d-d')^2\end{array}}. \quad (33)$$

The minimal distance among the matrices in $M_2$, according to EQ. 32 is the diversity of $M_2$ by definition.

8.2. Orthogonal Design

Assume we have a set of n vectors $\{(a_i,b_i,c_i,d_i)\}_{i=1}^n$ with minimal distance (diversity) $\zeta$, and maximal norm (distance from (0,0,0,0)) A. What is the relation among the parameters n, $\zeta$ and A?

Every vector $\{(a_i,b_i,c_i,d_i)\}$ is surrounded by a 4-dimensional sphere with radius $\zeta/2$ that does not have other vectors. The volume of this sphere is $$\iiint_{w^2+x^2+y^2+z^2\leq \zeta^2} dw\,dx\,dy\,dz =$$

$$\int_{R^2+z^2=\zeta^2} \frac{4\pi}{3} R^3 \, dz = \int_{z=-\zeta}^{+\zeta} \frac{4\pi}{3} (\zeta-z^2)^{\frac{1}{2}} dz$$

Define $z \triangleq \zeta \cos\theta$, $dz \triangleq -\zeta \sin\theta\, d\theta$. Then $$\int_{z=-\zeta}^{+\zeta} \frac{4\pi}{3}(\zeta-z^2)^{\frac{3}{2}} dz = \tag{34}$$

$$\int_{-\pi}^{0} \frac{4\pi}{3} |\zeta^3 \sin^3\theta|(-\zeta\sin\theta)\,d\theta = \int_{-\pi}^{0} \frac{4\pi}{3} \zeta^4 \sin^4\theta\, d\theta =$$

$$\int_{-\pi}^{0} \frac{4\pi}{3} \zeta^4 \left(\sin^2\theta - \frac{1}{4}\sin^2 2\theta\right) d\theta = \frac{4\pi}{3}\zeta^4\left(\frac{1}{2}\pi - \frac{1}{8}\pi\right) = \frac{\pi^2}{2}\zeta^4.$$

Since all the vectors have at most norm A, all the spheres that are defined in EQ. 34 are confined within the sphere with radius A+$\zeta$/2, which has the volume $$\frac{\pi^2}{2}(2A+\zeta)^4. \tag{35}$$

It follows that $$n \leq \frac{\frac{\pi^2}{2}(2A+\zeta)^4}{\frac{\pi^2}{2}\zeta^4} = \left(\frac{2A+\zeta}{\zeta}\right)^4.$$

Given a maximal transmit power of a matrix in $M_2$, i.e. max$\{\det(m_2)|m_2 \in M_2\}$=P, and a minimal diversity $\zeta$, the maximal number of matrices in $M_2$ is $$n \leq \left(\frac{\sqrt{P}+\zeta}{\zeta}\right)^4 \tag{36}$$

and the maximal rate is $$R_{max} \leq 2(\log_2(\sqrt{P}+\zeta) - \log_2(\zeta)). \tag{37}$$

8.3. Unitary Design

For unitary matrices a tighter bound can be found. Since unitary matrices have determinant 1, the isometry of a unitary set of matrices to R, is equivalent to placing vectors on the envelope of a 4-dimensional sphere, whose volume is given by EQ. 34. The 'area' of this envelope is $$\frac{d}{dx}\left(\frac{\pi^2}{2}x^4\right)_{x=1} = 2\pi^2 \tag{38}$$

In order to calculate the free space around each vector on the envelope of the four dimensional sphere we change variables:

$$x \triangleq R\cos(\gamma)\cos(\theta)\cos(\varphi) \tag{39}$$

$$y \triangleq R\cos(\gamma)\cos(\theta)\sin(\varphi)$$

$$z \triangleq R\cos(\gamma)\sin(\theta)$$

$$w \triangleq R\sin(\gamma).$$

The absolute value of the Jacobian of these variables is:

$$\begin{vmatrix} \cos(\gamma)\cos(\theta)\cos(\varphi) & \cos(\gamma)\cos(\theta)\sin(\varphi) & \cos(\gamma)\sin(\theta) & \sin(\gamma) \\ -R\sin(\gamma)\cos(\theta)\cos(\varphi) & -R\sin(\gamma)\cos(\theta)\sin(\varphi) & -R\sin(\gamma)\sin(\theta) & R\cos(\gamma) \\ -R\cos(\gamma)\sin(\theta)\cos(\varphi) & -R\cos(\gamma)\sin(\theta)\sin(\varphi) & R\cos(\gamma)\cos(\theta) & 0 \\ R\cos(\gamma)\cos(\theta)\sin(\varphi) & -R\cos(\gamma)\cos(\theta)\cos(\varphi) & 0 & 0 \end{vmatrix} = R^3 \cos^2(\gamma)\cos(\theta) \tag{40}$$

Without loss of generality we calculate the free space around the vector $\vec{r}_0 = (w_0, x_0, y_0, z_0)$, (equivalently defined by $R_0, \gamma_0, \theta_0$ and $\phi_0$) on the w axis, i.e.:

$$w_0 = 1, \; x_0 = y_0 = z_0 = 0$$

or in our new coordinates:

$$R_0 = 1, \; \gamma_0 = \pi/2.$$

For diversity $\zeta$ we calculate the free three-dimensional area around $\vec{r}_0$ by integrating over the envelope of the sphere and over the vectors within distance smaller than $\zeta/2$ (by saying distance we mean the definition in Eq. 3). The vector $\vec{r}$ on the sphere satisfies:

$$d(\vec{r}, \vec{r}_0) = \frac{1}{2}\sqrt{x^2 + y^2 + z^2 + (w-1)^2}$$

$$= \frac{1}{2}\sqrt{2-2w} = \frac{1}{2}\sqrt{2-2\sin(\gamma)}.$$

The free 'area' is therefore confined to $$d(\vec{r}, \vec{r}_0) = \frac{1}{2}\sqrt{2-2\sin(\gamma)} \leq \zeta/2 \sin(\gamma) \geq 1 - \frac{1}{2}\zeta^2 \gamma \geq \arcsin\left(1 - \frac{\zeta^2}{2}\right).$$

Now, we can calculate the free 'area' around $\vec{r}_0$:

$$\int\int\int_{d(\vec{r},\vec{r}_0)\leq\zeta/2} R^3\cos^2(\gamma)\cos(\theta)d\gamma d\theta d\varphi$$

$$=\int\int\int_{\gamma\geq\arcsin\left(1-\frac{\zeta^2}{2}\right)}\cos^2(\gamma)\cos(\theta)d\gamma d\theta d\varphi$$

$$=\int_0^{2\pi}d\varphi\int_{-\frac{pi}{2}}^{\frac{pi}{2}}\cos(\theta)d\theta\int_{\arcsin\left(1-\frac{\zeta^2}{2}\right)}^{\frac{pi}{2}}\cos^2(\gamma)d\gamma$$

$$=2\pi\cdot\sin(\theta)\Big|_{-\pi/2}^{\pi/2}\cdot\int_{\arcsin\left(1-\frac{\zeta^2}{2}\right)}^{\frac{pi}{2}}\left(\frac{1}{2}(1+\cos(2\gamma))\right)d\gamma$$

$$=2\pi\left[\frac{\pi}{2}-\arcsin\left(1-\frac{\zeta^2}{2}\right)-\frac{1}{2}\sin\left(2\arcsin\left(1-\frac{\zeta^2}{2}\right)\right)\right].$$

Using the identity:

$$\sin(2\arcsin x)=2\sin(\arcsin x)\cos(\arcsin x)=2x\sqrt{1-x^2}$$

we get that the free 'area' is:

$$\int\int\int d(\vec{r},\vec{r}_0)\leq\zeta/2 R^3\cos^2(\gamma)\cos(\theta)d\gamma d\theta d\varphi = \quad (41)$$

$$2\pi\left[\frac{\pi}{2}-\arcsin\left(1-\frac{\zeta^2}{2}\right)-\zeta\left(1-\frac{\zeta^2}{2}\right)\sqrt{1-\frac{\zeta^2}{4}}\right].$$

The size of a unitary constellation with diversity $\zeta$ according to EQS. 41 is smaller than $$n\leq\frac{\pi}{\frac{\pi}{2}-\arcsin\left(1-\frac{\zeta^2}{2}\right)-\zeta\left(1-\frac{\zeta^2}{2}\right)\sqrt{1-\frac{\zeta^2}{4}}}. \quad (42)$$

and the maximal rate is $$R_{max}\leq\frac{1}{2}\left(\begin{array}{c}\log_2(\pi)-\log_2\left(\frac{\pi}{2}-\arcsin\left(1-\frac{\zeta^2}{2}\right)-\right.\\ \left.\zeta\left(1-\frac{\zeta^2}{2}\right)\sqrt{1-\frac{\zeta^2}{4}}\right)\end{array}\right). \quad (43)$$

EXAMPLES

The group $J_{1,1}$ (given in EQ. 29) has the diversity=0.309 and rate R=3.45, while the bound on a unitary set with such diversity is $R_{max}\leq 3.66$ (EQ. 43).

The Super Quaternion group $Q_2\omega L_2\omega L_4$ has diversity $\zeta=0.3827$ and rate R=2.79, while the bound on the rate of a set with diversity $\zeta=0.3827$ is $R_{max}\leq 3.2$.

The Super Quaternion set $S_{Q_2,8,2}$ has diversity $\zeta=0.1602$ and rate R=4, while the bound on the rate of a set with such diversity is $R_{max}\leq 5$.

8.4. Exhaustive Search

The bounds calculated above gives us an insight on the characteristics of good codes. The isometry g of good orthogonal codes will result in uniformly distributed vectors in a 4-dimensional sphere, while the isometry of good unitary codes will result in vectors that are uniformly distributed on the envelope of a 4-dimensional sphere with radius 1.

One way to achieve uniform distribution of unitary codes is to generate the code by exhaustive search over $\gamma$, $\theta$, and $\phi$ (EQ. 39). The exhaustive search we present here is based on the following set in $R^4$ $$V=\{(x,y,z,w)|x=\cos(\gamma)\cos(\theta)\cos(\phi),y=\cos(\gamma)\cos(\theta)\sin(\phi),z=\cos(\gamma)\sin(\theta),w=\sin(\gamma),\gamma=kC+\gamma_0,\theta=lC/\cos(\gamma)+\theta_0(\gamma),\phi=mC/\cos(\gamma)/\cos(\theta)+\phi_0(\gamma,\theta),k,l,m\in N, 0<C<\pi\} \quad (44)$$

Figure 14:
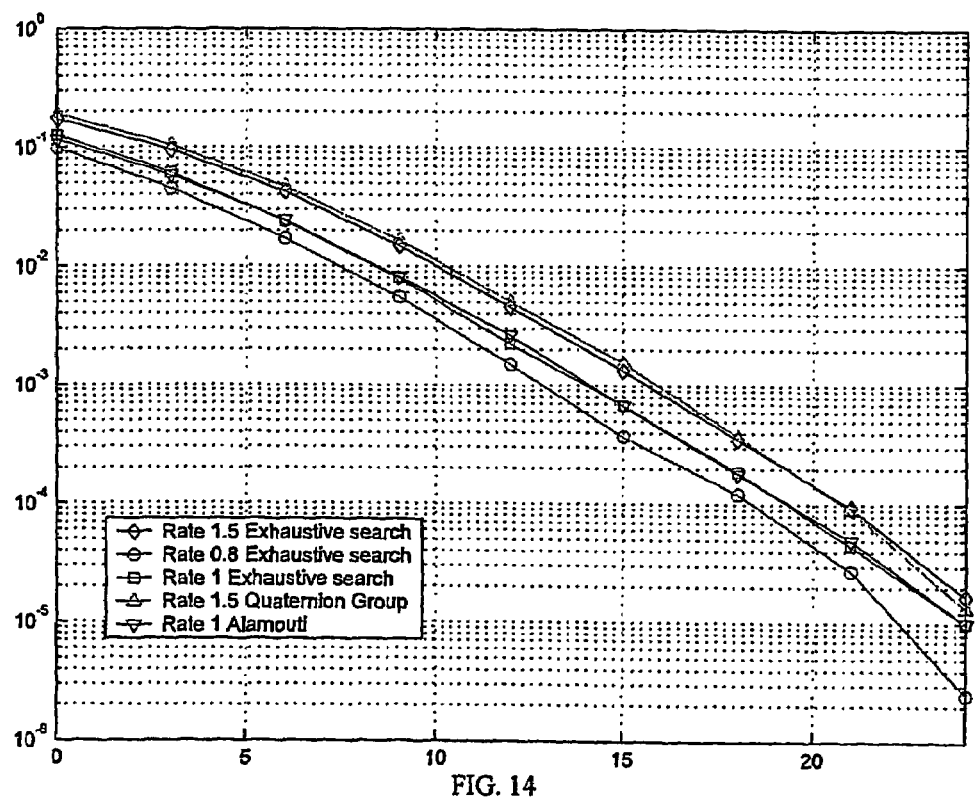
Figure 15:
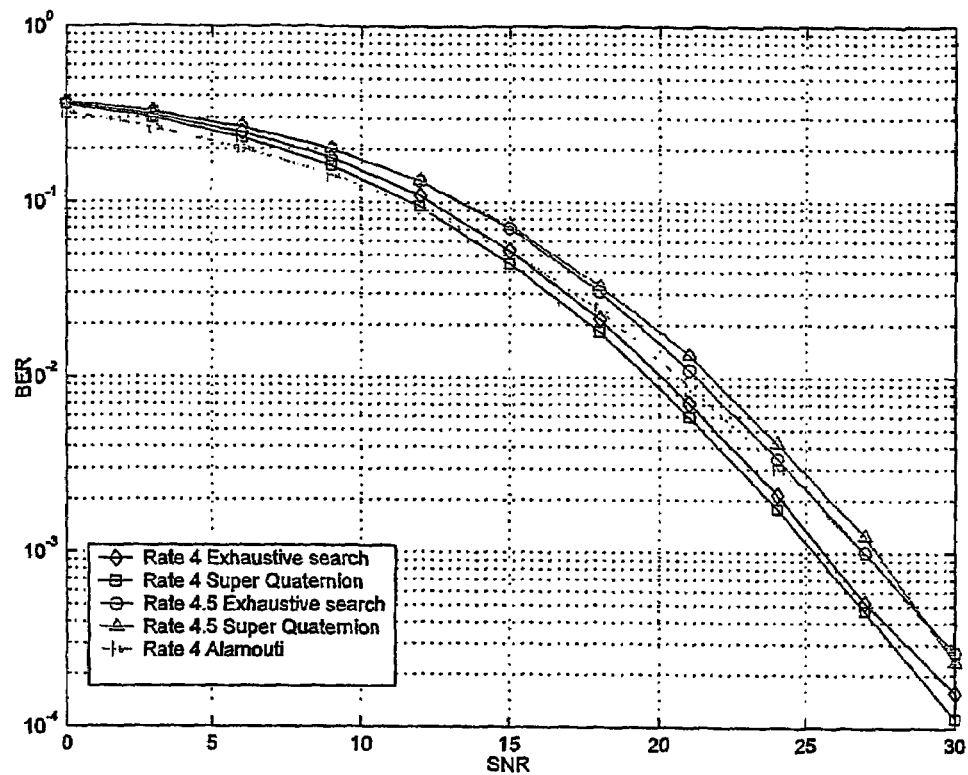

The search is done over C, which changes monotonically with the diversity and over $\gamma_0$, $\theta_0(\gamma)$, and $\phi_0(\gamma,\theta)$. Each vector set is isomorphic to a unitary code according to EQ. 31. Results of exhaustive search are shown in FIGS. 14 and 15. The performance of the search are typically close to the Super Quaternion sets, and outperforms the Orthogonal Design at high rates.

9. Unknown Channels

Symbols in unknown SISO channels are transmitted differentially to each other. If at time t we intend to send the symbol $S_t$ and the previous transmitted symbol was $X_{t-1}$, we transmit $X_{t-1}\cdot S_t$, i.e. at time t we transmit $$X_t=\prod_{k=0}^{t}S_k.$$

Assume that the channel is quasi-static (changes much slower than the symbol rate), then the symbols can be differentially decoded over unknown channel. This transmit algorithm is only effective for phase and frequency modulations since amplitude modulations are more difficultly separated from channel fading.

9.1. Encoding Algorithm

Due to the unitarity of the code used (shown in section 4) it is also applicable for an unknown channel. All the unitary codes can be transmitted over unknown channels. We use the SISO differential decoding principles for MIMO unknown channels in the following way: Instead of multiplying symbols we multiply matrices. If at time t−1 we transmitted the matrix $X_{t-1}$ and the next matrix we want to send is $S_t$ then we would transmit at time t the matrix $$X_t=S_t\cdot X_{t-1}. \quad (45)$$

It is important to notice that for n transmitters, each matrix contains n time samples, i.e. when we refer to transition at time t we actually refer to the n time samples $$nk, nk+1, \ldots, (n+1)k-1$$

where nk=t.

We assume m receiver antennas. Define the channel response at time t as $$R_t = R = \begin{pmatrix} \alpha_{1,1} & \alpha_{1,2} & & \alpha_{1,m} \\ \alpha_{2,1} & \alpha_{2,2} & & \alpha_{2,m} \\ \vdots & \vdots & \ddots & \vdots \\ \alpha_{n,1} & \alpha_{n,2} & & \alpha_{n,m} \end{pmatrix}$$

where $\alpha_{i,j}$ is the response from transmitter i to receiver j. We removed the time dependency (n) due to the quasi-static channel assumption. Let the channel noise be $$\Upsilon_t = \begin{pmatrix} v_t^{1,1} & v_t^{1,2} & & v_t^{1,m} \\ v_t^{2,1} & v_t^{2,2} & & v_t^{2,m} \\ \vdots & \vdots & \ddots & \vdots \\ v_t^{n,1} & v_t^{n,2} & & v_t^{n,m} \end{pmatrix}$$

where $v_t^{i,j}$ is the noise at antenna j at time t+i. The received symbols at time t are $$Y_t = \begin{pmatrix} y_t^{1,1} & y_t^{1,2} & & y_t^{1,m} \\ y_t^{2,1} & y_t^{2,2} & & y_t^{2,m} \\ \vdots & \vdots & \ddots & \vdots \\ y_t^{n,1} & y_t^{n,1} & & y_t^{n,m} \end{pmatrix}$$

where $y_t^{i,j}$ is the received symbol at antenna j at time t+i.

$Y_t = X_t R + \Upsilon_t$

9.2. Decoding Algorithm

The decoding is performed by estimating every codeword $S_t$ according to the last two received matrices $Y_t$ and $Y_{t-1}$. The decoding algorithm is given by $$S_n = \text{SYMBOL}\left[\min_k \left(\sum_{i=1}^n \sum_{j=1}^m G_n^k\{i,j\}\right)\right] \quad (46)$$

where $G_n^k = (Y_n - S_k Y_{n-1}) \cdot (Y_n - S_k Y_{n-1})^*$ and $Y_n$ is the received symbol, $S_k$, k=1, ..., N are the constellation's matrices and N is the size of the constellation. Applying $Y_n = X_n R + \Upsilon_n$ to EQ. 46 we get $G_n^k = (X_n R + \Upsilon_n - S_k(X_{n-1} R + \sigma_{n-1})) \cdot (X_n R + \Upsilon_n - S_k(X_{n-1} R + \Upsilon_{n-1}))^* = ((S_n - S_k) X_{n-1}) \cdot ((S_n - S_k) X_{n-1})^* + ((S_n - S_k) X_{n-1} R) \cdot (\Upsilon_n - S_k \Upsilon_{n-1})^* + ((S_n - S_k) X_{n-1} R)^* \cdot (\Upsilon_n - S_k \Upsilon_{n-1}) + (\sigma_n - S_k \sigma_{n-1}) \cdot (\Upsilon_n - S_k \sigma_{n-1})^*$.

9.3. Fast Decoding Algorithm

When trying to decode a symbol sent using two or more antennae in the fashion described above, we use a Maximum Likelihood decoder. In our case, in either known or unknown channels, the computation of the likelihood is quite straightforward. In the known channel case, if the matrix A was transmitted, and the channel coefficients are described by the vector $\alpha$, then the vector describing the values received, x, will be $x = A\alpha + n$, where n is the vector of noise values. Thus, since $\alpha$ is known, the log likelihood of a matrix B will be correlated to $l(B) = \|x - A\alpha\|^2$ In the case of an unknown channel, we have $A_{t+1} = A A_t$, so $x_{t+1} = A A_t \alpha + n_{t+1} = A(x_t - n_t)$ and the log likelihood of a matrix B will be correlated to $l(B) = \|x_{t+1} - A x_t\|^2$ In either case we see that $l(B) = \|x - Ay\|^2$ for some known x, y. We simply find the matrix B that minimizes this quantity and we are done. However, there might be a large number of matrices, e.g. 512, so that going over all of them can be quite time consuming. We suggest a way of doing this much more quickly. Note that such methods are well known, and we simply show that they can be implemented in this case. In order to implement a fast algorithm we will use hashing. We simply divide the space of all possible x, y into subsets, in such a way that for every point in the space we can quickly determine the subset to which it belongs. If our space is Euclidean, one such division might be by "quantization", rounding off all the coordinates (after some scaling). For each subset we determine in advance what are all the matrices that might minimalize points in the subset. It is easy to see that if the SNR is reasonable, and the subsets are in the probable region, then small subsets will have a small number of possible matrices. Thus, given x, y, we find the subset to which the point belongs, and test only the possible matrices relevant to that subset. Given a reasonable SNR, this means that our decoding works in constant time.

9.4. Two Transmit Diversity

For two transmit diversity there is a more effective algorithm that estimates the codeword matrix's entries independently [3]. We will concentrate on channels with no receive diversity. The generalization for receive diversity is easily obtained according to this section.

9.3.1. Transmission Algorithm

Assume that $$X_{t-1} = \begin{pmatrix} x_{t-1}^1 & x_{t-1}^2 \\ -x_{t-1}^{2*} & x_{t-1}^{1*} \end{pmatrix} \quad (47)$$

was transmitted at time t−1 and that $$X_t = \begin{pmatrix} x_t^1 & x_t^2 \\ -x_t^{2*} & x_t^{1*} \end{pmatrix} = S_t \cdot X_{t-1} \quad (48)$$

was transmitted at time t, where $$S_t = \begin{pmatrix} s_t^1 & s_t^2 \\ -s_t^{2*} & s_t^{1*} \end{pmatrix}.$$

Define the channel response at time n as $R_t = R = (\alpha_1 \ \alpha_2)^T$ where $^T$ is the transpose operator. We removed the time dependency (t) due to the quasi-static channel assumption. Let the channel noise be $Y_t = (v_t^1 \ v_t^2)^T$. The received symbols at time t are $Y_t = (y_t^1 \ y_t^2)^T = X_t R + Y_t$.

9.3.2. Decoding Algorithm

Every transmitted matrix can be decoded according to the current and previous received symbols by using the differential scheme. First, we calculate:

$$s_t^1 = y_t^1 y_{t-1}^{1*} + y_t^{2*} y_{t-1}^2 \qquad (49)$$

by using the following identities:

$$y_t^1 = (1 \ 0) \cdot X_t R + v_t^1 = (1 \ 0) \cdot S_t X_{t-1} R + v_t^1$$

$$y_t^2 = (0 \ 1) \cdot X_t R + v_t^2 = (0 \ 1) \cdot S_t X_{t-1} R + v_t^2$$

$$y_{t-1}^1 = (1 \ 0) \cdot X_{t-1} R + v_{t-1}^1$$

$$y_{t-1}^2 = (0 \ 1) \cdot X_{t-1} R + v_{t-1}^2 \qquad (50)$$

We rewrite EQ. 49 using the identities in EQ. 50 as:

$$s_t^1 = ((s_t^1 \ s_t^2) X_{t-1} R + v_t^1) \cdot ((x_{t-1}^1 \ x_{t-1}^2) R + v_{t-1}^1)^* +$$

$$((-x_{t-1}^{2*} \ x_{t-1}^{1*}) R + v_{t-1}^2) \cdot ((-s_t^{2*} \ s_t^{1*}) X_{t-1} R + v_t^2)^*$$

$$= (s_t^1 \ s_t^2) X_{t-1} R R^* \begin{pmatrix} x_{t-1}^{1*} \\ x_{t-1}^{2*} \end{pmatrix} + (-x_{t-1}^{2*} \ x_{t-1}^{1*}) R R^* X_{t-1}^* \begin{pmatrix} -s_t^2 \\ s_t^1 \end{pmatrix} + N_t^1$$

where $N_t^1$ is a zero-mean noise given by $$N_1 = R^* \begin{pmatrix} x_{t-1}^{1*} \\ x_{t-1}^{2*} \end{pmatrix} v_t^1 + (s_t^1 \ s_t^2) X_{t-1} R v_{t-1}^{1*} +$$

$$R^* X_{t-1}^* \begin{pmatrix} -s_t^2 \\ s_t^1 \end{pmatrix} v_{t-1}^2 + (-x_{t-1}^{2*} \ x_{t-1}^{1*}) R v_t^{2*} + v_t^1 v_{t-1}^{1*} + v_{t-1}^2 v_t^{2*}.$$

On the other hand $$(s_t^1 \ s_t^2) X_{t-1} R R^* \begin{pmatrix} x_{t-1}^{1*} \\ x_{t-1}^{2*} \end{pmatrix} + (-x_{t-1}^{2*} \ x_{t-1}^{1*}) R R^* X_{t-1}^* \begin{pmatrix} -s_t^2 \\ s_t^1 \end{pmatrix} =$$

$$s_t^1 \left[ (x_{t-1}^1 \ x_{t-1}^2) R R^* \begin{pmatrix} x_{t-1}^{1*} \\ x_{t-1}^{2*} \end{pmatrix} + (-x_{t-1}^{2*} \ x_{t-1}^{1*}) R R^* \begin{pmatrix} -x_{t-1}^2 \\ x_{t-1}^1 \end{pmatrix} \right] +$$

$$s_t^2 \left[ (-x_{t-1}^{2*} \ x_{t-1}^{1*}) R R^* \begin{pmatrix} x_{t-1}^{1*} \\ x_{t-1}^{2*} \end{pmatrix} - (-x_{t-1}^{2*} \ x_{t-1}^{1*}) R R^* \begin{pmatrix} x_{t-1}^{1*} \\ x_{t-1}^{2*} \end{pmatrix} \right] =$$

$$s_t^1 \left[ (|x_{t-1}^1|^2 + |x_{t-1}^2|^2)(|\alpha^1|^2 + |\alpha^2|^2) \right].$$

According to Eq. 5, $$X_{t-1} = \prod_{i=0}^{t-1} S_i.$$

But $|x_{t-1}^1|^2 + |x_{t-1}^2|^2 = \det(X_{t-1})$ according to EQ. 47. Then $$|x_{t-1}^1|^2 + |x_{t-1}^2|^2 = \prod_{i=0}^{t-1} \det(S_i) = 1.$$

Therefore, $$s_t^1 = s_t^1(|\alpha^1|^2 + |\alpha^2|^2) + N_t^1. \qquad (51)$$

Similarly we compute $$s_t^2 = y_t^1 y_{t-1}^{2*} - y_t^{2*} y_{t-1}^1. \qquad (52)$$

Using the above identities we write:

$$s_t^2 = ((s_t^1 \ s_t^2) X_{t-1} R + v_t^1) \cdot ((-x_{t-1}^{2*} \ x_{t-1}^{1*}) R + v_{t-1}^2)^* -$$

$$((x_{t-1}^1 \ x_{t-1}^2) R + v_{t-1}^1) \cdot ((-s_t^{2*} \ s_t^{1*}) X_{t-1} R + v_t^2)^*$$

$$= (s_t^1 \ s_t^2) X_{t-1} R R^* \begin{pmatrix} -x_{t-1}^2 \\ x_{t-1}^1 \end{pmatrix} + (x_{t-1}^1 \ x_{t-1}^2) R R^* X_{t-1}^* \begin{pmatrix} s_t^2 \\ -s_t^1 \end{pmatrix} + N_t^2$$

where $$N_2 = R^* \begin{pmatrix} -x_{t-1}^2 \\ x_{t-1}^1 \end{pmatrix} v_t^1 - R^* X_{t-1}^* \begin{pmatrix} -s_t^2 \\ s_t^1 \end{pmatrix} v_{t-1}^1 +$$

$$(s_t^1 \ s_t^2) X_{t-1} R v_t^{2*} - (x_{t-1}^1 \ x_{t-1}^2) R v_t^{2*} + v_t^1 v_{t-1}^{2*} - v_{t-1}^1 v_t^{2*}.$$

Rearranging EQ. 52 we get $$s_t^2 = s_t^1 \left[ (x_{t-1}^1 \ x_{t-1}^2) R R^* \begin{pmatrix} -x_{t-1}^2 \\ x_{t-1}^1 \end{pmatrix} - (x_{t-1}^1 \ x_{t-1}^2) R R^* \begin{pmatrix} -x_{t-1}^2 \\ x_{t-1}^1 \end{pmatrix} \right] +$$

$$s_t^2 \left[ (-x_{t-1}^{2*} \ x_{t-1}^{1*}) R R^* \begin{pmatrix} -x_{t-1}^2 \\ x_{t-1}^1 \end{pmatrix} + (x_{t-1}^1 \ x_{t-1}^2) R R^* \begin{pmatrix} x_{t-1}^{1*} \\ x_{t-1}^{2*} \end{pmatrix} \right]$$

$$= s_t^2 \left[ (|x_{t-1}^1|^2 + |x_{t-1}^2|^2)(|\alpha^1|^2 + |\alpha^2|^2) \right]$$

$$= s_t^2 (|\alpha^1|^2 + |\alpha^2|^2).$$

Finally, $$s_t^2 = s_t^2(|\alpha^1|^2 + |\alpha^2|^2) + N_t^2. \qquad (53)$$

The reconstructed matrix $S_t$ is given then by $$S_t = (|\alpha^1|^2 + |\alpha^2|^2) S_t + \begin{pmatrix} N_t^1 & N_t^2 \\ -N_t^{2*} & N_t^{1*} \end{pmatrix}.$$

Since all the quaternion matrices are normalized to determinant 1, we divide the reconstructed matrix by its determinant and choose the closest code matrix as our estimate.

10. Simulation Results

We present here the simulation results for the codes described above. The simulations were made on Rayleigh fading channels with Gaussian white noise. Results of Orthogonal Design codes and the $G_{mr}$ groups were compared to the literature. No additional error correction codes were implemented.

10.1. Known Channel Results

Figure 8:
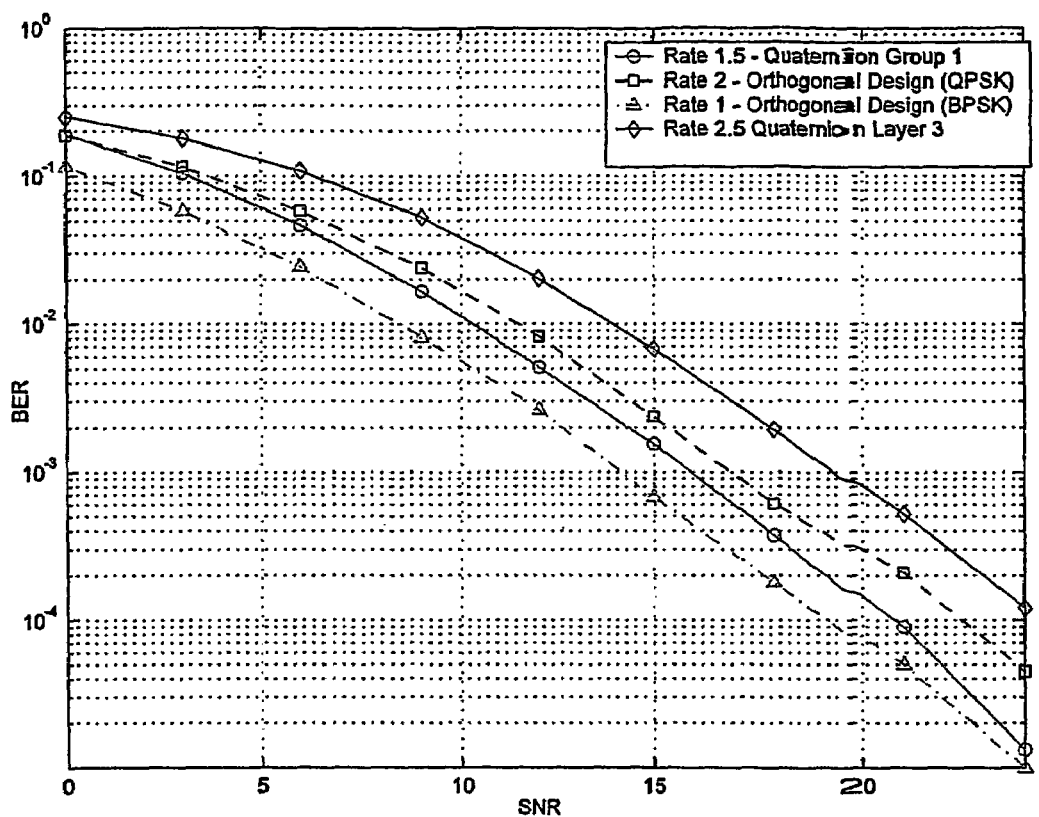
FIGS. 8-20 are plots of bit error rate vs. signal-to-noise ratio for various simulations of transmission using prior art space time block codes and space time block codes of the present invention, as discussed in the Theory Section.
Figure 9:
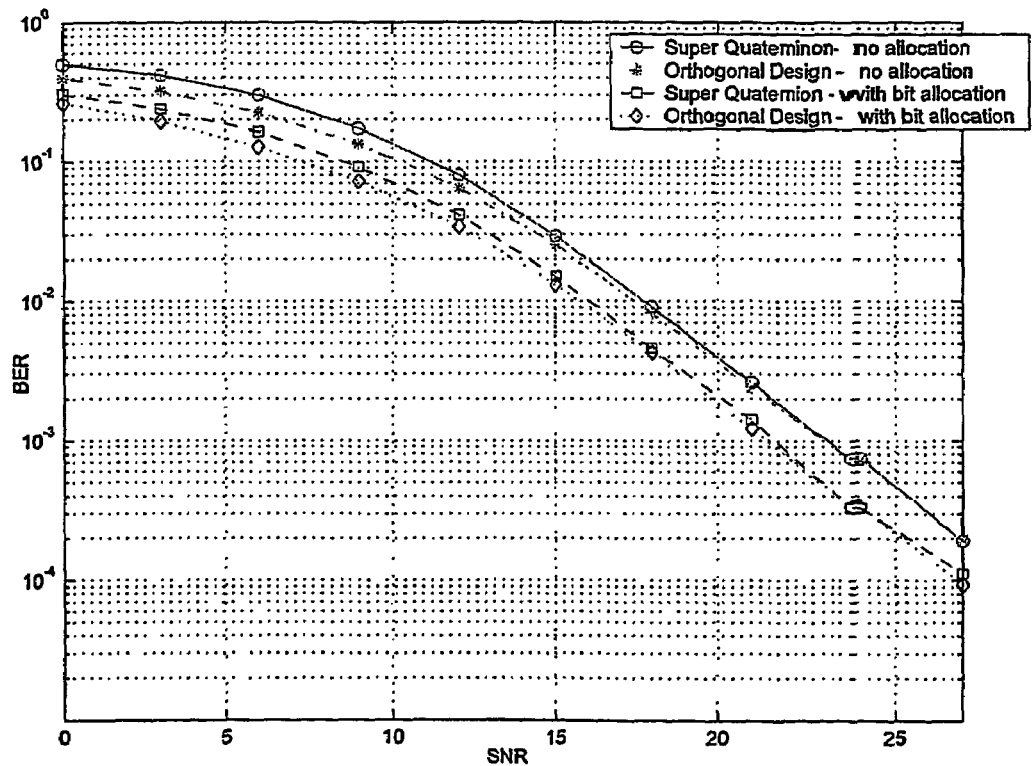

FIGS. 8, 9 and 10 present the BER performance of Quaternion STBC vs. Orthogonal Design when bit allocation is used.

10.2. Unknown Channel Results

Figure 11:
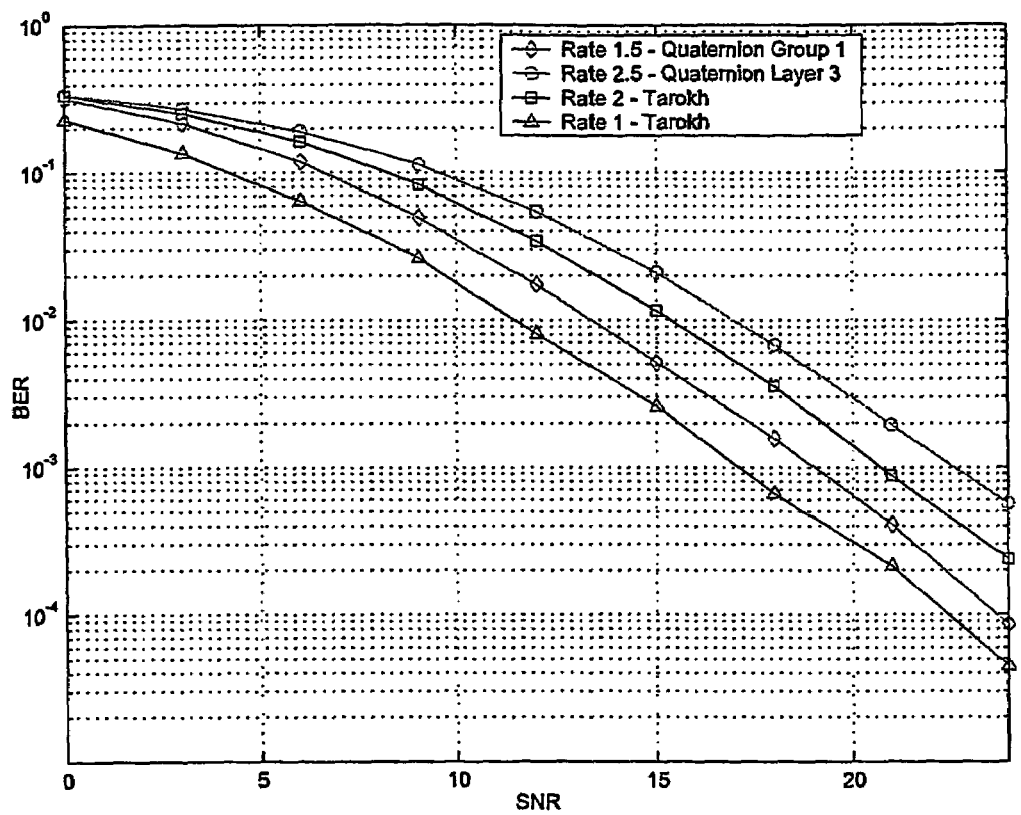
Figure 12:
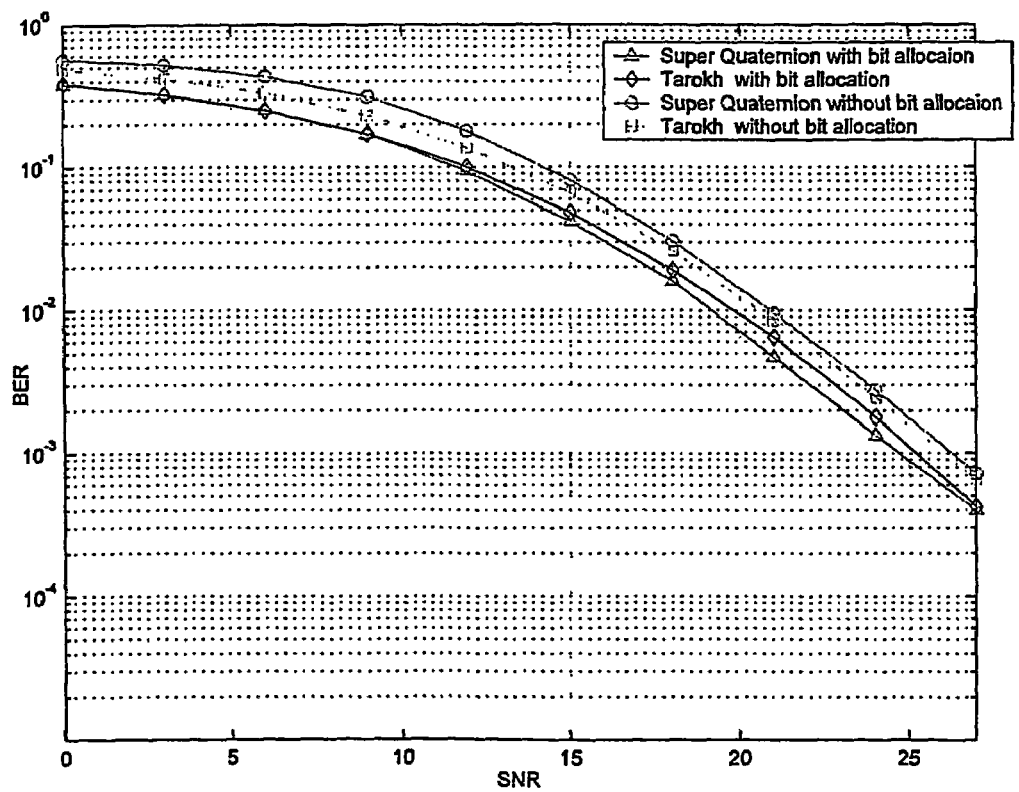

FIGS. 11 and 12 present the BER performance of Quaternion STBC vs. Orthogonal Design for unknown channel, when bit allocation is used.

10.3. Results for Codes with No Bit Allocation

We made a few simulations for quaternion group structure 1, 2, 4 and Orthogonal Design 6PSK constellation for known and unknown channels without bit allocation due to the high complexity of allocating bits for rates, which are not integral. The results of these simulations are shown in FIG. 13.

10.4. Exhaustive Search Results

Results for codes that were constructed by exhaustive search are shown in FIGS. 14 and 15. The results are for known channels, though the codes are also applicable for unknown channels due to their unitary design.

10.5. Results for the Gmr Groups and Cosets

Figure 16:
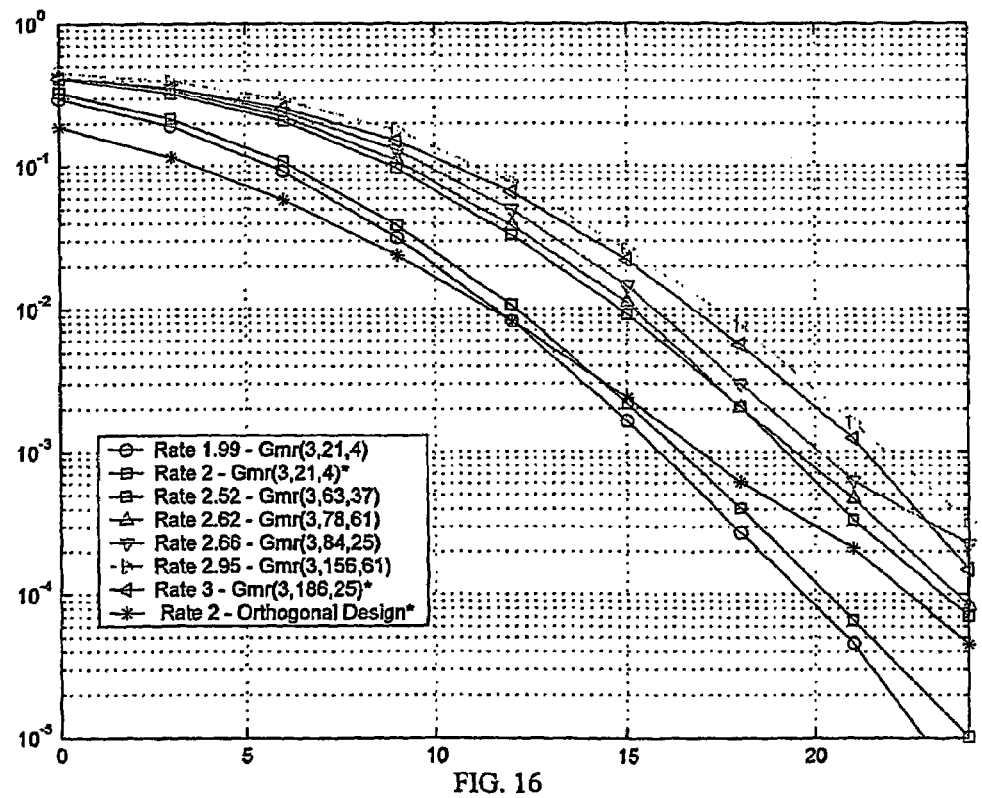
Figure 17:
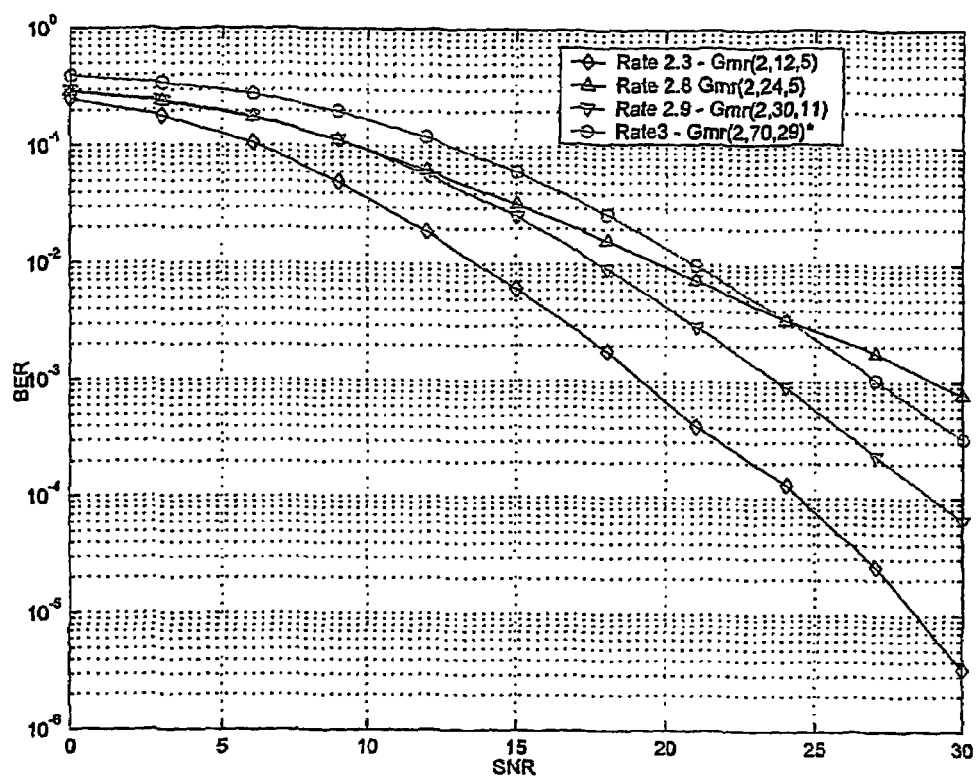
Figure 18:
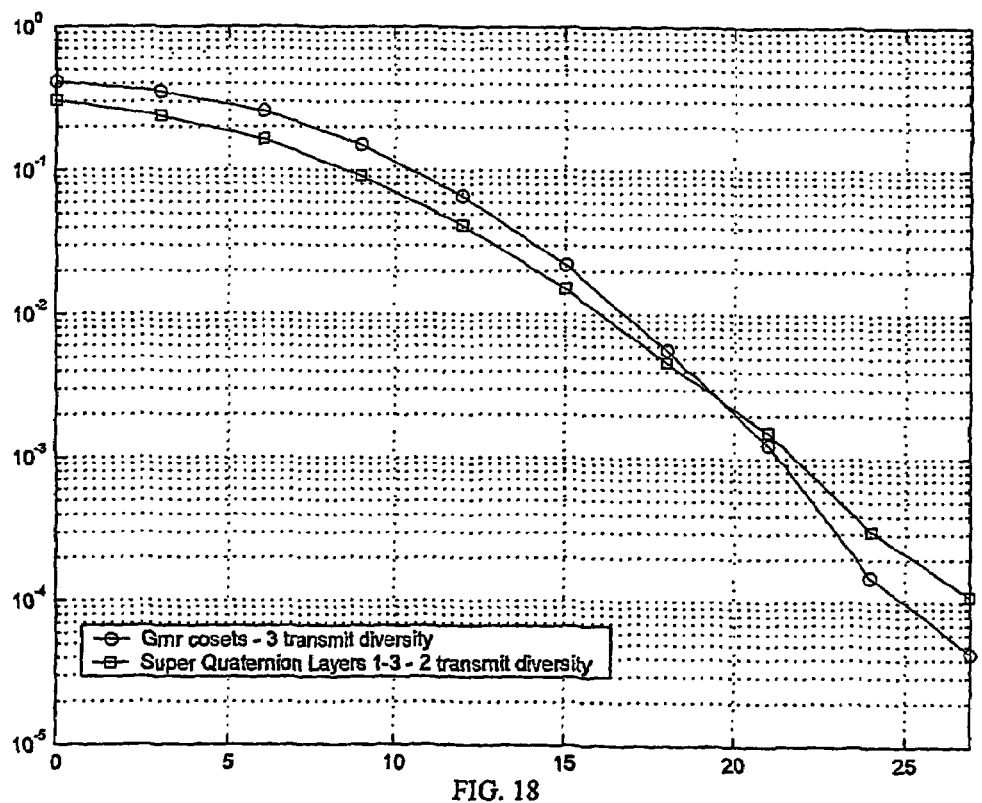

FIGS. 16, 17 and 18 represent the results for 2,3-transmit diversity $G_{m,r}$ groups (n=2, n=3). The performance for 3-transmit diversity is up to 3 db improvement (for rate 2) in comparison to Super Quaternion methodology or Orthogonal Design (both have 2-transmit diversity), while the performance of the 2-transmit diversity code are considerably inferior.

10.6. Results for the Jmr Groups

Figure 19:
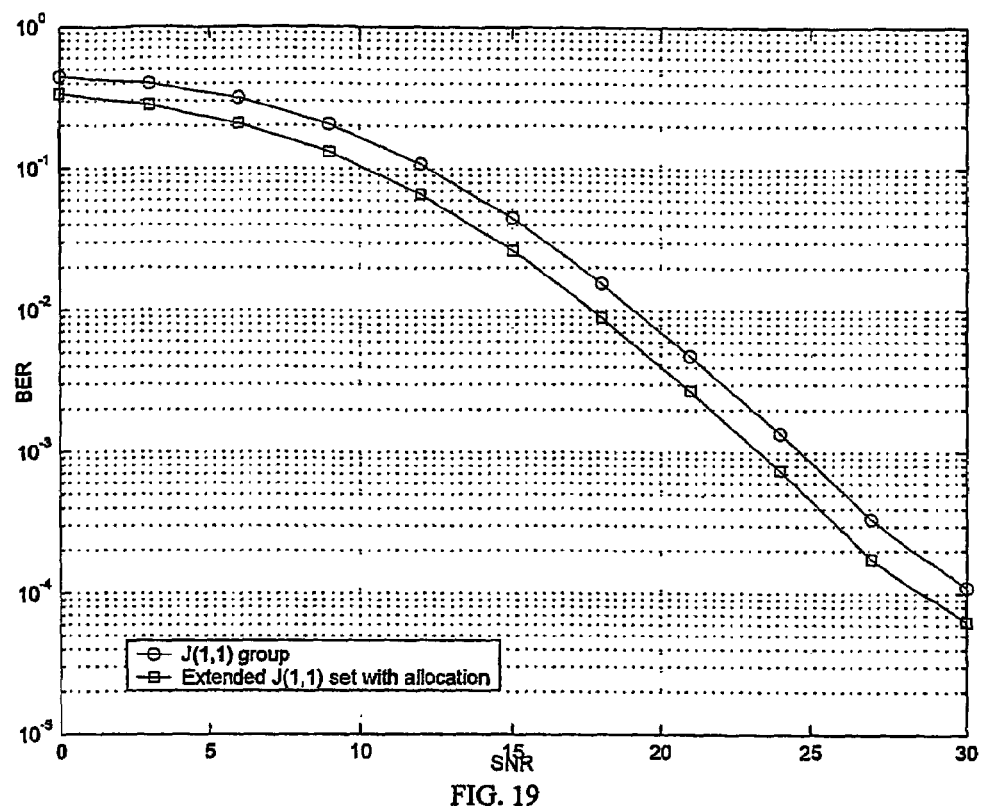

FIG. 19 shows results for the group $J_{1,1}$ and an extended set that includes the group $J_{1,1}$ and eight Super Quaternion codewords in order to increase the bit rate allow bit allocation.

10.7. Results for Two Receive Diversity

FIG. 20 demonstrates improved performance when using two receiver antennas for a few examples.

11. CONCLUSIONS

Space Time Codes are a powerful tool for increasing the data rates of channels and the transmission range. The advantage of STBC as was shown in the simulations is obvious over multipath channels. This invention presents new STBC codes with better diversity that achieve improved performance for fading channels. We have found rate bounds on the diversity of orthogonal and unitary codes and presented codes that approach these bounds. The codes presented in this invention were bit allocated for improved performance. These cods were simulated and reached better results than other known STBC codes.

REFERENCES

[1] I. N. Herstein, "*Noncommutative Rings,*" The Carus Mathematical Monographs, Number Fifteen.

[2] Siavash M. Alamouti, "*A Simple Transmit Diversity Technique for Wireless Communications,*" IEEE Journal on Select Areas in Communications, Vol. 16, No. 8, October 1998.

[3] Vahid Tarokh. "*A Differential Detection Scheme for Transmit Diversity,*" IEEE Journal on Select Areas in Communications, Vol. 18, No. 7, July 2000.

[4] Vahid Tarokh, Nambi Senshadri' A. R. Calderbank. "*Space-Time Codes for High Data Rate Wireless Communication Performance Criterion and Code Construction,*" IEEE Transactions on Information Theory, Vol. 44, No. 2, July 1998.

[5] V. Tarokh, H Jafakhani, and A. R. Calderbank, "*Space-time block codes from orthogonal designs,*" IEEE Trans. Info. Theory, vol. 45, no. 5, pp. 1456-1467, July 1999.

[6] Bertrand M. Hochwald, Thomas L. Marzetta "*Unitary Space-Time modulation for Multiple-Antenna Communications in Rayleigh Flat fading,*" IEEE Transactions on Information Theory, March 2000.

[7] B. Hochwald and W. Sweldens, "*Differential unitary space time modulation,*" IEEE Trans. Comm., vol. 48, pp. 2041-2052, December 2000.

[8] A. Shokrollahi, B. Hassibi, B. M. Hochwlad, and W. Sweldens, "*Representation theory for high rate multiple antenna code design,*" IEEE Trans. Inform. Theory, vol. 47, no. 6, pp. 2335-2367, September 2001.

[9] B. Hughes, "*Differential space-time modulation,*" IEEE Trans. Inform. Theory, vol. 46, pp. 2567-2578, November 2000.

[10] G. Han and J. Rosenthal, "*Unitary constellations with large diversity sum and good diversity product,*" Department of Mathematics, University of Notre Dame, October 2002.

[11] M. Shirvani, "*The finite inner automorphism groups of division rings,*" Math Proc. Camb. Phil. Soc., vol. 118, pp. 207-213, 1995.

[12] G. J. Foschini and M. J Gans, "*On Limits of Wireless Communications in a Fading Environment when Using Multiple Antennas,*" Wireless Personal Communications 6: 311-335, 1998.

[13] S. A. Amitsur, *Finite Subgroups of Division Rings*, Trans. Amer. Math. Soc. (1955) 361-386.

TABLE 1

| Bit allocation of $S_{Q_2,7,2}$ | | |
| --- | --- | --- |
| Binary 0 = | −0.5000 + 0.5000i | 0.5000 − 0.5000i |
| | −0.5000 − 0.5000i | −0.5000 − 0.5000i |
| Binary 1 = | −0.7559 + 0.3780i | 0.3780 − 0.3780i |
| | −0.3780 − 0.3780i | −0.7559 − 0.3780i |
| Binary 2 = | −0.3780 + 0.7559i | 0.3780 − 0.3780i |
| | −0.3780 − 0.3780i | −0.3780 − 0.7559i |
| Binary 3 = | −0.8165 + 0.4082i | 0.4082 |
| | −0.4082 | −0.8165 − 0.4082i |
| Binary 4 = | −0.3780 + 0.3780i | 0.3780 − 0.7559i |
| | −0.3780 − 0.7559i | −0.3780 − 0.3780i |
| Binary 5 = | −0.4082 | 0.4082 + 0.8165i |
| | −0.4082 − 0.8165i | −0.4082 |
| Binary 6 = | −0.4472 + 0.8944i | 0 |
| | 0 | −0.4472 − 0.8944i |
| Binary 7 = | −0.8944 | 0.4472 |
| | −0.4472 | −0.8944 |
| Binary 8 = | −0.3780 + 0.3780i | 0.7559 − 0.3780i |
| | −0.7559 − 0.3780i | −0.3780 − 0.3780i |
| Binary 9 = | −0.8165 | 0.4082 − 0.4082i |
| | −0.4082 − 0.4082i | −0.8165 |
| Binary 10 = | −0.4082 + 0.4082i | 0.8165 |
| | −0.8165 | −0.4082 − 0.4082i |
| Binary 11 = | −0.5774 + 0.5774i | 0.5774 |
| | −0.5774 | −0.5774 − 0.5774i |
| Binary 12 = | −0.4082 | 0.8165 − 0.4082i |
| | −0.8165 − 0.4082i | −0.4082 |
| Binary 13 = | −0.5774 | 0.5774 − 0.5774i |
| | −0.5774 − 0.5774i | −0.5774 |
| Binary 14 = | −0.4472 | 0.8944 |
| | −0.8944 | −0.4472 |
| Binary 15 = | −0.4082 + 0.8165i | 0.4082 |
| | −0.4082 | −0.4082 − 0.8165i |
| Binary 16 = | −0.5774 + 0.5774i | 0 − 0.5774i |
| | −0.5774i | −0.5774 − 0.5774i |
| Binary 17 = | −0.8165 + 0.4082i | 0 − 0.4082i |
| | 0 − 0.4082i | −0.8165 − 0.4082i |
| Binary 18 = | −0.4082 + 0.8165i | 0 − 0.4082i |
| | 0 − 0.4082i | −0.4082 − 0.8165i |
| Binary 19 = | −0.8944 + 0.4472i | 0 |
| | 0 | −0.8944 − 0.4472i |
| Binary 20 = | −0.4082 + 0.4082i | 0 − 0.8165i |
| | 0 − 0.8165i | −0.4082 − 0.4082i |
| Binary 21 = | −0.4472 | 0 − 0.8944i |
| | 0 − 0.8944i | −0.4472 |

TABLE 1-continued

Bit allocation of $S_{Q_2,7,2}$

| | | |
|---|---|---|
| Binary 22 = | 0 + 0.4082i<br>0.4082 − 0.8165i | −0.4082 − 0.8165i<br>0 − 0.4082i |
| Binary 23 = | 0.3780 + 0.3780i<br>0.3780 − 0.7559i | −0.3780 − 0.7559i<br>0.3780 − 0.3780i |
| Binary 24 = | 0.8944<br>−0.4472 | 0.4472<br>0.8944 |
| Binary 25 = | −0.8944<br>0 − 0.4472i | 0 − 0.4472i<br>−0.8944 |
| Binary 26 = | 0.4082<br>0.8165 − 0.4082i | −0.8165 − 0.4082i<br>0.4082 |
| Binary 27 = | 0.5774<br>0.5774 − 0.5774i | −0.5774 − 0.5774i<br>0.5774 |
| Binary 28 = | 0<br>0.4472 − 0.8944i | −0.4472 − 0.8944i<br>0 |
| Binary 29 = | 0 − 0.4472i<br>0 − 0.8944i | 0 − 0.8944i<br>0 + 0.4472i |
| Binary 30 = | 0.3780 + 0.3780i<br>0.7559 − 0.3780i | −0.7559 − 0.3780i<br>0.3780 − 0.3780i |
| Binary 31 = | 0.4082<br>0.4082 − 0.8165i | −0.4082 − 0.8165i<br>0.4082 |
| Binary 32 = | −0.5774 + 0.5774i<br>0.5774 | −0.5774<br>−0.5774 − 0.5774i |
| Binary 33 = | −0.8165 + 0.4082i<br>0.4082 | −0.4082<br>−0.8165 − 0.4082i |
| Binary 34 = | −0.4082<br>−0.4082 + 0.8165i | 0.4082 + 0.8165i<br>−0.4082 |
| Binary 35 = | −0.7559 + 0.3780i<br>−0.3780 + 0.3780i | 0.3780 + 0.3780i<br>−0.7559 − 0.3780i |
| Binary 36 = | −0.4082 + 0.8165i<br>0.4082 | −0.4082<br>−0.4082 − 0.8165i |
| Binary 37 = | −0.3780 + 0.7559i<br>0.3780 + 0.3780i | −0.3780 + 0.3780i<br>−0.3780 − 0.7559i |
| Binary 38 = | −0.5774<br>−0.5774 + 0.5774i | 0.5774 + 0.5774i<br>−0.5774 |
| Binary 39 = | −0.8165<br>−0.4082 + 0.4082i | 0.4082 + 0.4082i<br>−0.8165 |
| Binary 40 = | −0.4082 + 0.4082i<br>0.8165 | −0.8165<br>−0.4082 − 0.4082i |
| Binary 41 = | −0.3780 + 0.3780i<br>−0.3780 + 0.7559i | 0.3780 + 0.7559i<br>−0.3780 − 0.3780i |
| Binary 42 = | −0.3780 + 0.3780i<br>−0.7559 + 0.3780i | 0.7559 + 0.3780i<br>−0.3780 − 0.3780i |
| Binary 43 = | −0.5000 + 0.5000i<br>−0.5000 + 0.5000i | 0.5000 + 0.5000i<br>−0.5000 − 0.5000i |
| Binary 44 = | 0 + 0.8944i<br>0.4472 | −0.4472<br>0 − 0.8944i |
| Binary 45 = | −0.3780 + 0.3780i<br>0.3780 + 0.7559i | −0.3780 + 0.7559i<br>−0.3780 − 0.3780i |
| Binary 46 = | −0.4082<br>−0.8165 + 0.4082i | 0.8165 + 0.4082i<br>−0.4082 |
| Binary 47 = | −0.3780 + 0.7559i<br>−0.3780 + 0.3780i | 0.3780 + 0.3780i<br>−0.3780 − 0.7559i |
| Binary 48 = | −0.5000 + 0.5000i<br>0.5000 − 0.5000i | −0.5000 − 0.5000i<br>−0.5000 − 0.5000i |
| Binary 49 = | −0.7559 + 0.3780i<br>0.3780 − 0.3780i | −0.3780 − 0.3780i<br>−0.7559 − 0.3780i |
| Binary 50 = | −0.3780 + 0.7559i<br>0.3780 − 0.3780i | −0.3780 − 0.3780i<br>−0.3780 − 0.7559i |
| Binary 51 = | −0.8165 + 0.4082i<br>0 + 0.4082i | 0 + 0.4082i<br>−0.8165 − 0.4082i |
| Binary 52 = | −0.3780 + 0.3780i<br>0.3780 − 0.7559i | −0.3780 − 0.7559i<br>−0.3780 − 0.3780i |
| Binary 53 = | −0.7559 + 0.3780i<br>0.3780 + 0.3780i | −0.3780 + 0.3780i<br>−0.7559 + 0.3780i |
| Binary 54 = | 0 + 0.8165i<br>0.4082 − 0.4082i | −0.4082 − 0.4082i<br>0 − 0.8165i |
| Binary 55 = | −0.8944<br>0 + 0.4472i | 0 + 0.4472i<br>−0.8944 |
| Binary 56 = | −0.3780 + 0.3780i<br>0.7559 − 0.3780i | −0.7559 − 0.3780i<br>−0.3780 − 0.3780i |
| Binary 57 = | −0.4082 + 0.4082i<br>0 + 0.8165i | 0 + 0.8165i<br>−0.4082 − 0.4082i |
| Binary 58 = | 0 + 0.4082i<br>0.8165 − 0.4082i | −0.8165 − 0.4082i<br>0 − 0.4082i |
| Binary 59 = | −0.5774 + 0.5774i<br>0 + 0.5774i | 0 + 0.5774i<br>−0.5774 − 0.5774i |
| Binary 60 = | −0.3780 + 0.3780i<br>0.7559 + 0.3780i | −0.7559 + 0.3780i<br>−0.3780 − 0.3780i |
| Binary 61 = | −0.5000 + 0.5000i<br>0.5000 + 0.5000i | −0.5000 + 0.5000i<br>−0.5000 − 0.5000i |
| Binary 62 = | 0 + 0.5774i<br>0.5774 − 0.5774i | −0.5774 − 0.5774i<br>0 − 0.5774i |
| Binary 63 = | −0.4082 + 0.8165i<br>0 + 0.4082i | 0 + 0.4082i<br>−0.4082 − 0.8165i |
| Binary 64 = | 0.5000 − 0.5000i<br>0.5000 − 0.5000i | −0.5000 − 0.5000i<br>0.5000 + 0.5000i |
| Binary 65 = | 0.3780 − 0.3780i<br>0.3780 − 0.7559i | −0.3780 − 0.7559i<br>0.3780 + 0.3780i |
| Binary 66 = | 0.4082 − 0.8165i<br>0.4082 | −0.4082<br>0.4082 + 0.8165i |
| Binary 67 = | 0 − 0.8944i<br>0.4472 | −0.4472<br>0 + 0.8944i |
| Binary 68 = | −0.4082 − 0.8165i<br>−0.4082 | 0.4082<br>−0.4082 + 0.8165i |
| Binary 69 = | −0.7559 − 0.3780i<br>−0.3780 − 0.3780i | 0.3780 − 0.3780i<br>−0.7559 + 0.3780i |
| Binary 70 = | −0.5774 − 0.5774i<br>−0.5774 | 0.5774<br>−0.5774 + 0.5774i |
| Binary 71 = | −0.8165 − 0.4082i<br>−0.4082 | 0.4082<br>−0.8165 + 0.4082i |
| Binary 72 = | 0.3780 − 0.7559i<br>0.3780 − 0.3780i | −0.3780 − 0.3780i<br>0.3780 + 0.7559i |
| Binary 73 = | 0 − 0.8944i<br>0 − 0.4472i | 0 − 0.4472i<br>0 + 0.8944i |
| Binary 74 = | 0.3780 − 0.3780i<br>0.7559 − 0.3780i | −0.7559 − 0.3780i<br>0.3780 + 0.3780i |
| Binary 75 = | 0 − 0.8165i<br>0.4082 − 0.4082i | −0.4082 − 0.4082i<br>0 + 0.8165i |
| Binary 76 = | −0.3780 − 0.3780i<br>−0.7559 − 0.3780i | 0.7559 − 0.3780i<br>−0.3780 + 0.3780i |
| Binary 77 = | −0.5000 − 0.5000i<br>−0.5000 − 0.5000i | 0.5000 − 0.5000i<br>−0.5000 + 0.5000i |
| Binary 78 = | −0.4082 − 0.4082i<br>−0.8165 | 0.8165<br>−0.4082 + 0.4082i |
| Binary 79 = | −0.3780 − 0.3780i<br>−0.3780 − 0.3780i | 0.3780 − 0.3780i<br>−0.3780 + 0.7559i |
| Binary 80 = | −0.5000 − 0.5000i<br>0.5000 − 0.5000i | −0.5000 − 0.5000i<br>−0.5000 + 0.5000i |
| Binary 81 = | −0.7559 − 0.3780i<br>0.3780 − 0.3780i | −0.3780 − 0.3780i<br>−0.7559 + 0.3780i |
| Binary 82 = | −0.3780 − 0.7559i<br>0.3780 − 0.3780i | −0.3780 − 0.3780i<br>−0.3780 + 0.7559i |
| Binary 83 = | −0.4082 − 0.8165i<br>0.4082 | −0.4082<br>−0.4082 + 0.8165i |
| Binary 84 = | −0.5774 − 0.5774i<br>0 − 0.5774i | 0 − 0.5774i<br>−0.5774 + 0.5774i |
| Binary 85 = | −0.8165 − 0.4082i<br>0 − 0.4082i | 0 − 0.4082i<br>−0.8165 + 0.4082i |
| Binary 86 = | −0.4082 − 0.8165i<br>0 + 0.4082i | 0 + 0.4082i<br>−0.4082 + 0.8165i |
| Binary 87 = | −0.8944 − 0.4472i<br>0 | 0<br>−0.8944 + 0.4472i |
| Binary 88 = | −0.3780 − 0.3780i<br>0.3780 − 0.7559i | −0.3780 − 0.7559i<br>−0.3780 + 0.3780i |
| Binary 89 = | −0.3780 − 0.3780i<br>0.7559 − 0.3780i | −0.7559 − 0.3780i<br>−0.3780 + 0.3780i |
| Binary 90 = | 0 − 0.4082i<br>0.8165 − 0.4082i | −0.8165 − 0.4082i<br>0 + 0.4082i |
| Binary 91 = | 0 − 0.5774i<br>0.5774 − 0.5774i | −0.5774 − 0.5774i<br>0 + 0.5774i |
| Binary 92 = | −0.4082 − 0.4082i<br>0 − 0.8165i | 0 − 0.8165i<br>−0.4082 + 0.4082i |
| Binary 93 = | −0.3780 − 0.3780i<br>−0.3780 − 0.7559i | 0.3780 − 0.7559i<br>−0.3780 + 0.3780i |
| Binary 94 = | −0.4082 − 0.8165i<br>0 − 0.4082i | 0 − 0.4082i<br>−0.4082 + 0.8165i |
| Binary 95 = | −0.4472 − 0.8944i<br>0 | 0<br>−0.4472 + 0.8944i |
| Binary 96 = | 0.7559 − 0.3780i<br>0.3780 − 0.3780i | −0.3780 − 0.3780i<br>0.7559 + 0.3780i |
| Binary 97 = | −0.8944<br>0.4472 | −0.4472<br>−0.8944 |

TABLE 1-continued

Bit allocation of $S_{Q_2,7,2}$

| | | |
|---|---|---|
| Binary 98 = | −0.3780 − 0.3780i<br>−0.3780 + 0.7559i | 0.3780 + 0.7559i<br>−0.3780 + 0.3780i |
| Binary 99 = | −0.8165 − 0.4082i<br>0.4082 | −0.4082<br>−0.8165 + 0.4082i |
| Binary 100 = | −0.3780 − 0.7559i<br>−0.3780 + 0.3780i | 0.3780 + 0.3780i<br>−0.3780 + 0.7559i |
| Binary 101 = | −0.7559 − 0.3780i<br>0.3780 + 0.3780i | −0.3780 − 0.3780i<br>−0.7559 + 0.3780i |
| Binary 102 = | −0.5000 − 0.5000i<br>−0.5000 + 0.5000i | 0.5000 + 0.5000i<br>−0.5000 + 0.5000i |
| Binary 103 = | −0.7559 − 0.3780i<br>−0.3780 + 0.3780i | 0.3780 + 0.3780i<br>−0.7559 + 0.3780i |
| Binary 104 = | −0.4472<br>0.8944 | −0.8944<br>−0.4472 |
| Binary 105 = | −0.4472<br>0 + 0.8944i | 0 + 0.8944i<br>−0.4472 |
| Binary 106 = | 0.5774 − 0.5774i<br>0.5774 | −0.5774<br>0.5774 + 0.5774i |
| Binary 107 = | 0.8165 − 0.4082i<br>0.4082 | −0.4082<br>0.8165 + 0.4082i |
| Binary 108 = | −0.3780 − 0.3780i<br>0.7559 + 0.3780i | −0.7559 + 0.3780i<br>−0.3780 + 0.3780i |
| Binary 109 = | −0.4082<br>0.4082 + 0.8165i | −0.4082 + 0.8165i<br>−0.4082 |
| Binary 110 = | −0.3780 − 0.3780i<br>−0.7559 + 0.3780i | 0.7559 + 0.3780i<br>−0.3780 + 0.3780i |
| Binary 111 = | −0.5000 − 0.5000i<br>0.5000 + 0.5000i | −0.5000 − 0.5000i<br>−0.5000 + 0.5000i |
| Binary 112 = | −0.5774<br>0.5774 − 0.5774i | −0.5774 − 0.5774i<br>−0.5774 |
| Binary 113 = | −0.8165<br>0.4082 − 0.4082i | −0.4082 − 0.4082i<br>−0.8165 |
| Binary 114 = | −0.4082 − 0.4082i<br>0 + 0.8165i | 0 + 0.8165i<br>−0.4082 + 0.4082i |
| Binary 115 = | −0.5774 − 0.5774i<br>0.5774 | −0.5774<br>−0.5774 + 0.5774i |
| Binary 116 = | −0.4082<br>0.4082 − 0.8165i | −0.4082 − 0.8165i<br>−0.4082 |
| Binary 117 = | −0.8165<br>0.4082 + 0.4082i | −0.4082 + 0.4082i<br>−0.8165 |
| Binary 118 = | −0.5774 − 0.5774i<br>0 + 0.5774i | 0 + 0.5774i<br>−0.5774 + 0.5774i |
| Binary 119 = | −0.8165 − 0.4082i<br>0 + 0.4082i | 0 + 0.4082i<br>−0.8165 + 0.4082i |
| Binary 120 = | −0.4082<br>0.8165 − 0.4082i | −0.8165 − 0.4082i<br>−0.4082 |
| Binary 121 = | −0.4082 − 0.4082i<br>0.8165 | −0.8165<br>−0.4082 + 0.4082i |
| Binary 122 = | 0<br>0.8944 − 0.4472i | −0.8944 − 0.4472i<br>0 |
| Binary 123 = | 0 − 0.4082i<br>0.4082 − 0.8165i | −0.4082 − 0.8165i<br>0 + 0.4082i |
| Binary 124 = | −0.4082<br>0.8165 + 0.4082i | −0.8165 + 0.4082i<br>−0.4082 |
| Binary 125 = | −0.5774<br>0.5774 + 0.5774i | −0.5774 + 0.5774i<br>−0.5774 |
| Binary 126 = | −0.3780 − 0.7559i<br>0.3780 + 0.3780i | −0.3780 + 0.3780i<br>−0.3780 + 0.7559i |
| Binary 127 = | −0.3780 − 0.3780i<br>0.3780 + 0.7559i | −0.3780 + 0.7559i<br>−0.3780 + 0.3780i |
| Binary 128 = | 0 + 0.5774i<br>−0.5774 − 0.5774i | 0.5774 − 0.5774i<br>0 − 0.5774i |
| Binary 129 = | 0.7559 + 0.3780i<br>−0.3780 + 0.3780i | 0.3780 + 0.3780i<br>0.7559 − 0.3780i |
| Binary 130 = | 0 + 0.8165i<br>−0.4082 − 0.4082i | 0.4082 − 0.4082i<br>0 − 0.8165i |
| Binary 126 = | 0.3780 + 0.3780i<br>−0.7559 + 0.3780i | 0.7559 − 0.3780i<br>0.3780 − 0.3780i |
| Binary 126 = | 0 + 0.4082i<br>−0.4082 − 0.8165i | 0.4082 − 0.8165i<br>0 − 0.4082i |
| Binary 127 = | 0<br>−0.4472 − 0.8944i | 0.4472 − 0.8944i<br>0 |
| Binary 128 = | 0.8165 + 0.4082i<br>0.4082 | −0.4082<br>0.8165 − 0.4082i |
| Binary 129 = | 0.5774 + 0.5774i<br>−0.5774 | 0.5774<br>0.5774 − 0.5774i |
| Binary 130 = | 0 + 0.4082i<br>−0.8165 − 0.4082i | 0.8165 − 0.4082i<br>0 − 0.4082i |
| Binary 131 = | 0.5000 + 0.5000i<br>−0.5000 + 0.5000i | 0.5000 + 0.5000i<br>0.5000 − 0.5000i |
| Binary 132 = | 0 + 0.4472i<br>−0.8944 | 0.8944<br>0 − 0.4472i |
| Binary 133 = | 0.3780 + 0.3780i<br>−0.7559 + 0.3780i | 0.7559 + 0.3780i<br>0.3780 − 0.3780i |
| Binary 134 = | 0<br>−0.8944 − 0.4472i | 0.8944 − 0.4472i<br>0 |
| Binary 135 = | 0.3780 + 0.7559i<br>−0.3780 + 0.3780i | 0.3780 + 0.3780i<br>0.3780 − 0.7559i |
| Binary 136 = | 0.5774 + 0.5774i<br>0.5774 | −0.5774<br>0.5774 − 0.5774i |
| Binaiy 137 = | 0 + 0.8944i<br>−0.4472 | 0.4472<br>0 − 0.8944i |
| Binary 138 = | 0.3780 + 0.3780i<br>−0.3780 − 0.7559i | 0.3780 − 0.7559i<br>0.3780 − 0.3780i |
| Binary 139 = | 0.4082 + 0.4082i<br>0 − 0.8165i | 0 − 0.8165i<br>0.4082 − 0.4082i |
| Binary 140 = | 0 + 0.8944i<br>0 − 0.4472i | 0 − 0.4472i<br>0 − 0.8944i |
| Binary 141 = | 0.8165<br>0.4082 − 0.4082i | −0.4082 − 0.4082i<br>0.8165 |
| Binary 142 = | 0 + 0.4472i<br>0 − 0.8944i | 0 − 0.8944i<br>0 − 0.4472i |
| Binary 143 = | 0.4472<br>0 − 0.8944i | 0 − 0.8944i<br>0.4472 |
| Binary 144 = | 0.5000 + 0.5000i<br>0.5000 − 0.5000i | −0.5000 − 0.5000i<br>0.5000 − 0.5000i |
| Binary 145 = | 0.7559 + 0.3780i<br>0.3780 − 0.3780i | −0.3780 − 0.3780i<br>0.7559 − 0.3780i |
| Binary 146 = | 0.5000 + 0.5000i<br>0.5000 + 0.5000i | −0.5000 + 0.5000i<br>0.5000 + 0.5000i |
| Binary 147 = | 0.3780 + 0.3780i<br>0.3780 + 0.7559i | −0.3780 + 0.7559i<br>0.3780 + 0.3780i |
| Binary 148 = | 0.4082<br>0.8165 + 0.4082i | −0.8165 + 0.4082i<br>0.4082 |
| Binary 149 = | 0.5774<br>0.5774 + 0.5774i | −0.5774 + 0.5774i<br>0.5774 |
| Binary 150 = | 0.3780 + 0.3780i<br>0.7559 + 0.3780i | −0.7559 + 0.3780i<br>0.3780 − 0.3780i |
| Binary 151 = | 0 − 0.4082i<br>−0.4082 − 0.8165i | 0.4082 − 0.8165i<br>0 + 0.4082i |
| Binary 152 = | 0.4082 + 0.4082i<br>0.8165 | −0.8165<br>0.4082 − 0.4082i |
| Binary 153 = | 0.4082 + 0.4082i<br>−0.8165 | 0.8165<br>0.4082 − 0.4082i |
| Binary 154 = | 0.3780 + 0.7559i<br>−0.3780 − 0.3780i | 0.3780 − 0.3780i<br>0.3780 − 0.7559i |
| Binary 155 = | 0.5000 + 0.5000i<br>−0.5000 − 0.5000i | 0.5000 − 0.5000i<br>0.5000 − 0.5000i |
| Binary 156 = | 0<br>−0.4472 + 0.8944i | 0.4472 + 0.8944i<br>0 |
| Binary 157 = | 0.7559 + 0.3780i<br>−0.3780 − 0.3780i | 0.3780 − 0.3780i<br>0.7559 − 0.3780i |
| Binary 158 = | 0.4472 + 0.8944i<br>0 | 0<br>0.4472 − 0.8944i |
| Binary 159 = | 0.4082 + 0.8165i<br>−0.4082 | 0.4082<br>0.4082 − 0.8165i |
| Binary 160 = | 0.4082 + 0.8165i<br>0.4082 | −0.4082<br>0.4082 − 0.8165i |
| Binary 161 = | 0.4082 + 0.8165i<br>0 + 0.4082i | 0 + 0.4082i<br>0.4082 − 0.8165i |
| Binary 162 = | 0.7559 + 0.3780i<br>0.3780 + 0.3780i | −0.3780 + 0.3780i<br>0.7559 + 0.3780i |
| Binary 163 = | 0 + 0.4082i<br>−0.4082 + 0.8165i | 0.4082 + 0.8165i<br>0 − 0.4082i |
| Binary 164 = | 0 + 0.4082i<br>−0.8165 + 0.4082i | 0.8165 + 0.4082i<br>0 − 0.4082i |
| Binary 165 = | 0 + 0.5774i<br>−0.5774 + 0.5774i | 0.5774 + 0.5774i<br>0 − 0.5774i |
| Binary 166 = | 0.3780 + 0.7559i<br>0.3780 + 0.3780i | −0.3780 + 0.3780i<br>0.3780 − 0.7559i |
| Binary 167 = | 0 + 0.8165i<br>0.4082 + 0.4082i | −0.4082 + 0.4082i<br>0 − 0.8165i |

TABLE 1-continued

Bit allocation of $S_{Q_2,7,2}$

| | | |
|---|---|---|
| Binary 168 = | 0<br>−0.8944 + 0.4472i | 0.8944 + 0.4472i<br>0 |
| Binary 169 = | 0 + 0.8165i<br>−0.4082 + 0.4082i | 0.4082 + 0.4082i<br>0 − 0.8165i |
| Binary 170 = | 0.4082 + 0.8165i<br>0 − 0.4082i | 0 − 0.4082i<br>0.4082 − 0.8165i |
| Binary 171 = | 0.5774 + 0.5774i<br>0 − 0.5774i | 0 − 0.5774i<br>0.5774 − 0.5774i |
| Binary 172 = | 0.8944<br>0.4472 | −0.4472<br>0.8944 |
| Binary 173 = | 0.8165 + 0.4082i<br>0 − 0.4082i | 0 − 0.4082i<br>0.8165 − 0.4082i |
| Binary 174 = | 0.5774<br>−0.5774 − 0.5774i | 0.5774 − 0.5774i<br>0.5774 |
| Binary 175 = | 0.4082<br>−0.4082 − 0.8165i | 0.4082 − 0.8165i<br>0.4082 |
| Binary 176 = | 0.3780 + 0.7559i<br>0.3780 − 0.3780i | −0.3780 − 0.3780i<br>0.3780 − 0.7559i |
| Binary 177 = | 0.8165<br>−0.4082 − 0.4082i | 0.4082 − 0.4082i<br>0.8165 |
| Binary 178 = | 0 + 0.4472i<br>0.8944 | −0.8944<br>0 − 0.4472i |
| Binary 179 = | 0 + 0.4082i<br>0.4082 + 0.8165i | −0.4082 + 0.8165i<br>0 − 0.4082i |
| Binary 180 = | 0.7559 − 0.3780i<br>0.3780 + 0.3780i | −0.3780 + 0.3780i<br>0.7559 − 0.3780i |
| Binary 181 = | 0 + 0.4472i<br>0 + 0.8944i | 0 + 0.8944i<br>0 − 0.4472i |
| Binary 182 = | 0 + 0.4082i<br>0.8165 + 0.4082i | −0.8165 + 0.4082i<br>0 − 0.4082i |
| Binary 183 = | 0 + 0.5774i<br>0.5774 + 0.5774i | −0.5774 − 0.5774i<br>0 − 0.5774i |
| Binary 184 = | 0.8165<br>0.4082 + 0.4082i | −0.4082 + 0.4082i<br>0.8165 |
| Binary 185 = | 0 + 0.8944i<br>0 + 0.4472i | 0 + 0.4472i<br>0 − 0.8944i |
| Binary 186 = | 0.4472 − 0.8944i<br>0 | 0<br>0.4472 + 0.8944i |
| Binary 187 = | 0.4082 − 0.8165i<br>0 − 0.4082i | 0 − 0.4082i<br>0.4082 + 0.8165i |
| Binary 188 = | 0.3780 − 0.7559i<br>−0.3780 + 0.3780i | 0.3780 + 0.3780i<br>0.3780 + 0.7559i |
| Binary 189 = | 0.5000 − 0.5000i<br>−0.5000 + 0.5000i | 0.5000 + 0.5000i<br>0.5000 + 0.5000i |
| Binary 190 = | 0 − 0.8944i<br>−0.4472 | 0.4472<br>0 + 0.8944i |
| Binary 191 = | 0.3780 − 0.7559i<br>−0.3780 − 0.3780i | 0.3780 − 0.3780i<br>0.3780 + 0.7559i |
| Binary 192 = | 0 − 0.8165i<br>−0.4082 + 0.4082i | 0.4082 + 0.4082i<br>0 + 0.8165i |
| Binary 193 = | 0.3780 − 0.3780i<br>−0.7559 + 0.3780i | 0.7559 + 0.3780i<br>0.3780 + 0.3780i |
| Binary 194 = | 0.8944<br>0 + 0.4472i | 0 + 0.4472i<br>0.8944 |
| Binary 195 = | 0.8165<br>−0.4082 − 0.4082i | 0.4082 + 0.4082i<br>0.8165 |
| Binary 196 = | 0.3780 − 0.3780i<br>−0.3780 + 0.7559i | 0.3780 + 0.7559i<br>0.3780 + 0.3780i |
| Binary 197 = | 0.5774<br>−0.5774 + 0.5774i | 0.5774 + 0.5774i<br>0.5774 |
| Binary 198 = | 0 − 0.4082i<br>−0.8165 − 0.4082i | 0.8165 − 0.4082i<br>0 + 0.4082i |
| Binary 199 = | 0 − 0.8165i<br>−0.4082 − 0.4082i | 0.4082 − 0.4082i<br>0 + 0.8165i |
| Binary 200 = | 0 − 0.4472i<br>−0.8944 | 0.8944<br>0 + 0.4472i |
| Binary 201 = | 0.4082<br>−0.8165 + 0.4082i | 0.8165 + 0.4082i<br>0.4082 |
| Binary 202 = | 0.4082 − 0.8165i<br>−0.4082 | 0.4082<br>0.4082 + 0.8165i |
| Binary 203 = | 0.5774 − 0.5774i<br>0 − 0.5774i | 0 − 0.5774i<br>0.5774 + 0.5774i |
| Binary 204 = | 0.4082 − 0.8165i<br>0 + 0.4082i | 0 + 0.4082i<br>0.4082 + 0.8165i |
| Binary 205 = | 0.7559 − 0.3780i<br>−0.3780 + 0.3780i | 0.3780 + 0.3780i<br>0.7559 + 0.3780i |
| Binary 206 = | 0.5774 − 0.5774i<br>−0.5774 | 0.5774<br>0.5774 + 0.5774i |
| Binary 207 = | 0.4082 − 0.4082i<br>0 − 0.8165i | 0 − 0.8165i<br>0.4082 + 0.4082i |
| Binary 208 = | 0 − 0.8944i<br>0 + 0.4472i | 0 + 0.4472i<br>0 + 0.8944i |
| Binary 209 = | 0.4082 − 0.4082i<br>−0.8165 | 0.8165<br>0.4082 + 0.4082i |
| Binary 210 = | 0.8165 − 0.4082i<br>0 + 0.4082i | 0 + 0.4082i<br>0.8165 + 0.4082i |
| Binary 211 = | 0.4082<br>0.4082 + 0.8165i | −0.4082 + 0.8165i<br>0.4082 |
| Binary 212 = | 0.5774 − 0.5774i<br>0 + 0.5774i | 0 + 0.5774i<br>0.5774 + 0.5774i |
| Binary 213 = | 0.4082 − 0.4082i<br>0 + 0.8165i | 0 + 0.8165i<br>0.4082 + 0.4082i |
| Binary 214 = | 0.8165 − 0.4082i<br>−0.4082 | 0.4082<br>0.8165 + 0.4082i |
| Binary 215 = | 0 − 0.5774i<br>−0.5774 − 0.5774i | 0.5774 − 0.5774i<br>0 + 0.5774i |
| Binary 216 = | 0.4472<br>0.8944 | −0.8944<br>0.4472 |
| Binary 217 = | 4472<br>−0.8944 | 0.8944<br>0.4472 |
| Binary 218 = | 0.4082<br>−0.8165 − 0.4082i | 0.8165 − 0.4082i<br>0.4082 |
| Binary 219 = | 0.8944<br>0 − 0.4472i | 0 − 0.4472i<br>0.8944 |
| Binary 220 = | 0 − 0.4082i<br>−0.4082 + 0.8165i | 0.4082 + 0.8165i<br>0 + 0.4082i |
| Binary 221 = | 0.8165 + 0.4082i<br>−0.4082 | 0.4082<br>0.8165 − 0.4082i |
| Binary 222 = | 0.3780 − 0.3780i<br>−0.7559 − 0.3780i | 0.7559 − 0.3780i<br>0.3780 + 0.3780i |
| Binary 223 = | 0.5000 − 0.5000i<br>−0.5000 − 0.5000i | 0.5000 − 0.5000i<br>0.5000 + 0.5000i |
| Binary 224 = | 0 − 0.5774i<br>−0.5774 + 0.5774i | 0.5774 + 0.5774i<br>0 + 0.5774i |
| Binary 225 = | 0.8165 + 0.4082i<br>0 + 0.4082i | 0 + 0.4082i<br>0.8165 − 0.4082i |
| Binary 226 = | 0.4082 − 0.4082i<br>0.8165 | −0.8165<br>0.4082 + 0.4082i |
| Binary 227 = | 0.3780 + 0.3780i<br>−0.3780 + 0.7559i | 0.3780 + 0.7559i<br>0.3780 − 0.3780i |
| Binary 228 = | 0.3780 − 0.3780i<br>0.7559 + 0.3780i | −0.7559 + 0.3780i<br>0.3780 + 0.3780i |
| Binary 229 = | 0.4082<br>−0.4082 + 0.8165i | 0.4082 + 0.8165i<br>0.4082 |
| Binary 230 = | 0 − 0.4082i<br>0.8165 + 0.4082i | −0.8165 + 0.4082i<br>0 + 0.4082i |
| Binary 231 = | 0.4082 + 0.4082i<br>0 + 0.8165i | 0 + 0.8165i<br>0.4082 − 0.4082i |
| Binary 232 = | 0 − 0.4082i<br>−0.8165 + 0.4082i | 0.8165 + 0.4082i<br>0 + 0.4082i |
| Binary 233 = | 0.5774 + 0.5774i<br>0 + 0.5774i | 0 + 0.5774i<br>0.5774 − 0.5774i |
| Binary 234 = | 0.8944 − 0.4472i<br>0 | 0<br>0.8944 + 0.4472i |
| Binary 235 = | 0.8165 − 0.4082i<br>0 + 0.4082i | 0 − 0.4082i<br>0.8165 + 0.4082i |
| Binary 236 = | 0.3780 − 0.7559i<br>0.3780 + 0.3780i | −0.3780 + 0.3780i<br>0.3780 + 0.7559i |
| Binary 237 = | 0.8944 + 0.4472i<br>0 | 0<br>0.8944 − 0.4472i |
| Binary 238 = | 0.7559 − 0.3780i<br>−0.3780 − 0.3780i | 0.3780 − 0.3780i<br>0.7559 + 0.3780i |
| Binary 239 = | 0.3780 − 0.3780i<br>−0.3780 − 0.7559i | 0.3780 + 0.7559i<br>0.3780 + 0.3780i |
| Binary 240 = | 0 − 0.8165i<br>0.4082 + 0.4082i | −0.4082 + 0.4082i<br>0 + 0.8165i |
| Binary 241 = | 0 − 0.4472i<br>0 + 0.4472i | 0 + 0.8944i<br>0 + 0.4472i |
| Binary 242 = | 0 − 0.4472i<br>0.8944 | −0.8944<br>0 + 0.4472i |
| Binary 243 = | 0.4472<br>0 + 0.8944i | 0 + 0.8944i<br>0.4472 |
| Binary 244 = | 0.5000 − 0.5000i<br>0.5000 + 0.5000i | −0.5000 + 0.5000i<br>0.5000 + 0.5000i |

TABLE 1-continued

Bit allocation of $S_{Q_2,7,2}$

| Binary 245 = | 0.3780 − 0.3780i | −0.3780 + 0.7559i |
| --- | --- | --- |
| | 0.3780 + 0.7559i | 0.3780 + 0.3780i |
| Binary 246 = | 0 | −0.8944 + 0.4472i |
| | 0.8944 + 0.4472i | 0 |
| Binary 247 = | 0 | −0.4472 + 0.8944i |
| | 0.4472 + 0.8944i | 0 |
| Binary 248 = | 0 − 0.5774i | −0.5774 + 0.5774i |
| | 0.5774 + 0.5774i | 0 + 0.5774i |
| Binary 249 = | 0 − 0.4082i | −0.4082 + 0.8165i |
| | 0.4082 + 0.8165i | 0 + 0.4082i |
| Binary 250 = | 0.4472 | 0 + 0.8944i |
| | 0 + 0.8944i | 0.4472 |

TABLE 1-continued

Bit allocation of $S_{Q_2,7,2}$

| Binary 251 = | 0.500 − 0.500i | −0.500 + 0.500i |
| --- | --- | --- |
| | 0.500 + 0.500i | 0.500 + 0.500i |
| Binary 252 = | 0.3780 − 0.3780i | −0.3780 + 0.7559i |
| | 0.3870 + 0.7559i | 0.3780 + 0.3780i |
| Binary 253 = | 0 | −0.8944 − 0.4472i |
| | 0.8944 + 0.8944i | 0 |
| Binary 254 = | 0 | − 0.4472 + 0.8944i |
| | 0.4472 + 0.8944i | 0 |
| Binary 255 = | 0 − 0.5774i | −0.5774 + 0.5774i |
| | 0.5774 + 0.5774i | 0 + 0.5774i |
| Binary 256 = | 0 − 0.4082i | −0.4082 + 0.8165i |
| | 0.4082 + 0.8165i | 0 + 0.4082i |

TABLE 2

Bit allocation of Coset Extension of $G_{63,37}$

| Binary 0 = | 0 | 1.0000 − 0.0000i | 0 |
| --- | --- | --- | --- |
| | 0 | 0 | 1.0000 + 0.0000i |
| | 0.7660 + 0.6428i | 0 | 0 |
| Binary 1 = | 0.0739 + 0.7609i | −0.0008 + 0.0279i | 0.4060 − 0.5000i |
| | 0.1007 − 0.4901i | −0.1545 + 0.6372i | 0.4716 − 0.3121i |
| | −0.4007 + 0.0692i | −0.7469 + 0.1069i | −0.4246 − 0.2916i |
| Binary 2 = | 0.0266 + 0.0083i | 0.1062 + 0.6353i | −0.5184 − 0.5619i |
| | 0.5715 + 0.3213i | −0.0781 + 0.5601i | 0.2156 + 0.4515I |
| | −0.0994 + 0.7480i | 0.4996 − 0.1254i | 0.2776 − 0.2971i |
| Binary 3 = | 0.4351 − 0.2109i | 0.5635 − 0.3833i | −0.2743 − 0.4759i |
| | 0.1104 − 0.6464i | −0.0909 − 0.1251i | 0.7376 − 0.0445i |
| | 0.2901 + 0.5021i | −0.5223 − 0.4887i | 0.2303 − 0.3148i |
| Binary 4 = | −0.7971 − 0.6038i | 0 | 0 |
| | 0 | −0.4113 + 0.9115i | 0 |
| | 0 | 0 | −0.0249 − 0.9997i |
| Binary 5 = | 0.0244 + 0.0134i | −0.5168 + 0.3843i | 0.6410 + 0.4166i |
| | 0.4965 + 0.4282i | −0.5341 + 0.1861i | −0.3203 − 0.3843i |
| | −0.2456 + 0.7135i | 0.3395 + 0.3874i | −0.1957 + 0.3564i |
| Binary 6 = | 0.2708 − 0.9626i | 0 | 0 |
| | 0 | −0.6617 + 0.7498i | 0 |
| | 0 | 0 | −0.9988 − 0.0498i |
| Binary 7 = | 0.4562 − 0.8899i | 0 | 0 |
| | 0 | −0.9691 − 0.2468i | 0 |
| | 0 | 0 | 0.9802 − 0.1981i |
| Binary 8 = | 0.2429 + 0.4181i | −0.1510 − 0.6646i | −0.4024 − 0.3739i |
| | 0.6528 + 0.0618i | −0.1497 + 0.0389i | 0.6917 − 0.2600i |
| | −0.4790 + 0.3268i | −0.6457 + 0.3076i | 0.1273 − 0.3687i |
| Binary 9 = | 0 | 0 | −0.9010 + 0.4339i |
| | 0.9802 − 0.1981i | 0 | 0 |
| | 0 | 0.4562 − 0.8899i | 0 |
| Binary 10 = | −0.2164 − 0.6463i | 0.5383 + 0.1093i | −0.2194 + 0.4308i |
| | −0.1450 + 0.0536i | −0.4547 + 0.5825i | 0.3023 + 0.5819i |
| | −0.6119 + 0.3704i | 0.0837 + 0.3810i | −0.5344 − 0.2251i |
| Binary 11 = | 0.2989 − 0.5705i | 0.7253 − 0.2414i | −0.0114 − 0.0254i |
| | 0.4004 − 0.3993i | −0.5002 + 0.0108i | −0.1373 − 0.6411i |
| | −0.4739 − 0.2017i | 0.1566 + 0.3752i | 0.6266 − 0.4204i |
| Binary 12 = | −0.7532 + 0.1306i | 0.0256 + 0.0109i | 0.2406 − 0.5975i |
| | 0.4962 + 0.0638i | 0.5367 + 0.3766i | 0.3587 − 0.4372i |
| | −0.0989 − 0.3944i | −0.1734 + 0.7344i | −0.4917 − 0.1535i |
| Binary 13 = | −0.0840 − 0.6763i | 0.1484 + 0.5289i | 0.1063 − 0.4717i |
| | −0.1528 + 0.0238i | −0.7258 − 0.1389i | −0.4365 − 0.4893i |
| | −0.6731 + 0.2418i | −0.3009 + 0.2483i | 0.5734 + 0.0862i |
| Binary 14 = | 0 | 0.3653 − 0.9309i | 0 |
| | 0 | 0 | 0.9556 − 0.2948i |
| | −0.5837 + 0.8119i | 0 | 0 |
| Binary 15 = | −0.3631 − 0.4121i | −0.3025 − 0.3772i | −0.3414 + 0.5899i |
| | 0.7142 − 0.1898i | −0.6547 + 0.0362i | 0.1362 + 0.0733i |
| | 0.1634 − 0.3542i | 0.4249 − 0.3945i | 0.6826 + 0.2137i |
| Binary 16 = | 0.0175 − 0.0217i | 0.2887 + 0.5757i | 0.5216 − 0.5589i |
| | 0.5079 − 0.4146i | 0.0905 + 0.5583i | −0.4341 + 0.2487i |
| | 0.6600 + 0.3658i | 0.4404 − 0.2671i | 0.3170 + 0.2546i |
| Binary 17 = | 0.5425 − 0.8400i | 0 | 0 |
| | 0 | 0.6982 + 0.7159i | 0 |
| | 0 | 0 | −0.3185 − 0.9479i |
| Binary 18 = | −0.2594 − 0.7191i | −0.0063 + 0.0272i | 0.6302 + 0.1332i |
| | 0.0233 + 0.4998i | −0.2777 + 0.5939i | 0.4929 + 0.2773i |

TABLE 2-continued

Bit allocation of Coset Extension of $G_{63,37}$

|  | | | |
|---|---|---|---|
| | 0.3712 − 0.1659i | −0.7533 − 0.0432i | 0.0658 − 0.5109i |
| Binary 19 = | −0.3696 + 0.3118i | 0.6283 − 0.2641i | 0.2984 − 0.4612i |
| | 0.0525 + 0.6536i | −0.0643 − 0.1406i | 0.3761 + 0.6361i |
| | −0.4050 − 0.4150i | −0.4151 − 0.5825i | 0.3852 + 0.0613i |
| Binary 20 = | −0.6807 − 0.0347i | 0.5466 − 0.0543i | −0.4460 − 0.1866i |
| | −0.0031 + 0.1546i | −0.2628 + 0.6907i | −0.5577 + 0.3449i |
| | 0.1212 + 0.7049i | 0.1923 + 0.3394i | 0.1845 − 0.5497i |
| Binary 21 = | 0.0230 + 0.0158i | 0.6414 − 0.0584i | 0.3336 − 0.6878i |
| | 0.4514 + 0.4755i | 0.5527 + 0.1197i | −0.3415 + 0.3656i |
| | −0.3155 + 0.6855i | −0.0877 − 0.5076i | 0.3780 + 0.1499i |
| Binary 22 = | −0.0063 + 0.0272i | 0.6302 + 0.1332i | −0.6609 − 0.3841i |
| | −0.2777 + 0.5939i | 0.4929 + 0.2773i | 0.3391 + 0.3679i |
| | −0.7533 − 0.0432i | 0.0658 − 0.5109i | 0.1777 − 0.3657i |
| Binary 23 = | −0.0163 − 0.6813i | 0.1492 − 0.5287i | −0.4812 − 0.0469i |
| | −0.1544 + 0.0084i | 0.5469 + 0.4970i | −0.4312 + 0.4940i |
| | −0.6939 + 0.1736i | 0.3862 − 0.0550i | 0.0143 − 0.5797i |
| Binary 24 = | −0.1524 + 0.6643i | 0.0415 − 0.5477i | −0.2613 + 0.4068i |
| | 0.1517 + 0.0299i | 0.6346 + 0.3787i | 0.2429 + 0.6091i |
| | 0.7153 + 0.0030i | 0.3677 − 0.1304i | −0.5093 − 0.2772i |
| Binary 25 = | −0.0088 − 0.0265i | −0.2105 + 0.6087i | −0.6959 − 0.3164i |
| | −0.0728 − 0.6516i | −0.3365 + 0.4546i | 0.3740 + 0.3323i |
| | 0.6653 − 0.3559i | 0.4987 + 0.1288i | 0.1404 − 0.3816i |
| Binary 26 = | −0.0184 − 0.0210i | 0.6171 − 0.1844i | −0.4598 − 0.6107i |
| | −0.3202 − 0.5722i | 0.5655 + 0.0078i | 0.1696 + 0.4707i |
| | 0.4748 − 0.5864i | −0.1865 − 0.4801i | 0.3058 − 0.2679i |
| Binary 27 = | 0 | 0 | −0.7331 + 0.6802i |
| | 0.2708 + 0.9626i | 0 | 0 |
| | 0 | −0.6617 − 0.7498i | 0 |
| Binary 28 = | −0.0278 − 0.0015i | −0.0218 + 0.6437i | 0.2635 − 0.7176i |
| | −0.6331 − 0.1703i | −0.1875 + 0.5335i | −0.3034 + 0.3978i |
| | −0.0882 − 0.7494i | 0.5145 − 0.0239i | 0.3910 + 0.1115i |
| Binary 29 = | 0.3692 + 0.5729i | 0.5060 + 0.2138i | −0.4835 + 0.0013i |
| | 0.1273 − 0.0877i | −0.5611 + 0.4809i | −0.3799 + 0.5345i |
| | 0.5016 − 0.5099i | 0.0065 + 0.3900i | −0.0435 − 0.5782i |
| Binary 30 = | 0.6283 − 0.2641i | 0.2984 − 0.4612i | −0.0827 + 0.4764i |
| | −0.0643 − 0.1406i | 0.3761 + 0.6361i | 0.4604 + 0.4670i |
| | −0.4151 − 0.5825i | 0.3852 + 0.0613i | −0.5770 − 0.0576i |
| Binary 31 = | 0.5913 + 0.2554i | 0.0403 − 0.7634i | −0.0184 − 0.0210i |
| | 0.4282 + 0.3695i | −0.1727 + 0.4696i | −0.3202 − 0.5722i |
| | 0.1657 − 0.4877i | 0.4065 − 0.0087i | 0.4748 − 0.5864i |
| Binary 32 = | −0.5486 + 0.0270i | −0.3005 + 0.3788i | 0.0516 − 0.6796i |
| | 0.2969 − 0.6767i | 0.1810 + 0.6303i | −0.1545 − 0.0070i |
| | −0.1751 − 0.3486i | −0.4792 − 0.3265i | −0.7077 + 0.1036i |
| Binary 33 = | −0.2597 − 0.5894i | −0.3967 − 0.6534i | 0.0213 + 0.0180i |
| | −0.0626 − 0.5621i | 0.1219 + 0.4852i | 0.4019 + 0.5181i |
| | −0.4532 + 0.2448i | 0.3310 − 0.2362i | −0.3821 + 0.6506i |
| Binary 34 = | 0.3336 − 0.6878i | 0.0277 − 0.0027i | 0.4538 − 0.4571i |
| | −0.3415 + 0.3656i | 0.6514 + 0.0740i | 0.5004 − 0.2636i |
| | 0.3780 + 0.1499i | 0.1989 + 0.7279i | −0.3934 − 0.3325i |
| Binary 35 = | 0 | 0 | 0.6235 − 0.7818i |
| | 0.4562 − 0.8899i | 0 | 0 |
| | 0 | −0.9691 − 0.2468i | 0 |
| Binary 36 = | 0.4828 − 0.0254i | −0.0177 + 0.6813i | −0.4685 − 0.2868i |
| | 0.3528 − 0.5527i | 0.1546 − 0.0007i | 0.6265 − 0.3919i |
| | 0.0723 + 0.5753i | 0.7017 − 0.1388i | 0.0517 − 0.3867i |
| Binary 37 = | 0.1191 − 0.6711i | 0.5385 − 0.1084i | 0.4779 − 0.0733i |
| | −0.1530 − 0.0223i | −0.1927 + 0.7134i | 0.2960 − 0.5851i |
| | −0.7145 + 0.0326i | 0.2251 + 0.3186i | 0.1292 + 0.5653i |
| Binary 38 = | 0.4539 − 0.1666i | −0.6807 + 0.0333i | −0.4381 + 0.3313i |
| | 0.1742 − 0.6322i | 0.0123 + 0.1541i | −0.1359 − 0.7264i |
| | 0.2386 + 0.5285i | 0.1908 + 0.6893i | −0.3410 − 0.1894i |
| Binary 39 = | 0.6138 + 0.1953i | 0.3637 + 0.6724i | 0.0231 − 0.0156i |
| | 0.4628 + 0.3250i | −0.0975 − 0.4907i | 0.6075 − 0.2465i |
| | 0.1164 − 0.5018i | −0.3423 + 0.2194i | 0.5228 + 0.5441i |
| Binary 40 = | −0.4812 − 0.0469i | −0.4504 − 0.5115i | −0.2255 − 0.5009i |
| | −0.4312 + 0.4940i | −0.1128 + 0.1057i | 0.7384 + 0.0291i |
| | 0.0143 − 0.5797i | −0.4200 + 0.5790i | 0.2605 − 0.2904i |
| Binary 41 = | 0.5354 − 0.3581i | 0.5746 − 0.5042i | −0.0140 + 0.0241i |
| | 0.5427 − 0.1592i | −0.4567 + 0.2043i | −0.4404 + 0.4857i |
| | −0.3198 − 0.4038i | 0.2901 + 0.2849i | −0.7071 − 0.2634i |
| Binary 42 = | 0 | −0.1243 − 0.9922i | 0 |
| | 0 | 0 | 0.9950 + 0.0996i |
| | −0.3185 − 0.9479i | 0 | 0 |
| Binary 43 = | 0.4538 − 0.4571i | −0.1865 − 0.7413i | 0.0195 − 0.0199i |
| | 0.5004 − 0.2636i | −0.0266 + 0.4996i | 0.5466 − 0.3620i |
| | −0.3934 − 0.3325i | 0.3859 − 0.1281i | 0.6203 + 0.4297i |

TABLE 2-continued

Bit allocation of Coset Extension of $G_{63,37}$

| | | | |
|---|---|---|---|
| Binary 44 = | 0.6682 − 0.1343i | 0.5465 + 0.0551i | −0.0374 − 0.4821i |
| | −0.0351 − 0.1506i | −0.3944 + 0.6249i | −0.5614 − 0.3389i |
| | −0.2914 − 0.6532i | 0.1212 + 0.3708i | 0.5734 − 0.0866i |
| Binary 45 = | 0.6982 − 0.7159i | 0 | 0 |
| | 0 | −0.3185 + 0.9479i | 0 |
| | 0 | 0 | 0.5425 + 0.8400i |
| Binary 46 = | 0.0214 − 0.0178i | −0.3806 + 0.5196i | −0.3675 + 0.6703i |
| | 0.5800 − 0.3058i | −0.4555 + 0.3352i | 0.3593 − 0.3481i |
| | 0.5744 + 0.4893i | 0.4386 + 0.2701i | −0.3700 − 0.1686i |
| Binary 47 = | 0.3428 − 0.4292i | 0.3190 − 0.3634i | −0.6402 − 0.2338i |
| | 0.3109 + 0.6704i | −0.1494 − 0.6385i | −0.0485 + 0.1468i |
| | 0.3772 + 0.0994i | 0.4623 + 0.3500i | −0.0919 + 0.7093i |
| Binary 48 = | −0.7365 + 0.2049i | −0.0276 + 0.0041i | 0.5629 + 0.3130i |
| | 0.5001 + 0.0141i | −0.6543 − 0.0415i | 0.3892 + 0.4103i |
| | −0.1377 − 0.3826i | −0.2350 − 0.7170i | 0.2135 − 0.4688i |
| Binary 49 = | −0.4113 − 0.9115i | 0 | 0 |
| | 0 | −0.0249 + 0.9997i | 0 |
| | 0 | 0 | −0.7971 + 0.6038i |
| Binary 50 = | −0.4252 − 0.2301i | 0.6782 − 0.0671i | −0.4376 − 0.3320i |
| | −0.5893 + 0.2877i | −0.0200 − 0.1533i | 0.6624 − 0.3276i |
| | 0.2383 − 0.5286i | −0.2249 − 0.6790i | 0.0899 − 0.3796i |
| Binary 51 = | 0.0257 − 0.0107i | 0.4897 + 0.4184i | −0.7582 − 0.0972i |
| | 0.6443 − 0.1213i | 0.3002 + 0.4793i | 0.4553 + 0.2073i |
| | 0.4046 + 0.6369i | 0.3021 − 0.4172i | 0.0217 − 0.4060i |
| Binary 52 = | 0.2833 + 0.3918i | 0.4754 + 0.4884i | 0.4211 − 0.3528i |
| | 0.6557 − 0.0035i | 0.1074 − 0.1112i | 0.1719 + 0.7187i |
| | −0.4441 + 0.3729i | 0.3906 − 0.5992i | 0.3501 + 0.1721i |
| Binary 53 = | −0.6402 − 0.2338i | −0.0133 − 0.5491i | 0.0108 − 0.4834i |
| | −0.0485 + 0.1468i | 0.6691 + 0.3137i | −0.5248 − 0.3931i |
| | −0.0919 + 0.7093i | 0.3529 − 0.1664i | 0.5791 − 0.0291i |
| Binary 54 = | 0.9802 + 0.1981i | 0 | 0 |
| | 0 | 0.4562 + 0.8899i | 0 |
| | 0 | 0 | −0.9691 + 0.2468i |
| Binary 55 = | 0 | 0 | −0.5837 − 0.8119i |
| | 0.3653 + 0.9309i | 0 | 0 |
| | 0 | 0.9556 + 0.2948i | 0 |
| Binary 56 = | −0.3984 + 0.5529i | 0.4205 + 0.3534i | −0.0349 + 0.4822i |
| | 0.1282 + 0.0865i | −0.6779 + 0.2941i | 0.5046 + 0.4188i |
| | 0.6579 + 0.2806i | −0.1087 + 0.3746i | −0.5799 + 0.0002i |
| Binary 57 = | −0.2255 − 0.5009i | −0.3988 + 0.2734i | −0.6738 − 0.1023i |
| | 0.7384 + 0.0291i | −0.0128 + 0.6556i | −0.0185 + 0.1535i |
| | 0.2605 − 0.2904i | −0.3617 − 0.4532i | 0.0504 + 0.7135i |
| Binary 58 = | 0 | 0 | −0.7331 − 0.6802i |
| | 0.9950 + 0.0996i | 0 | 0 |
| | 0 | −0.8533 − 0.5214i | 0 |
| Binary 59 = | −0.5812 − 0.3560i | 0.4826 − 0.2623i | 0.1088 + 0.4711i |
| | −0.0767 + 0.1343i | 0.0261 + 0.7385i | 0.6056 + 0.2515i |
| | −0.2307 + 0.6770i | 0.3090 + 0.2381i | −0.5540 + 0.1711i |
| Binary 60 = | −0.9397 + 0.3420i | 0 | 0 |
| | 0 | −0.9397 + 0.3420i | 0 |
| | 0 | 0 | −0.9397 + 0.3420i |
| Binary 61 = | 0.0194 + 0.0200i | 0.3446 + 0.5441i | −0.1536 + 0.7489i |
| | 0.3483 + 0.5555i | 0.1456 + 0.5465i | 0.2407 − 0.4386i |
| | −0.4450 + 0.6094i | 0.4117 − 0.3096i | −0.4033 − 0.0520i |
| Binary 62 = | 0 | 0 | −0.8533 + 0.5214i |
| | −0.7331 + 0.6802i | 0 | 0 |
| | 0 | 0.8262 + 0.5633i | 0 |
| Binary 63 = | 0.3838 − 0.3929i | −0.4616 + 0.1437i | −0.1524 + 0.6643i |
| | 0.2427 + 0.6980i | −0.2055 + 0.6227i | 0.1517 + 0.0299i |
| | 0.3655 + 0.1364i | −0.2120 − 0.5397i | 0.7153 + 0.0030i |
| Binary 64 = | 0.5989 − 0.3253i | −0.0141 + 0.5491i | −0.4624 − 0.1413i |
| | −0.0780 − 0.1335i | −0.6526 − 0.3466i | −0.5206 + 0.3987i |
| | −0.4710 − 0.5383i | −0.3607 + 0.1486i | 0.1289 − 0.5654i |
| Binary 65 = | 0.9950 + 0.0996i | 0 | 0 |
| | 0 | −0.8533 − 0.5214i | 0 |
| | 0 | 0 | −0.1243 − 0.9922i |
| Binary 66 = | 0.9556 − 0.2948i | 0 | 0 |
| | 0 | 0.0747 + 0.9972i | 0 |
| | 0 | 0 | 0.3653 − 0.9309i |
| Binary 67 = | 0.3553 + 0.3279i | 0.6515 − 0.2002i | −0.4951 + 0.2379i |
| | 0.6420 − 0.1334i | −0.0499 − 0.1463i | 0.0107 − 0.7389i |
| | −0.3614 + 0.4535i | −0.3550 − 0.6209i | −0.2968 − 0.2532i |
| Binary 68 = | −0.0036 + 0.0276i | −0.6072 + 0.2149i | 0.4633 − 0.6080i |
| | −0.2172 + 0.6186i | −0.5652 + 0.0204i | −0.4072 + 0.2907i |
| | −0.7539 + 0.0320i | 0.2102 + 0.4702i | 0.3408 + 0.2218i |

TABLE 2-continued

Bit allocation of Coset Extension of $G_{63,37}$

| | | | |
|---|---|---|---|
| Binary 69 = | 0.6815 + 0.0007i | 0.2003 + 0.5115i | 0.1552 + 0.4579i |
| | −0.0046 − 0.1546i | −0.7360 − 0.0659i | 0.6276 + 0.1899i |
| | −0.1562 − 0.6980i | −0.2747 + 0.2770i | −0.5343 + 0.2254i |
| Binary 70 = | 0.7458 − 0.1680i | −0.0036 + 0.0276i | −0.6072 + 0.2149i |
| | −0.4988 − 0.0390i | −0.2172 + 0.6186i | −0.5652 + 0.0204i |
| | 0.1185 + 0.3890i | −0.7539 − 0.0320i | 0.2102 + 0.4702i |
| Binary 71 = | −0.6617 − 0.7498i | 0 | 0 |
| | 0 | −0.9988 + 0.0498i | 0 |
| | 0 | 0 | 0.2708 + 0.9626i |
| Binary 72 = | 0 | 0 | −0.9988 + 0.0498i |
| | −0.4113 + 0.9115i | 0 | 0 |
| | 0 | −0.0249 − 0.9997i | 0 |
| Binary 73 = | 0 | 0 | 0.5425 − 0.8400i |
| | 0.0747 + 0.9972i | 0 | 0 |
| | 0 | 0.3653 − 0.9309i | 0 |
| Binary 74 = | 0.5466 − 0.0543i | −0.4460 − 0.1866i | −0.5437 + 0.4109i |
| | −0.2628 + 0.6907i | −0.5577 + 0.3449i | 0.0970 + 0.1204i |
| | 0.1923 + 0.3394i | 0.1845 − 0.5497i | 0.5460 + 0.4621i |
| Binary 75 = | 0 | 0 | −0.9888 + 0.1490i |
| | −0.1243 − 0.9922i | 0 | 0 |
| | 0 | 0.9950 + 0.0996i | 0 |
| Binary 76 = | 0.8262 − 0.5633i | 0 | 0 |
| | 0 | −0.9888 + 0.1490i | 0 |
| | 0 | 0 | −0.7331 − 0.6802i |
| Binary 77 = | 0.2497 − 0.6342i | 0.3421 + 0.4297i | −0.4450 + 0.1890i |
| | −0.1456 − 0.0522i | −0.7228 + 0.1540i | −0.1425 + 0.6401i |
| | −0.7068 − 0.1096i | −0.1808 + 0.3457i | −0.2647 − 0.5159i |
| Binary 78 = | 0.2887 + 0.5757i | 0.5216 − 0.5589i | −0.0006 − 0.0279i |
| | 0.0905 + 0.5583i | −0.4341 + 0.2487i | 0.1225 − 0.6441i |
| | 0.4404 − 0.2671i | 0.3170 + 0.2546i | 0.7407 − 0.1440i |
| Binary 79 = | 0.0150 + 0.0235i | −0.3270 + 0.5549i | −0.0359 − 0.7636i |
| | 0.2313 + 0.6135i | −0.4199 + 0.3789i | −0.1251 + 0.4844i |
| | −0.5569 + 0.5091i | 0.4633 + 0.2251i | 0.4036 − 0.0491i |
| Binary 80 = | 0.0277 − 0.0027i | 0.4538 − 0.4571i | −0.1865 − 0.7413i |
| | 0.6514 + 0.0740i | 0.5004 − 0.2636i | −0.0266 + 0.4996i |
| | 0.1989 + 0.7279i | −0.3934 − 0.3325i | 0.3859 − 0.1281i |
| Binary 81 = | 0.0614 + 0.4796i | 0.6277 + 0.2654i | −0.5322 − 0.1360i |
| | 0.5776 + 0.3105i | 0.0558 − 0.1442i | 0.4832 − 0.5591i |
| | −0.5683 + 0.1151i | 0.1272 − 0.7039i | −0.0646 − 0.3847i |
| Binary 82 = | 0.0074 + 0.0269i | 0.5289 + 0.3675i | 0.6977 − 0.3124i |
| | 0.0402 + 0.6544i | 0.3465 + 0.4470i | −0.4966 + 0.0606i |
| | −0.6823 + 0.3223i | 0.2591 − 0.4452i | 0.1932 + 0.3578i |
| Binary 83 = | −0.0185 + 0.0208i | 0.6324 − 0.1220i | 0.0739 + 0.7609i |
| | −0.5279 + 0.3888i | 0.5619 + 0.0641i | 0.1007 − 0.4901i |
| | −0.6409 − 0.3982i | −0.1378 − 0.4963i | −0.4007 + 0.0692i |
| Binary 84 = | −0.9397 − 0.3420i | 0 | 0 |
| | 0 | −0.9397 − 0.3420i | 0 |
| | 0 | 0 | −0.9397 − 0.3420i |
| Binary 85 = | 0 | 0 | −0.6617 + 0.7498i |
| | −0.7331 − 0.6802i | 0 | 0 |
| | 0 | 0.8262 − 0.5633i | 0 |
| Binary 86 = | 0.7660 + 0.6428i | 0 | 0 |
| | 0 | 0.7660 + 0.6428i | 0 |
| | 0 | 0 | 0.7660 + 0.6428i |
| Binary 87 = | 0.3971 + 0.5071i | −0.2594 − 0.7191i | −0.0063 + 0.0272i |
| | 0.1993 + 0.5293i | 0.0233 + 0.4998i | −0.2777 + 0.5939i |
| | 0.3788 − 0.3490i | 0.3712 − 0.1659i | −0.7533 − 0.0432i |
| Binary 88 = | −0.4504 − 0.5115i | −0.2255 − 0.5009i | −0.3988 + 0.2734i |
| | −0.1128 + 0.1057i | 0.7384 + 0.0291i | −0.0128 + 0.6556i |
| | −0.4200 + 0.5790i | 0.2605 − 0.2904i | −0.3617 − 0.4532i |
| Binary 89 = | 0.3116 − 0.6062i | −0.0679 − 0.5451i | 0.2429 + 0.4181i |
| | −0.1396 − 0.0664i | 0.6970 + 0.2455i | 0.6528 + 0.0618i |
| | −0.6924 − 0.1794i | 0.3345 − 0.2007i | −0.4790 + 0.3268i |
| Binary 90 = | 0.5627 + 0.3845i | −0.1218 − 0.5356i | −0.4252 − 0.2301i |
| | 0.0833 − 0.1303i | 0.7180 + 0.1749i | −0.5893 + 0.2877i |
| | 0.2641 − 0.6647i | 0.3129 − 0.2330i | 0.2383 − 0.5286i |
| Binary 91 = | −0.0276 + 0.0041i | 0.5629 + 0.3130i | −0.4324 + 0.6304i |
| | −0.6543 − 0.0415i | 0.3892 + 0.4103i | 0.3922 − 0.3106i |
| | −0.2350 − 0.7170i | 0.2135 − 0.4688i | −0.3514 − 0.2046i |
| Binary 92 = | 0.0103 − 0.0259i | −0.5525 + 0.3310i | −0.3297 − 0.6897i |
| | 0.3631 − 0.5459i | −0.5499 + 0.1320i | 0.0729 + 0.4950i |
| | 0.7385 + 0.1550i | 0.2992 + 0.4193i | 0.3528 − 0.2020i |
| Binary 93 = | 0.0126 + 0.0249i | 0.5684 − 0.3030i | −0.7532 + 0.1306i |
| | 0.1691 + 0.6335i | 0.5558 − 0.1044i | 0.4962 + 0.0638i |
| | −0.6049 + 0.4511i | −0.2780 − 0.4337i | −0.0989 − 0.3944i |

TABLE 2-continued

Bit allocation of Coset Extension of $G_{63,37}$

| | | | |
|---|---|---|---|
| Binary 94 = | 0.0502 + 0.6797i | 0.5493 + 0.0004i | 0.2833 + 0.3918i |
| | 0.1538 − 0.0161i | −0.3303 + 0.6611i | 0.6557 − 0.0035i |
| | 0.6844 − 0.2079i | 0.1575 + 0.3569i | −0.4441 + 0.3729i |
| Binary 95 = | 0.4754 + 0.4884i | 0.4211 − 0.3528i | 0.4689 + 0.1181i |
| | 0.1074 − 0.1112i | 0.1719 + 0.7187i | 0.5000 − 0.4242i |
| | 0.3906 − 0.5992i | 0.3501 + 0.1721i | −0.1005 + 0.5711i |
| Binary 96 = | 0.0245 − 0.0132i | −0.6360 − 0.1016i | 0.1907 − 0.7403i |
| | 0.6291 − 0.1848i | −0.5061 − 0.2524i | −0.2623 + 0.4260i |
| | 0.4661 + 0.5934i | −0.0403 + 0.5135i | 0.4002 + 0.0720i |
| Binary 97 = | −0.6137 − 0.2964i | −0.2750 + 0.4755i | −0.4810 + 0.0494i |
| | −0.0629 + 0.1412i | −0.4074 − 0.6165i | −0.3248 + 0.5696i |
| | −0.1621 + 0.6966i | −0.3878 − 0.0420i | −0.1009 − 0.5710i |
| Binary 98 = | 0.6403 + 0.0698i | 0.7643 − 0.0169i | −0.0262 + 0.0094i |
| | 0.5180 + 0.2269i | −0.4812 − 0.1371i | −0.6496 + 0.0890i |
| | 0.0146 − 0.5149i | 0.0390 + 0.4047i | −0.3724 − 0.6563i |
| Binary 99 = | 0.5746 − 0.5042i | −0.0140 + 0.0241i | 0.1799 − 0.6184i |
| | −0.4567 + 0.2043i | −0.4404 + 0.4857i | 0.3134 − 0.4708i |
| | 0.2901 + 0.2849i | −0.7071 − 0.2634i | −0.5045 − 0.1038i |
| Binary 100 = | −0.0116 + 0.0254i | 0.1689 + 0.6215i | 0.7353 + 0.2091i |
| | −0.3899 + 0.5271i | −0.0219 + 0.5651i | −0.4194 − 0.2728i |
| | −0.7298 − 0.1916i | 0.4846 − 0.1745i | −0.0820 + 0.3982i |
| Binary 101 = | −0.0164 + 0.0226i | −0.4760 + 0.4339i | −0.7642 − 0.0212i |
| | −0.4866 + 0.4394i | −0.5129 + 0.2383i | 0.4737 + 0.1609i |
| | −0.6774 − 0.3324i | 0.3764 + 0.3517i | −0.0188 − 0.4062i |
| Binary 102 = | 0 | 0 | −0.8533 − 0.5214i |
| | 0.5425 − 0.8400i | 0 | 0 |
| | 0 | 0.6982 + 0.7159i | 0 |
| Binary 103 = | 0.8262 + 0.5633i | 0 | 0 |
| | 0 | −0.9888 − 0.1490i | 0 |
| | 0 | 0 | −0.7331 + 0.6802i |
| Binary 104 = | 0.0195 − 0.0199i | 0.0538 − 0.6418i | −0.6194 − 0.4480i |
| | 0.5466 − 0.3620i | 0.2139 − 0.5235i | 0.3008 + 0.3998i |
| | 0.6203 + 0.4297i | −0.5151 − 0.0018i | 0.2133 − 0.3462i |
| Binary 105 = | 0 | 0 | −0.6617 − 0.7498i |
| | −0.7971 − 0.6038i | 0 | 0 |
| | 0 | −0.4113 + 0.9115i | 0 |
| Binary 106 = | 0.4255 − 0.5324i | 0.4541 − 0.3091i | −0.3385 − 0.3452i |
| | −0.1237 − 0.0928i | 0.0995 + 0.7322i | −0.6479 + 0.1012i |
| | −0.6431 − 0.3131i | 0.3312 + 0.2061i | 0.3836 − 0.4349i |
| Binary 107 = | 0.2510 − 0.4886i | −0.1778 − 0.4496i | 0.5627 + 0.3845i |
| | 0.4376 + 0.5955i | −0.6363 − 0.1584i | 0.0833 − 0.1303i |
| | 0.3894 + 0.0227i | 0.5224 − 0.2517i | 0.2641 − 0.6647i |
| Binary 108 = | 0.9215 + 0.3884i | 0 | 0 |
| | 0 | −0.5837 + 0.8119i | 0 |
| | 0 | 0 | 0.8782 − 0.4783i |
| Binary 109 = | 0.5289 + 0.3675i | 0.6977 − 0.3124i | 0.0230 + 0.0158i |
| | 0.3465 + 0.4470i | −0.4966 + 0.0606i | 0.4514 + 0.4755i |
| | 0.2591 − 0.4452i | 0.1932 + 0.3578i | −0.3155 + 0.6855i |
| Binary 110 = | −0.6603 − 0.1689i | 0.2977 + 0.4617i | 0.4783 + 0.0708i |
| | −0.0337 + 0.1509i | −0.7345 + 0.0812i | 0.4553 − 0.4719i |
| | −0.0208 + 0.7150i | −0.2143 + 0.3259i | −0.0432 + 0.5782i |
| Binary 111 = | 0.4541 − 0.3091i | −0.3385 − 0.3452i | −0.0163 − 0.6813i |
| | 0.0995 + 0.7322i | −0.6479 + 0.1012i | −0.1544 + 0.0084i |
| | 0.3312 + 0.2061i | 0.3836 − 0.4349i | −0.6939 + 0.1736i |
| Binary 112 = | −0.9988 + 0.0498i | 0 | 0 |
| | 0 | 0.2708 + 0.9626i | 0 |
| | 0 | 0 | −0.6617 − 0.7498i |
| Binary 113 = | −0.0262 − 0.0096i | 0.6403 + 0.0698i | 0.7643 − 0.0169i |
| | −0.5548 − 0.3494i | 0.5180 + 0.2269i | −0.4812 − 0.1371i |
| | 0.1366 − 0.7421i | 0.0146 − 0.5149i | 0.0390 + 0.4047i |
| Binary 114 = | −0.0006 − 0.0279i | 0.5913 + 0.2554i | 0.0403 − 0.7634i |
| | 0.1225 − 0.6441i | 0.4282 + 0.3695i | −0.1727 + 0.4696i |
| | 0.7407 − 0.1440i | 0.1657 − 0.4877i | 0.4065 − 0.0087i |
| Binary 115 = | 0.1839 + 0.6563i | 0.2510 − 0.4886i | −0.1778 − 0.4496i |
| | 0.1475 − 0.0463i | 0.4376 + 0.5955i | −0.6363 − 0.1584i |
| | 0.6296 − 0.3394i | 0.3894 + 0.0227i | 0.5224 − 0.2517i |
| Binary 116 = | −0.2810 + 0.6209i | 0.5063 − 0.2130i | 0.1528 − 0.4587i |
| | 0.1428 + 0.0594i | −0.0475 + 0.7375i | −0.3856 − 0.5304i |
| | 0.7005 + 0.1447i | 0.2838 + 0.2677i | 0.5620 + 0.1429i |
| Binary 117 = | 0 | 0.2708 − 0.9626i | 0 |
| | 0 | 0 | −0.6617 + 0.7498i |
| | −0.7331 − 0.6802i | 0 | 0 |
| Binary 118 = | 0 | 0 | 0.1736 − 0.9848i |
| | 0.7660 − 0.6428i | 0 | 0 |
| | 0 | 0.7660 − 0.6428i | 0 |

TABLE 2-continued

Bit allocation of Coset Extension of $G_{63,37}$

| | | | |
|---|---|---|---|
| Binary 119 = | 0.6781 + 0.0686i | 0.0958 − 0.5409i | 0.4351 − 0.2109i |
| | 0.0108 − 0.1543i | 0.5937 + 0.4400i | 0.1104 − 0.6464i |
| | −0.0859 − 0.7101i | 0.3788 − 0.0931i | 0.2901 + 0.5021i |
| Binary 120 = | −0.0223 + 0.0167i | 0.3971 + 0.5071i | −0.2594 − 0.7191i |
| | −0.5945 + 0.2765i | 0.1993 + 0.5293i | 0.0233 + 0.4998i |
| | −0.5493 − 0.5173i | 0.3788 − 0.3490i | 0.3712 − 0.1659i |
| Binary 121 = | 0.6782 − 0.0671i | −0.4376 − 0.3320i | −0.4737 + 0.0970i |
| | −0.0200 − 0.1533i | 0.6624 − 0.3276i | −0.2665 + 0.5992i |
| | −0.2249 − 0.6790i | 0.0899 − 0.3796i | −0.1572 − 0.5581i |
| Binary 122 = | −0.5437 + 0.4109i | 0.3838 − 0.3929i | −0.4616 − 0.1437i |
| | 0.0970 + 0.1204i | 0.2427 + 0.6980i | −0.2055 + 0.6227i |
| | 0.5460 + 0.4621i | 0.3655 + 0.1364i | −0.2120 − 0.5397i |
| Binary 123 = | −0.0218 + 0.6437i | 0.2635 − 0.7176i | −0.0223 + 0.0167i |
| | −0.1875 + 0.5335i | −0.3034 + 0.3978i | −0.5945 + 0.2765i |
| | 0.5145 − 0.0239i | 0.3910 + 0.1115i | −0.5493 − 0.5173i |
| Binary 124 = | 0.6511 + 0.2016i | 0.5250 − 0.1615i | −0.3696 + 0.3118i |
| | 0.0412 − 0.1490i | −0.1207 + 0.7291i | 0.0525 + 0.6536i |
| | 0.0565 − 0.7130i | 0.2557 + 0.2946i | −0.4050 − 0.4150i |
| Binary 125 = | 0 | 0 | −0.7971 − 0.6038i |
| | −0.9010 + 0.4339i | 0 | 0 |
| | 0 | 0.6235 − 0.7818i | 0 |
| Binary 126 = | −0.0237 − 0.0146i | 0.2300 + 0.6016i | −0.7365 + 0.2049i |
| | −0.4746 − 0.4524i | 0.0345 + 0.5645i | 0.5001 + 0.0141i |
| | 0.2809 − 0.7003i | 0.4648 − 0.2219i | −0.1377 − 0.3826i |
| Binary 127 = | −0.1489 + 0.6266i | 0.7588 − 0.0929i | 0.0175 − 0.0217i |
| | −0.2895 + 0.4858i | −0.4924 − 0.0885i | 0.5079 − 0.4146i |
| | 0.5091 + 0.0785i | 0.0791 + 0.3988i | 0.6600 + 0.3658i |
| Binary 128 = | 0.0538 − 0.6418i | −0.6194 − 0.4480i | 0.0022 − 0.0278i |
| | 0.2139 − 0.5235i | 0.3008 + 0.3998i | 0.1860 − 0.6287i |
| | −0.5151 − 0.0018i | 0.2133 − 0.3462i | 0.7513 − 0.0695i |
| Binary 129 = | −0.4947 − 0.2387i | −0.1297 + 0.4658i | −0.5819 + 0.3548i |
| | 0.5844 − 0.4523i | 0.4116 + 0.5105i | 0.0845 + 0.1295i |
| | 0.0129 − 0.3899i | −0.5684 − 0.1147i | 0.4973 + 0.5141i |
| Binary 130 = | 0.4548 + 0.1642i | −0.5428 − 0.4121i | −0.5486 − 0.0278i |
| | 0.5398 − 0.3723i | −0.0897 + 0.1260i | 0.3628 − 0.6438i |
| | −0.1569 + 0.5582i | −0.2969 + 0.6507i | −0.1395 − 0.3643i |
| Binary 131 = | −0.3005 + 0.3788i | 0.0516 − 0.6796i | −0.4030 + 0.3733i |
| | 0.1810 + 0.6303i | −0.1545 − 0.0070i | −0.2076 − 0.7092i |
| | −0.4792 − 0.3265i | −0.7077 + 0.1036i | −0.3582 − 0.1545i |
| Binary 132 = | 0 | 0 | −0.9397 + 0.3420i |
| | −0.9397 − 0.3420i | 0 | 0 |
| | 0 | −0.9397 − 0.3420i | 0 |
| Binary 133 = | −0.1322 − 0.4651i | −0.2797 − 0.6215i | −0.5163 + 0.1875i |
| | −0.6174 − 0.2210i | −0.1390 + 0.0678i | 0.0842 − 0.7342i |
| | 0.5448 − 0.1985i | −0.5720 + 0.4295i | −0.2701 − 0.2815i |
| Binary 134 = | −0.1510 − 0.6646i | −0.4024 − 0.3739i | 0.4548 + 0.1642i |
| | −0.1497 + 0.0389i | 0.6917 − 0.2600i | 0.5398 − 0.3723i |
| | −0.6457 + 0.3076i | 0.1273 − 0.3687i | −0.1569 + 0.5582i |
| Binary 135 = | 0.0747 − 0.9972i | 0 | 0 |
| | 0 | 0.3653 + 0.9309i | 0 |
| | 0 | 0 | 0.9556 + 0.2948i |
| Binary 136 = | −0.4616 + 0.1437i | −0.1524 + 0.6643i | 0.0415 − 0.5477i |
| | −0.2055 + 0.6227i | 0.1517 + 0.0299i | 0.6346 + 0.3787i |
| | −0.2120 − 0.5397i | 0.7153 + 0.0030i | 0.3677 − 0.1304i |
| Binary 137 = | −0.1218 − 0.5356i | −0.4252 − 0.2301i | 0.6782 − 0.0671i |
| | 0.7180 + 0.1749i | −0.5893 + 0.2877i | −0.0200 − 0.1533i |
| | 0.3129 − 0.2330i | 0.2383 − 0.5286i | −0.2249 − 0.6790i |
| Binary 138 = | 0.0047 + 0.0275i | −0.2597 − 0.5894i | −0.3967 − 0.6534i |
| | −0.0252 + 0.6552i | −0.0626 − 0.5621i | 0.1219 + 0.4852i |
| | −0.7110 + 0.2528i | −0.4532 + 0.2448i | 0.3310 − 0.2362i |
| Binary 139 = | 0.0256 + 0.0109i | 0.2406 − 0.5975i | −0.4930 + 0.5842i |
| | 0.5367 + 0.3766i | 0.3587 − 0.4372i | 0.4212 − 0.2700i |
| | −0.1734 + 0.7344i | −0.4917 − 0.1535i | −0.3293 − 0.2385i |
| Binary 140 = | −0.5525 + 0.3310i | −0.3297 − 0.6897i | −0.0088 − 0.0265i |
| | −0.5499 + 0.1320i | 0.0729 + 0.4950i | −0.0728 − 0.6516i |
| | 0.2992 + 0.4193i | 0.3528 − 0.2020i | 0.6653 − 0.3559i |
| Binary 141 = | 0.6414 − 0.0584i | 0.3336 − 0.6878i | 0.0277 − 0.0027i |
| | 0.5527 + 0.1197i | −0.3415 + 0.3656i | 0.6514 + 0.0740i |
| | −0.0877 − 0.5076i | 0.3780 + 0.1499i | 0.1989 + 0.7279i |
| Binary 142 = | −0.0162 − 0.0227i | −0.6227 − 0.1645i | −0.5488 + 0.5322i |
| | −0.2616 − 0.6012i | −0.4784 − 0.3015i | 0.4460 − 0.2268i |
| | 0.5309 − 0.5362i | −0.0912 + 0.5070i | −0.3039 − 0.2701i |
| Binary 143 = | 0.1492 − 0.5287i | −0.4812 − 0.0469i | −0.4504 − 0.5115i |
| | 0.5469 + 0.4970i | −0.4312 + 0.4940i | −0.1128 + 0.1057i |
| | 0.3862 − 0.0550i | 0.0143 − 0.5797i | −0.4200 + 0.5790i |

TABLE 2-continued

Bit allocation of Coset Extension of $G_{63,37}$

| | | | |
|---|---|---|---|
| Binary 144 = | 0 | 0 | −0.2225 − 0.9749i |
| | −0.9691 − 0.2468i | 0 | 0 |
| | 0 | 0.9802 − 0.1981i | 0 |
| Binary 145 = | 0.0128 − 0.0248i | 0.6441 + 0.0057i | −0.6433 + 0.4129i |
| | 0.4156 − 0.5071i | 0.5381 + 0.1742i | 0.4820 − 0.1339i |
| | 0.7194 + 0.2278i | −0.0367 − 0.5138i | −0.2443 − 0.3250i |
| Binary 146 = | −0.3967 − 0.6534i | 0.0213 + 0.0180i | −0.5778 − 0.2846i |
| | 0.1219 + 0.4852i | 0.4019 + 0.5181i | −0.4092 − 0.3904i |
| | 0.3310 − 0.2362i | −0.3821 + 0.6506i | −0.1898 + 0.4788i |
| Binary 147 = | −0.6740 + 0.1009i | 0.2011 − 0.5112i | 0.3862 + 0.2909i |
| | 0.0276 + 0.1522i | 0.4947 + 0.5489i | 0.6256 − 0.1967i |
| | 0.2585 + 0.6669i | 0.3898 − 0.0162i | −0.3145 + 0.4872i |
| Binary 148 = | 0.7253 − 0.2414i | −0.0114 − 0.0254i | −0.1378 − 0.6292i |
| | −0.5002 + 0.0108i | −0.1373 − 0.6411i | 0.0501 − 0.5633i |
| | 0.1566 + 0.3752i | 0.6266 − 0.4204i | −0.4927 + 0.1501i |
| Binary 149 = | −0.5837 − 0.8119i | 0 | 0 |
| | 0 | 0.8782 + 0.4783i | 0 |
| | 0 | 0 | 0.9215 − 0.3884i |
| Binary 150 = | 0.0277 + 0.0029i | 0.6138 + 0.1953i | 0.3637 + 0.6724i |
| | 0.6239 + 0.2017i | 0.4628 + 0.3250i | −0.0975 − 0.4907i |
| | 0.0508 + 0.7528i | 0.1164 − 0.5018i | −0.3423 + 0.2194i |
| Binary 151 = | 0 | 0.6235 − 0.7818i | 0 |
| | 0 | 0 | −0.2225 − 0.9749i |
| | −0.9691 − 0.2468i | 0 | 0 |
| Binary 152 = | −0.6609 − 0.3841i | 0.0126 + 0.0249i | 0.5684 − 0.3030i |
| | 0.3391 + 0.3679i | 0.1691 + 0.6335i | 0.5558 − 0.1044i |
| | 0.1777 − 0.3657i | −0.6049 + 0.4511i | −0.2780 − 0.4337i |
| Binary 153 = | −0.6738 − 0.1023i | −0.4947 − 0.2387i | −0.1297 + 0.4658i |
| | −0.0185 + 0.1535i | 0.5844 − 0.4523i | 0.4116 + 0.5105i |
| | 0.0504 + 0.7135i | 0.0129 − 0.3899i | −0.5684 − 0.1147i |
| Binary 154 = | −0.2225 − 0.9749i | 0 | 0 |
| | 0 | −0.9010 + 0.4339i | 0 |
| | 0 | 0 | 0.6235 − 0.7818i |
| Binary 155 = | 0 | 0 | −0.9691 − 0.2468i |
| | 0.8782 + 0.4783i | 0 | 0 |
| | 0 | 0.9215 − 0.3884i | 0 |
| Binary 156 = | −0.6606 + 0.1675i | 0.0950 + 0.5410i | −0.3367 + 0.3470i |
| | 0.0426 + 0.1486i | −0.7084 − 0.2104i | 0.1173 + 0.6452i |
| | 0.3236 + 0.6379i | −0.3241 + 0.2171i | −0.4443 − 0.3726i |
| Binary 157 = | −0.0061 − 0.0272i | 0.4970 − 0.4096i | −0.2274 + 0.7298i |
| | −0.0075 − 0.6556i | 0.5241 − 0.2124i | 0.2832 − 0.4124i |
| | 0.6975 − 0.2879i | −0.3584 − 0.3700i | −0.3961 − 0.0919i |
| Binary 158 = | 0.6277 + 0.2654i | −0.5322 − 0.1360i | 0.3553 + 0.3279i |
| | 0.0558 − 0.1442i | 0.4832 − 0.5591i | 0.6420 − 0.1334i |
| | 0.1272 − 0.7039i | −0.0646 − 0.3847i | −0.3614 + 0.4535i |
| Binary 159 = | 0 | 0.0747 − 0.9972i | 0 |
| | 0 | 0 | 0.3653 + 0.9309i |
| | 0.5425 + 0.8400i | 0 | 0 |
| Binary 160 = | −0.0251 − 0.0122i | −0.5100 − 0.3934i | −0.1118 − 0.7562i |
| | −0.5173 − 0.4029i | −0.3237 − 0.4637i | −0.0762 + 0.4945i |
| | 0.2098 − 0.7248i | −0.2810 + 0.4317i | 0.3967 − 0.0891i |
| Binary 161 = | 0.2984 − 0.4612i | −0.0827 + 0.4764i | 0.3116 − 0.6062i |
| | 0.3761 + 0.6361i | 0.4604 + 0.4670i | −0.1396 − 0.0664i |
| | 0.3852 + 0.0613i | −0.5770 − 0.0576i | −0.6924 − 0.1794i |
| Binary 162 = | −0.4376 − 0.3320i | −0.4737 + 0.0970i | 0.4764 − 0.4874i |
| | 0.6624 − 0.3276i | −0.2665 + 0.5992i | −0.1139 − 0.1046i |
| | 0.0899 − 0.3796i | −0.1572 − 0.5581i | −0.6087 − 0.3755i |
| Binary 163 = | 0.0049 − 0.0274i | 0.0424 + 0.6427i | 0.1493 + 0.7497i |
| | 0.2477 − 0.6070i | −0.1335 + 0.5496i | 0.0515 − 0.4976i |
| | 0.7545 + 0.0056i | 0.5096 − 0.0750i | −0.3918 + 0.1087i |
| Binary 164 = | 0.7621 + 0.0593i | 0.0273 + 0.0056i | −0.4219 − 0.4867i |
| | −0.4651 − 0.1843i | 0.6007 + 0.2628i | −0.2254 − 0.5187i |
| | −0.0015 + 0.4066i | −0.0244 + 0.7542i | −0.3609 + 0.3675i |
| Binary 165 = | 0 | 0.1736 − 0.9848i | 0 |
| | 0 | 0 | 0.1736 − 0.9848i |
| | 0.7660 − 0.6428i | 0 | 0 |
| Binary 166 = | −0.6144 + 0.2951i | 0.5248 + 0.1623i | 0.4119 − 0.2532i |
| | 0.0712 + 0.1373i | −0.5104 + 0.5344i | 0.0455 − 0.6542i |
| | 0.4436 + 0.5611i | 0.0453 + 0.3875i | 0.3386 + 0.4707i |
| Binary 167 = | 0.1799 − 0.6184i | 0.1161 − 0.7556i | 0.0047 + 0.0275i |
| | 0.3134 − 0.4708i | −0.2186 + 0.4500i | −0.0252 + 0.6552i |
| | −0.5045 − 0.1038i | 0.4054 + 0.0318i | −0.7110 + 0.2528i |
| Binary 168 = | 0 | −0.7331 + 0.6802i | 0 |
| | 0 | 0 | 0.8262 + 0.5633i |
| | −0.6617 − 0.7498i | 0 | 0 |

TABLE 2-continued

Bit allocation of Coset Extension of $G_{63,37}$

| | | | |
|---|---|---|---|
| Binary 169 = | 0.0403 − 0.7634i | −0.0184 − 0.0210i | 0.6171 − 0.1844i |
| | −0.1727 + 0.4696i | −0.3202 − 0.5722i | 0.5655 + 0.0078i |
| | 0.4065 − 0.0087i | 0.4748 − 0.5864i | −0.1865 − 0.4801i |
| Binary 170 = | −0.5819 + 0.3548i | −0.5324 + 0.1351i | 0.2000 + 0.4402i |
| | 0.0845 + 0.1295i | 0.1569 − 0.7221i | 0.6434 + 0.1265i |
| | 0.4973 + 0.5141i | −0.2407 − 0.3070i | −0.5092 + 0.2775i |
| Binary 171 = | 0.0516 − 0.6796i | −0.4030 + 0.3733i | 0.0133 + 0.4833i |
| | −0.1545 − 0.0070i | −0.2076 − 0.7092i | 0.5438 + 0.3665i |
| | −0.7077 + 0.1036i | −0.3582 − 0.1545i | −0.5770 + 0.0579i |
| Binary 172 = | −0.0090 + 0.0264i | −0.4682 − 0.4423i | −0.2989 + 0.7036i |
| | −0.3354 + 0.5633i | −0.2760 − 0.4936i | 0.3228 − 0.3822i |
| | −0.7453 − 0.1180i | −0.3225 + 0.4016i | −0.3850 − 0.1309i |
| Binary 173 = | 0.6302 + 0.1332i | −0.6609 − 0.3841i | 0.0126 + 0.0249i |
| | 0.4929 + 0.2773i | 0.3391 + 0.3679i | 0.1691 + 0.6335i |
| | 0.0658 − 0.5109i | 0.1777 − 0.3657i | −0.6049 + 0.4511i |
| Binary 174 = | 0.0273 − 0.0054i | −0.1489 + 0.6266i | 0.7588 − 0.0929i |
| | 0.6556 + 0.0088i | −0.2895 + 0.4858i | −0.4924 − 0.0885i |
| | 0.2704 + 0.7044i | 0.5091 + 0.0785i | 0.0791 + 0.3988i |
| Binary 175 = | 0 | −0.4113 − 0.9115i | −0.0249 + 0.9997i |
| | 0 | 0 | 0 |
| | −0.9988 − 0.0498i | 0 | 0 |
| Binary 176 = | 0.8782 + 0.4783i | 0 | 0 |
| | 0 | 0.9215 − 0.3884i | 0 |
| | 0 | 0 | −0.5837 − 0.8119i |
| Binary 177 = | 0.1853 − 0.6559i | −0.5160 − 0.1883i | −0.1322 − 0.4651i |
| | −0.1500 − 0.0374i | 0.5364 − 0.5083i | −0.6174 − 0.2210i |
| | −0.7142 − 0.0387i | −0.0259 − 0.3892i | 0.5448 − 0.1985i |
| Binary 178 = | 0 | 0 | 0.2708 − 0.9626i |
| | −0.9888 + 0.1490i | 0 | 0 |
| | 0 | −0.7331 − 0.6802i | 0 |
| Binary 179 = | 0 | 0 | −0.4113 + 0.9115i |
| | 0.6235 − 0.7818i | 0 | 0 |
| | 0 | −0.2225 − 0.9749i | 0 |
| Binary 180 = | 0.0020 + 0.0278i | −0.0857 + 0.6384i | −0.5990 + 0.4749i |
| | −0.0903 + 0.6494i | −0.2397 + 0.5122i | 0.4663 − 0.1812i |
| | −0.7326 + 0.1807i | 0.5144 + 0.0275i | −0.2755 − 0.2990i |
| Binary 181 = | 0.0231 − 0.0156i | 0.5957 − 0.2449i | 0.7108 + 0.2813i |
| | 0.6075 − 0.2465i | 0.5635 − 0.0485i | −0.3901 − 0.3132i |
| | 0.5228 + 0.5441i | −0.2334 − 0.4592i | −0.1212 + 0.3881i |
| Binary 182 = | −0.3401 − 0.5906i | 0.3428 − 0.4292i | 0.3190 − 0.3634i |
| | −0.1316 + 0.0813i | 0.3109 + 0.6704i | −0.1494 − 0.6385i |
| | −0.5264 + 0.4843i | 0.3772 + 0.0994i | 0.4623 + 0.3500i |
| Binary 183 = | 0.3542 − 0.5379i | −0.7448 − 0.1722i | −0.0238 + 0.0144i |
| | 0.4382 − 0.3575i | 0.4324 + 0.2516i | −0.6191 + 0.2159i |
| | −0.4515 − 0.2479i | 0.0620 − 0.4018i | −0.4951 − 0.5695i |
| Binary 184 = | 0 | −0.9010 − 0.4339i | 0 |
| | 0 | 0 | 0.6235 + 0.7818i |
| | −0.7971 + 0.6038i | 0 | 0 |
| Binary 185 = | −0.0275 − 0.0043i | 0.3542 − 0.5379i | −0.7448 − 0.1722i |
| | −0.6130 − 0.2325i | 0.4382 − 0.3575i | 0.4324 + 0.2516i |
| | −0.0132 − 0.7544i | −0.4515 − 0.2479i | 0.0620 − 0.4018i |
| Binary 186 = | 0 | 0 | −0.5837 + 0.8119i |
| | 0.9802 + 0.1981i | 0 | 0 |
| | 0 | 0.4562 + 0.8899i | 0 |
| Binary 187 = | −0.5431 − 0.0823i | −0.4742 − 0.0946i | 0.1176 + 0.6713i |
| | 0.4251 − 0.6045i | −0.4783 + 0.4486i | 0.1514 − 0.0314i |
| | −0.1026 − 0.3764i | 0.0719 − 0.5754i | 0.6603 − 0.2750i |
| Binary 188 = | −0.6407 + 0.2324i | −0.3631 − 0.4121i | −0.3025 − 0.3772i |
| | 0.0572 + 0.1437i | 0.7142 − 0.1898i | −0.6547 + 0.0362i |
| | 0.3855 + 0.6025i | 0.1634 − 0.3542i | 0.4249 − 0.3945i |
| Binary 189 = | 0.3103 + 0.6068i | −0.3203 − 0.4462i | 0.0614 + 0.4796i |
| | 0.1354 − 0.0746i | 0.7295 − 0.1178i | 0.5776 + 0.3105i |
| | 0.5499 − 0.4574i | 0.1978 − 0.3362i | −0.5683 + 0.1151i |
| Binary 190 = | −0.0262 + 0.0094i | 0.5354 − 0.3581i | 0.5746 − 0.5042i |
| | −0.6496 + 0.0890i | 0.5427 − 0.1592i | −0.4567 − 0.2043i |
| | −0.3724 − 0.6563i | −0.3198 − 0.4038i | 0.2901 + 0.2849i |
| Binary 191 = | −0.7331 − 0.6802i | 0 | 0 |
| | 0 | 0.8262 − 0.5633i | 0 |
| | 0 | 0 | −0.9888 + 0.1490i |
| Binary 192 = | 0 | 0 | −0.9988 − 0.0498i |
| | 0.8262 − 0.5633i | 0 | 0 |
| | 0 | −0.9888 + 0.1490i | 0 |
| Binary 193 = | −0.7448 − 0.1722i | −0.0238 + 0.0144i | −0.0744 − 0.6398i |
| | 0.4324 + 0.2516i | −0.6191 + 0.2159i | 0.1059 − 0.5555i |
| | 0.0620 − 0.4018i | −0.4951 − 0.5695i | −0.5052 + 0.1003i |

TABLE 2-continued

Bit allocation of Coset Extension of $G_{63,37}$

| | | | |
|---|---|---|---|
| Binary 194 = | 0.3190 − 0.3634i | −0.6402 − 0.2338i | −0.0133 − 0.5491i |
| | −0.1494 − 0.6385i | −0.0485 + 0.1468i | 0.6691 + 0.3137i |
| | 0.4623 + 0.3500i | −0.0919 + 0.7093i | 0.3529 − 0.1664i |
| Binary 195 = | 0.4830 + 0.0228i | 0.3704 − 0.5721i | −0.2263 + 0.5005i |
| | 0.4061 − 0.5149i | −0.1323 − 0.0800i | −0.4668 − 0.5729i |
| | 0.0146 + 0.5797i | −0.6711 − 0.2475i | −0.3901 − 0.0032i |
| Binary 196 = | −0.0855 + 0.6762i | 0.2502 + 0.4890i | −0.3712 − 0.3098i |
| | 0.1539 + 0.0147i | −0.7389 + 0.0077i | −0.6346 + 0.1652i |
| | 0.7120 − 0.0682i | −0.2457 + 0.3030i | 0.3383 − 0.4709i |
| Binary 197 = | 0.1161 − 0.7556i | 0.0047 + 0.0275i | −0.2597 − 0.5894i |
| | −0.2186 + 0.4500i | −0.0252 + 0.6552i | −0.0626 − 0.5621i |
| | 0.4054 + 0.0318i | −0.7110 + 0.2528i | −0.4532 + 0.2448i |
| Binary 198 = | −0.2634 − 0.4055i | 0.5989 − 0.3253i | −0.0141 + 0.5491i |
| | −0.6551 − 0.0292i | −0.0780 − 0.1335i | −0.6526 − 0.3466i |
| | 0.4621 − 0.3503i | −0.4710 − 0.5383i | −0.3607 + 0.1486i |
| Binary 199 = | 0 | 0.9802 − 0.1981i | 0 |
| | 0 | 0 | 0.4562 − 0.8899i |
| | −0.5837 − 0.8119i | 0 | 0 |
| Binary 200 = | 0 | 0 | −0.9010 − 0.4339i |
| | −0.0249 + 0.9997i | 0 | 0 |
| | 0 | −0.7971 + 0.6038i | 0 |
| Binary 201 = | 0 | 0 | −0.1243 − 0.9922i |
| | 0.6982 + 0.7159i | 0 | 0 |
| | 0 | −0.3185 − 0.9479i | 0 |
| Binary 202 = | 0.4826 − 0.2623i | 0.1088 + 0.4711i | −0.6740 + 0.1009i |
| | 0.0261 + 0.7385i | 0.6056 + 0.2515i | 0.0276 + 0.1522i |
| | 0.3090 + 0.2381i | −0.5540 + 0.1711i | 0.2585 + 0.6669i |
| Binary 203 = | 0.4897 + 0.4184i | −0.7582 − 0.0972i | 0.0128 − 0.0248i |
| | 0.3002 + 0.4793i | 0.4553 + 0.2073i | 0.4156 − 0.5071i |
| | 0.3021 − 0.4172i | 0.0217 − 0.4060i | 0.7194 + 0.2278i |
| Binary 204 = | 0.0279 + 0.0001i | −0.6256 + 0.1534i | −0.7124 + 0.2772i |
| | 0.6408 + 0.1385i | −0.5644 − 0.0360i | 0.4990 − 0.0357i |
| | 0.1255 + 0.7441i | 0.1624 + 0.4888i | −0.1751 − 0.3670i |
| Binary 205 = | 0.4456 + 0.4650i | 0.5963 + 0.4783i | −0.0262 − 0.0096i |
| | 0.2510 + 0.5068i | −0.2805 − 0.4143i | −0.5548 − 0.3494i |
| | 0.3422 − 0.3850i | −0.2302 + 0.3351i | 0.1366 − 0.7421i |
| Binary 206 = | 0 | 0 | −0.9691 + 0.2468i |
| | 0.6235 + 0.7818i | 0 | 0 |
| | 0 | −0.2225 + 0.9749i | 0 |
| Binary 207 = | 0.5063 − 0.2130i | 0.1528 − 0.4587i | 0.1839 + 0.6563i |
| | −0.0475 + 0.7375i | −0.3856 − 0.5304i | 0.1475 − 0.0463i |
| | 0.2838 + 0.2677i | 0.5620 + 0.1429i | 0.6296 − 0.3394i |
| Binary 208 = | −0.1243 − 0.9922i | 0 | 0 |
| | 0 | 0.9950 + 0.0996i | 0 |
| | 0 | 0 | −0.8533 − 0.5214i |
| Binary 209 = | −0.3025 − 0.3772i | −0.3414 + 0.5899i | −0.5431 − 0.0823i |
| | −0.6547 + 0.0362i | 0.1362 + 0.0733i | 0.4251 − 0.6045i |
| | 0.4249 − 0.3945i | 0.6826 + 0.2137i | −0.1026 − 0.3764i |
| Binary 210 = | 0.3637 + 0.6724i | 0.0231 − 0.0156i | 0.5957 − 0.2449i |
| | −0.0975 − 0.4907i | 0.6075 − 0.2465i | 0.5635 − 0.0485i |
| | −0.3423 + 0.2194i | 0.5228 + 0.5441i | −0.2334 − 0.4592i |
| Binary 211 = | 0.1977 − 0.4412i | 0.1853 − 0.6559i | −0.5160 − 0.1883i |
| | −0.3309 − 0.5661i | −0.1500 − 0.0374i | 0.5364 − 0.5083i |
| | 0.5449 + 0.1982i | −0.7142 − 0.0387i | −0.0259 − 0.3892i |
| Binary 212 = | −0.4450 + 0.1890i | −0.2164 − 0.6463i | 0.5383 + 0.1093i |
| | −0.1425 + 0.6401i | −0.1450 + 0.0536i | −0.4547 + 0.5825i |
| | −0.2647 − 0.5159i | −0.6119 + 0.3704i | 0.0837 + 0.3810i |
| Binary 213 = | −0.4737 + 0.0970i | 0.4764 − 0.4874i | −0.5486 + 0.0270i |
| | −0.2665 + 0.5992i | −0.1139 − 0.1046i | 0.2969 − 0.6767i |
| | −0.1572 − 0.5581i | −0.6087 − 0.3755i | −0.1751 − 0.3486i |
| Binary 214 = | −0.0238 + 0.0144i | −0.0744 − 0.6398i | −0.6813 + 0.3468i |
| | −0.6191 + 0.2159i | 0.1059 − 0.5555i | 0.4930 − 0.0853i |
| | −0.4951 − 0.5695i | −0.5052 + 0.1003i | −0.2108 − 0.3477i |
| Binary 215 = | 0 | 0 | −0.9397 − 0.3420i |
| | −0.5000 − 0.8660i | 0 | 0 |
| | 0 | −0.5000 − 0.8660i | 0 |
| Binary 216 = | −0.0827 + 0.4764i | 0.3116 − 0.6062i | −0.0679 − 0.5451i |
| | 0.4604 + 0.4670i | −0.1396 − 0.0664i | 0.6970 + 0.2455i |
| | −0.5770 − 0.0576i | −0.6924 − 0.1794i | 0.3345 − 0.2007i |
| Binary 217 = | 0 | 0.8782 − 0.4783i | 0 |
| | 0 | 0 | 0.9215 + 0.3884i |
| | −0.9691 + 0.2468i | 0 | 0 |
| Binary 218 = | 0 | −0.5837 − 0.8119i | 0 |
| | 0 | 0 | 0.8782 + 0.4783i |
| | 0.9556 + 0.2948i | 0 | 0 |

TABLE 2-continued

Bit allocation of Coset Extension of $G_{63,37}$

| | | | |
|---|---|---|---|
| Binary 219 = | 0.5957 − 0.2449i | 0.7108 + 0.2813i | 0.0077 − 0.0268i |
| | 0.5635 − 0.0485i | −0.3901 − 0.3132i | 0.3069 − 0.5794i |
| | −0.2334 − 0.4592i | −0.1212 + 0.3881i | 0.7502 + 0.0807i |
| Binary 220 = | 0 | 0.6982 − 0.7159i | 0 |
| | 0 | 0 | −0.3185 + 0.9479i |
| | −0.1243 + 0.9922i | 0 | 0 |
| Binary 221 = | 0 | 0 | −0.3185 + 0.9479i |
| | −0.1243 + 0.9922i | 0 | 0 |
| | 0 | 0.9950 − 0.0996i | 0 |
| Binary 222 = | 0.4764 − 0.4874i | −0.5486 + 0.0270i | −0.3005 + 0.3788i |
| | −0.1139 − 0.1046i | 0.2969 − 0.6767i | 0.1810 + 0.6303i |
| | −0.6087 − 0.3755i | −0.1751 − 0.3486i | −0.4792 − 0.3265i |
| Binary 223 = | −0.0133 − 0.5491i | 0.0108 − 0.4834i | −0.6407 + 0.2324i |
| | 0.6691 + 0.3137i | −0.5248 − 0.3931i | 0.0572 + 0.1437i |
| | 0.3529 − 0.1664i | 0.5791 − 0.0291i | 0.3855 + 0.6025i |
| Binary 224 = | 0.1088 + 0.4711i | −0.6740 + 0.1009i | 0.2011 − 0.5112i |
| | 0.6056 + 0.2515i | 0.0276 + 0.1522i | 0.4947 + 0.5489i |
| | −0.5540 + 0.1711i | 0.2585 + 0.6669i | 0.3898 − 0.0162i |
| Binary 225 = | −0.5000 − 0.8660i | 0 | 0 |
| | 0 | −0.5000 − 0.8660i | 0 |
| | 0 | 0 | −0.5000 − 0.8660i |
| Binary 226 = | 0.1176 + 0.6713i | −0.4689 + 0.2861i | −0.4240 + 0.2324i |
| | 0.1514 − 0.0314i | −0.0629 − 0.7363i | −0.0780 + 0.6511i |
| | 0.6603 − 0.2750i | −0.3205 − 0.2224i | −0.3147 − 0.4870i |
| Binary 227 = | −0.9888 − 0.1490i | 0 | 0 |
| | 0 | −0.7331 + 0.6802i | 0 |
| | 0 | 0 | 0.8262 + 0.5633i |
| Binary 228 = | −0.0249 − 0.9997i | 0 | 0 |
| | 0 | −0.7971 − 0.6038i | 0 |
| | 0 | 0 | −0.4113 + 0.9115i |
| Binary 229 = | −0.5160 − 0.1883i | −0.1322 − 0.4651i | −0.2797 − 0.6215i |
| | 0.5364 − 0.5083i | −0.6174 − 0.2210i | −0.1390 + 0.0678i |
| | −0.0259 − 0.3892i | 0.5448 − 0.1985i | −0.5720 + 0.4295i |
| Binary 230 = | −0.0204 − 0.0190i | −0.4304 + 0.4791i | 0.6631 − 0.3803i |
| | −0.3755 − 0.5374i | −0.4866 + 0.2882i | −0.4881 + 0.1097i |
| | 0.4141 − 0.6308i | 0.4095 + 0.3124i | 0.2278 + 0.3368i |
| Binary 231 = | −0.0104 − 0.6440i | 0.7621 + 0.0593i | 0.0273 + 0.0056i |
| | 0.1607 − 0.5422i | −0.4651 − 0.1843i | 0.6007 + 0.2628i |
| | −0.5127 + 0.0495i | −0.0015 + 0.4066i | −0.0244 + 0.7542i |
| Binary 232 = | 0 | 0 | −0.5000 + 0.8660i |
| | −0.9397 + 0.3420i | 0 | 0 |
| | 0 | −0.9397 + 0.3420i | 0 |
| Binary 233 = | 0.6171 − 0.1844i | −0.4598 − 0.6107i | −0.0275 − 0.0043i |
| | 0.5655 + 0.0078i | 0.1696 + 0.4707i | −0.6130 − 0.2325i |
| | −0.1865 − 0.4801i | 0.3058 − 0.2679i | −0.0132 − 0.7544i |
| Binary 234 = | 0.0022 − 0.0278i | −0.3713 − 0.5263i | −0.7625 + 0.0549i |
| | 0.1860 − 0.6287i | −0.1727 − 0.5385i | 0.4874 + 0.1129i |
| | 0.7513 − 0.0695i | −0.3957 − 0.3297i | −0.0592 − 0.4023i |
| Binary 235 = | 0.0213 + 0.0180i | −0.5778 − 0.2846i | −0.7239 − 0.2455i |
| | 0.4019 + 0.5181i | −0.4092 − 0.3904i | 0.4052 + 0.2934i |
| | −0.3821 + 0.6506i | −0.1898 + 0.4788i | 0.1017 − 0.3937i |
| Binary 236 = | −0.3973 − 0.5538i | −0.0687 + 0.5450i | 0.3209 + 0.3617i |
| | −0.1228 + 0.0940i | −0.6149 − 0.4099i | 0.6521 − 0.0688i |
| | −0.4755 + 0.5343i | −0.3737 + 0.1119i | −0.4048 + 0.4152i |
| Binary 237 = | 0 | 0 | 0.8782 − 0.4783i |
| | 0.4562 + 0.8899i | 0 | 0 |
| | 0 | −0.9691 + 0.2468i | 0 |
| Binary 238 = | −0.4991 − 0.4641i | 0.4536 + 0.3098i | −0.2217 − 0.4297i |
| | −0.1018 + 0.1164i | −0.6453 + 0.3602i | −0.6489 − 0.0942i |
| | −0.3602 + 0.6179i | −0.0709 + 0.3836i | 0.4947 − 0.3025i |
| Binary 239 = | −0.2750 + 0.4755i | −0.4810 + 0.0494i | −0.6606 + 0.1675i |
| | −0.4074 − 0.6165i | −0.3248 + 0.5696i | 0.0426 + 0.1486i |
| | −0.3878 − 0.0420i | −0.1009 − 0.5710i | 0.3236 + 0.6379i |
| Binary 240 = | −0.7582 − 0.0972i | 0.0128 − 0.0248i | 0.6441 + 0.0057i |
| | 0.4553 + 0.2073i | 0.4156 − 0.5071i | 0.5381 + 0.1742i |
| | 0.0217 − 0.4060i | 0.7194 + 0.2278i | −0.0367 − 0.5138i |
| Binary 241 = | −0.0140 + 0.0241i | 0.1799 − 0.6184i | 0.1161 − 0.7556i |
| | −0.4404 + 0.4857i | 0.3134 − 0.4708i | −0.2186 + 0.4500i |
| | −0.7071 − 0.2634i | −0.5045 − 0.1038i | 0.4054 + 0.0318i |
| Binary 242 = | −0.3385 − 0.3452i | −0.0163 − 0.6813i | 0.1492 − 0.5287i |
| | −0.6479 + 0.1012i | −0.1544 + 0.0084i | 0.5469 + 0.4970i |
| | 0.3836 − 0.4349i | −0.6939 + 0.1736i | 0.3862 − 0.0550i |
| Binary 243 = | −0.1378 − 0.6292i | 0.4005 − 0.6512i | −0.0251 − 0.0122i |
| | 0.0501 − 0.5633i | −0.3762 + 0.3298i | −0.5173 − 0.4029i |
| | −0.4927 + 0.1501i | 0.3612 + 0.1868i | 0.2098 − 0.7248i |

TABLE 2-continued

Bit allocation of Coset Extension of $G_{63,37}$

| | | | |
|---|---|---|---|
| Binary 244 = | −0.0359 − 0.7636i | 0.0266 + 0.0083i | 0.1062 + 0.6353i |
| | −0.1251 + 0.4844i | 0.5715 + 0.3213i | −0.0781 + 0.5601i |
| | 0.4036 − 0.0491i | −0.0994 + 0.7480i | 0.4996 − 0.1254i |
| Binary 245 = | −0.5100 − 0.3934i | −0.1118 − 0.7562i | −0.0270 + 0.0068i |
| | −0.3237 − 0.4637i | −0.0762 + 0.4945i | −0.6552 + 0.0239i |
| | −0.2810 + 0.4317i | 0.3967 − 0.0891i | −0.3052 − 0.6901i |
| Binary 246 = | −0.4304 + 0.4791i | 0.6631 − 0.3803i | −0.0278 − 0.0015i |
| | −0.4866 + 0.2882i | −0.4881 + 0.1097i | −0.6331 − 0.1703i |
| | 0.4095 + 0.3124i | 0.2278 + 0.3368i | −0.0882 − 0.7494i |
| Binary 247 = | −0.6360 − 0.1016i | 0.1907 − 0.7403i | 0.0103 − 0.0259i |
| | −0.5061 − 0.2524i | −0.2623 + 0.4260i | 0.3631 − 0.5459i |
| | −0.0403 + 0.5135i | 0.4002 + 0.0720i | 0.7385 + 0.1550i |
| Binary 248 = | −0.3414 + 0.5899i | −0.5431 − 0.0823i | −0.4742 − 0.0946i |
| | 0.1362 + 0.0733i | 0.4251 − 0.6045i | −0.4783 + 0.4486i |
| | 0.6826 + 0.2137i | −0.1026 − 0.3764i | 0.0719 − 0.5754i |
| Binary 249 = | 0.5635 − 0.3833i | −0.2743 − 0.4759i | 0.1977 − 0.4412i |
| | −0.0909 − 0.1251i | 0.7376 − 0.0445i | −0.3309 − 0.5661i |
| | −0.5223 − 0.4887i | 0.2303 − 0.3148i | 0.5449 + 0.1982i |
| Binary 250 = | 0.6977 − 0.3124i | 0.0230 + 0.0158i | 0.6414 − 0.0584i |
| | −0.4966 + 0.0606i | 0.4514 + 0.4755i | 0.5527 + 0.1197i |
| | 0.1932 + 0.3578i | −0.3155 + 0.6855i | −0.0877 − 0.5076i |
| Binary 251 = | 0 | 0.5425 − 0.8400i | 0 |
| | 0 | 0 | 0.6982 + 0.7159i |
| | 0.3653 − 0.9309i | 0 | 0 |
| Binary 252 = | 0 | 0 | −0.3185 − 0.9479i |
| | 0.9556 − 0.2948i | 0 | 0 |
| | 0 | 0.0747 + 0.9972i | 0 |
| Binary 253 = | 0 | −0.2225 − 0.9749i | 0 |
| | 0 | 0 | −0.9010 + 0.4339i |
| | 0.9802 − 0.1981i | 0 | 0 |
| Binary 254 = | −0.3270 + 0.5549i | −0.0359 − 0.7636i | 0.0266 + 0.0083i |
| | −0.4199 + 0.3789i | −0.1251 + 0.4844i | 0.5715 + 0.3213i |
| | 0.4633 + 0.2251i | 0.4036 − 0.0491i | −0.0994 + 0.7480i |
| Binary 255 = | 0.4536 + 0.3098i | −0.2217 − 0.4297i | −0.6807 − 0.0347i |
| | −0.6453 + 0.3602i | −0.6489 − 0.0942i | −0.0031 + 0.1546i |
| | −0.0709 + 0.3836i | 0.4947 − 0.3025i | 0.1212 + 0.7049i |
| Binary 256 = | 0 | −0.9691 + 0.2468i | 0 |
| | 0 | 0 | 0.9802 + 0.1981i |
| | −0.2225 + 0.9749i | 0 | 0 |
| Binary 257 = | 0.4362 + 0.2086i | 0.2483 + 0.6347i | 0.0406 + 0.5478i |
| | 0.5742 − 0.3167i | 0.1422 − 0.0607i | −0.6839 − 0.2799i |
| | −0.2117 + 0.5398i | 0.5927 − 0.4004i | −0.3441 + 0.1837i |
| Binary 258 = | 0.2300 + 0.6016i | −0.7365 + 0.2049i | −0.0276 + 0.0041i |
| | 0.0345 + 0.5645i | 0.5001 + 0.0141i | −0.6543 − 0.0415i |
| | 0.4648 − 0.2219i | −0.1377 − 0.3826i | −0.2350 − 0.7170i |
| Binary 259 = | 0 | −0.4113 + 0.9115i | 0 |
| | 0 | 0 | −0.0249 − 0.9997i |
| | −0.2225 − 0.9749i | 0 | 0 |
| Binary 260 = | 0 | −0.9988 − 0.0498i | 0 |
| | 0 | 0 | 0.2708 − 0.9626i |
| | −0.9888 + 0.1490i | 0 | 0 |
| Binary 261 = | −0.1297 + 0.4658i | −0.5819 + 0.3548i | −0.5324 + 0.1351i |
| | 0.4116 + 0.5105i | 0.0845 + 0.1295i | 0.1569 − 0.7221i |
| | −0.5684 − 0.1147i | 0.4973 + 0.5141i | −0.2407 − 0.3070i |
| Binary 262 = | 0.3862 + 0.2909i | −0.4515 + 0.5105i | −0.1745 − 0.5208i |
| | 0.6256 − 0.1967i | 0.1189 + 0.0988i | 0.7318 + 0.1025i |
| | −0.3145 + 0.4872i | 0.6267 + 0.3447i | 0.2881 − 0.2630i |
| Binary 263 = | −0.0852 − 0.4759i | −0.0855 + 0.6762i | 0.2502 + 0.4890i |
| | −0.5923 − 0.2813i | 0.1539 + 0.0147i | −0.7389 + 0.0077i |
| | 0.5619 − 0.1433i | 0.7120 − 0.0682i | −0.2457 + 0.3030i |
| Binary 264 = | 0.0108 − 0.4834i | −0.6407 + 0.2324i | −0.3631 − 0.4121i |
| | −0.5248 − 0.3931i | 0.0572 + 0.1437i | 0.7142 − 0.1898i |
| | 0.5791 − 0.0291i | 0.3855 + 0.6025i | 0.1634 − 0.3542i |
| Binary 265 = | −0.2177 + 0.6458i | −0.3210 + 0.4457i | 0.4362 + 0.2086i |
| | 0.1480 + 0.0449i | −0.3440 − 0.6540i | 0.5742 − 0.3167i |
| | 0.7114 + 0.0742i | −0.3817 − 0.0804i | −0.2117 + 0.5398i |
| Binary 266 = | 0.5963 + 0.4783i | −0.0262 − 0.0096i | 0.6403 + 0.0698i |
| | −0.2805 − 0.4143i | −0.5548 − 0.3494i | 0.5180 + 0.2269i |
| | −0.2302 − 0.3351i | 0.1366 − 0.7421i | 0.0146 − 0.5149i |
| Binary 267 = | 0.1528 − 0.4587i | 0.1839 + 0.6563i | 0.2510 − 0.4886i |
| | −0.3856 − 0.5304i | 0.1475 − 0.0463i | 0.4376 + 0.5955i |
| | 0.5620 + 0.1429i | 0.6296 − 0.3394i | 0.3894 + 0.0227i |
| Binary 268 = | 0.7353 + 0.2091i | 0.0074 + 0.0269i | 0.5289 + 0.3675i |
| | −0.4194 − 0.2728i | 0.0402 + 0.6544i | 0.3465 + 0.4470i |
| | −0.0820 + 0.3982i | −0.6823 + 0.3223i | 0.2591 − 0.4452i |

TABLE 2-continued

Bit allocation of Coset Extension of $G_{63,37}$

| | | | |
|---|---|---|---|
| Binary 269 = | −0.9691 + 0.2468i | 0 | 0 |
| | 0 | 0.9802 + 0.1981i | 0 |
| | 0 | 0 | 0.4562 + 0.8899i |
| Binary 270 = | −0.0270 + 0.0068i | −0.6435 + 0.0264i | −0.5717 − 0.5075i |
| | −0.6552 + 0.0239i | −0.5461 − 0.1471i | 0.2595 + 0.4278i |
| | −0.3052 − 0.6901i | 0.0623 + 0.5113i | 0.2467 − 0.3232i |
| Binary 271 = | −0.5163 + 0.1875i | −0.4002 − 0.2713i | −0.6137 − 0.2964i |
| | 0.0842 − 0.7342i | −0.6150 + 0.2276i | −0.0629 + 0.1412i |
| | −0.2701 − 0.2815i | 0.2898 − 0.5023i | −0.1621 + 0.6966i |
| Binary 272 = | 0.2003 + 0.5115i | 0.1552 + 0.4579i | 0.5226 − 0.4375i |
| | −0.7360 − 0.0659i | 0.6276 + 0.1899i | −0.1029 − 0.1154i |
| | −0.2747 + 0.2770i | −0.5343 + 0.2254i | −0.5683 − 0.4343i |
| Binary 273 = | −0.2613 + 0.4068i | 0.3103 + 0.6068i | −0.3203 − 0.4462i |
| | 0.2429 + 0.6091i | 0.1354 − 0.0746i | 0.7295 − 0.1178i |
| | −0.5093 − 0.2772i | 0.5499 − 0.4574i | 0.1978 − 0.3362i |
| Binary 274 = | −0.4324 + 0.6304i | −0.0185 + 0.0208i | 0.6324 − 0.1220i |
| | 0.3922 − 0.3106i | −0.5279 + 0.3888i | 0.5619 + 0.0641i |
| | −0.3514 − 0.2046i | −0.6409 − 0.3982i | −0.1378 − 0.4963i |
| Binary 275 = | 0.1493 + 0.7497i | −0.0138 − 0.0242i | 0.4456 + 0.4650i |
| | 0.0515 − 0.4976i | −0.2004 − 0.6243i | 0.2510 + 0.5068i |
| | −0.3918 + 0.1087i | 0.5816 − 0.4807i | 0.3422 − 0.3850i |
| Binary 276 = | −0.1536 + 0.7489i | 0.0277 + 0.0029i | 0.6138 + 0.1953i |
| | 0.2407 − 0.4386i | 0.6239 + 0.2017i | 0.4628 + 0.3250i |
| | −0.4033 − 0.0520i | 0.0508 + 0.7528i | 0.1164 − 0.5018i |
| Binary 277 = | −0.7239 − 0.2455i | 0.0279 + 0.0001i | −0.6256 + 0.1534i |
| | 0.4052 + 0.2934i | 0.6408 + 0.1385i | −0.5644 − 0.0360i |
| | 0.1017 − 0.3937i | 0.1255 + 0.7441i | 0.1624 + 0.4888i |
| Binary 278 = | 0.0424 + 0.6427i | 0.1493 + 0.7497i | −0.0138 − 0.0242i |
| | −0.1335 + 0.5496i | 0.0515 − 0.4976i | −0.2004 − 0.6243i |
| | 0.5096 − 0.0750i | −0.3918 + 0.1087i | 0.5816 − 0.4807i |
| Binary 279 = | 0.4119 − 0.2532i | −0.2810 + 0.6209i | 0.5063 − 0.2130i |
| | 0.0455 − 0.6542i | 0.1428 + 0.0594i | −0.0475 + 0.7375i |
| | 0.3386 + 0.4707i | 0.7005 + 0.1447i | 0.2838 + 0.2677i |
| Binary 280 = | 0.0950 + 0.5410i | −0.3367 + 0.3470i | −0.3984 + 0.5529i |
| | −0.7084 − 0.2104i | 0.1173 + 0.6452i | 0.1282 + 0.0865i |
| | −0.3241 + 0.2171i | −0.4443 − 0.3726i | 0.6579 + 0.2806i |
| Binary 281 = | 0 | 0 | −0.5000 − 0.8660i |
| | 0.1736 − 0.9848i | 0 | 0 |
| | 0 | 0.1736 − 0.9848i | 0 |
| Binary 282 = | 0.4689 + 0.1181i | 0.6781 + 0.0686i | 0.0958 − 0.5409i |
| | 0.5000 − 0.4242i | 0.0108 − 0.1543i | 0.5937 + 0.4400i |
| | −0.1005 + 0.5711i | −0.0859 − 0.7101i | 0.3788 − 0.0931i |
| Binary 283 = | −0.0783 + 0.7604i | −0.0252 + 0.0120i | −0.2701 + 0.5847i |
| | 0.1959 − 0.4604i | −0.6375 + 0.1532i | −0.3800 − 0.4188i |
| | −0.4064 − 0.0116i | −0.4359 − 0.6159i | 0.4834 + 0.1778i |
| Binary 284 = | 0 | 0 | −0.7971 + 0.6038i |
| | 0.2708 − 0.9626i | 0 | 0 |
| | 0 | −0.6617 + 0.7498i | 0 |
| Binary 285 = | −0.0374 − 0.4821i | 0.4255 − 0.5324i | 0.4541 − 0.3091i |
| | −0.5614 − 0.3389i | −0.1237 − 0.0928i | 0.0995 + 0.7322i |
| | 0.5734 − 0.0866i | −0.6431 − 0.3131i | 0.3312 + 0.2061i |
| Binary 286 = | 0 | 0.9556 − 0.2948i | 0 |
| | 0 | 0 | 0.0747 + 0.9972i |
| | 0.8782 − 0.4783i | 0 | 0 |
| Binary 287 = | −0.4219 − 0.4867i | 0.6220 − 0.4445i | 0.0245 − 0.0132i |
| | −0.2254 − 0.5187i | −0.4748 + 0.1578i | 0.6291 − 0.1848i |
| | −0.3609 + 0.3675i | 0.2602 + 0.3124i | 0.4661 + 0.5934i |
| Binary 288 = | 0.3209 + 0.3617i | −0.6603 − 0.1689i | 0.2977 + 0.4617i |
| | 0.6521 − 0.0688i | −0.0337 + 0.1509i | −0.7345 + 0.0812i |
| | −0.4048 + 0.4152i | −0.0208 + 0.7150i | −0.2143 + 0.3259i |
| Binary 289 = | 0 | −0.7971 + 0.6038i | 0 |
| | 0 | 0 | −0.4113 − 0.9115i |
| | −0.6617 + 0.7498i | 0 | 0 |
| Binary 290 = | −0.0744 − 0.6398i | −0.6813 + 0.3468i | −0.0090 + 0.0264i |
| | 0.1059 − 0.5555i | 0.4930 − 0.0853i | −0.3354 + 0.5633i |
| | −0.5052 + 0.1003i | −0.2108 − 0.3477i | −0.7453 − 0.1180i |
| Binary 291 = | −0.4685 − 0.2868i | 0.3536 − 0.3298i | 0.4244 + 0.5333i |
| | 0.6265 − 0.3919i | −0.0850 − 0.6502i | 0.1180 − 0.1000i |
| | 0.0517 − 0.3867i | 0.4252 + 0.3943i | 0.4483 + 0.5573i |
| Binary 292 = | −0.5717 − 0.5075i | −0.0164 + 0.0226i | −0.4760 − 0.4339i |
| | 0.2595 + 0.4278i | −0.4866 + 0.4394i | −0.5129 + 0.2383i |
| | 0.2467 − 0.3232i | −0.6774 − 0.3324i | 0.3764 + 0.3517i |
| Binary 293 = | −0.6194 − 0.4480i | 0.0022 − 0.0278i | −0.3713 − 0.5263i |
| | 0.3008 + 0.3998i | 0.1860 − 0.6287i | −0.1727 − 0.5385i |
| | 0.2133 − 0.3462i | 0.7513 − 0.0695i | −0.3957 + 0.3297i |

TABLE 2-continued

Bit allocation of Coset Extension of $G_{63,37}$

| | | | |
|---|---|---|---|
| Binary 294 = | 0.0958 − 0.5409i | 0.4351 − 0.2109i | 0.5635 − 0.3833i |
| | 0.5937 + 0.4400i | 0.1104 − 0.6464i | −0.0909 − 0.1251i |
| | 0.3788 − 0.0931i | 0.2901 + 0.5021i | −0.5223 − 0.4887i |
| Binary 295 = | −0.0022 + 0.7644i | 0.0152 − 0.0234i | −0.5466 − 0.3407i |
| | 0.1490 − 0.4776i | 0.4641 − 0.4632i | −0.3683 − 0.4292i |
| | −0.4056 + 0.0289i | 0.6931 + 0.2983i | −0.2366 + 0.4575i |
| Binary 296 = | 0 | −0.9988 + 0.0498i | 0 |
| | 0 | 0 | 0.2708 + 0.9626i |
| | −0.0249 − 0.9997i | 0 | 0 |
| Binary 297 = | 0.4783 + 0.0708i | −0.6144 + 0.2951i | 0.5248 + 0.1623i |
| | 0.4553 − 0.4719i | 0.0712 + 0.1373i | −0.5104 + 0.5344i |
| | −0.0432 + 0.5782i | 0.4436 + 0.5611i | 0.0453 + 0.3875i |
| Binary 298 = | 0 | −0.9691 − 0.2468i | 0 |
| | 0 | 0 | 0.9802 − 0.1981i |
| | 0.9215 − 0.3884i | 0 | 0 |
| Binary 299 = | −0.5324 + 0.1351i | 0.2000 + 0.4402i | −0.2177 + 0.6458i |
| | 0.1569 − 0.7221i | 0.6434 + 0.1265i | 0.1480 + 0.0449i |
| | −0.2407 − 0.3070i | −0.5092 + 0.2775i | 0.7114 + 0.0742i |
| Binary 300 = | 0.9556 + 0.2948i | 0 | 0 |
| | 0 | 0.0747 − 0.9972i | 0 |
| | 0 | 0 | 0.3653 + 0.9309i |
| Binary 301 = | −0.2194 + 0.4308i | −0.5812 − 0.3560i | 0.4826 − 0.2623i |
| | 0.3023 + 0.5819i | −0.0767 + 0.1343i | 0.0261 + 0.7385i |
| | −0.5344 − 0.2251i | −0.2307 + 0.6770i | 0.3090 + 0.2381i |
| Binary 302 = | 0.7108 + 0.2813i | 0.0077 − 0.0268i | 0.2989 − 0.5705i |
| | −0.3901 − 0.3132i | 0.3069 − 0.5794i | 0.4004 − 0.3993i |
| | −0.1212 + 0.3881i | 0.7502 + 0.0807i | −0.4739 − 0.2017i |
| Binary 303 = | −0.5184 − 0.5619i | 0.0257 − 0.0107i | 0.4897 + 0.4184i |
| | 0.2156 + 0.4515i | 0.6443 − 0.1213i | 0.3002 + 0.4793i |
| | 0.2776 − 0.2971i | 0.4046 + 0.6369i | 0.3021 − 0.4172i |
| Binary 304 = | −0.1755 + 0.4505i | 0.6815 + 0.0007i | 0.2003 + 0.5115i |
| | 0.3587 + 0.5489i | −0.0046 − 0.1546i | −0.7360 − 0.0659i |
| | −0.5541 − 0.1707i | −0.1562 − 0.6980i | −0.2747 + 0.2770i |
| Binary 305 = | 0.2000 + 0.4402i | −0.2177 + 0.6458i | −0.3210 + 0.4457i |
| | 0.6434 + 0.1265i | 0.1480 + 0.0449i | −0.3440 − 0.6540i |
| | −0.5092 + 0.2775i | 0.7114 + 0.0742i | −0.3817 − 0.0804i |
| Binary 306 = | −0.3210 + 0.4457i | 0.4362 + 0.2086i | 0.2483 + 0.6347i |
| | −0.3440 − 0.6540i | 0.5742 − 0.3167i | 0.1422 − 0.0607i |
| | −0.3817 − 0.0804i | −0.2117 + 0.5398i | 0.5927 − 0.4004i |
| Binary 307 = | 0.4682 − 0.1205i | 0.5982 + 0.3266i | 0.3832 + 0.3935i |
| | 0.2363 − 0.6117i | 0.0699 − 0.1379i | −0.7038 + 0.2252i |
| | 0.1848 + 0.5496i | 0.1966 − 0.6877i | −0.1455 + 0.3619i |
| Binary 308 = | −0.0679 − 0.5451i | 0.2429 + 0.4181i | −0.1510 − 0.6646i |
| | 0.6970 + 0.2455i | 0.6528 + 0.0618i | −0.1497 + 0.0389i |
| | 0.3345 − 0.2007i | −0.4790 + 0.3268i | −0.6457 + 0.3076i |
| Binary 309 = | −0.4810 + 0.0494i | −0.6606 + 0.1675i | 0.0950 + 0.5410i |
| | −0.3248 + 0.5696i | 0.0426 + 0.1486i | −0.7084 − 0.2104i |
| | −0.1009 − 0.5710i | 0.3236 + 0.6379i | −0.3241 + 0.2171i |
| Binary 310 = | 0 | −0.5837 + 0.8119i | 0 |
| | 0 | 0 | 0.8782 − 0.4783i |
| | 0.4562 + 0.8899i | 0 | 0 |
| Binary 311 = | 0.1907 − 0.7403i | 0.0103 − 0.0259i | −0.5525 + 0.3310i |
| | −0.2623 + 0.4260i | 0.3631 − 0.5459i | −0.5499 + 0.1320i |
| | 0.4002 + 0.0720i | 0.7385 + 0.1550i | 0.2992 + 0.4193i |
| Binary 312 = | −0.4460 − 0.1866i | −0.5437 + 0.4109i | 0.3838 − 0.3929i |
| | −0.5577 + 0.3449i | 0.0970 + 0.1204i | 0.2427 + 0.6980i |
| | 0.1845 − 0.5497i | 0.5460 + 0.4621i | 0.3655 + 0.1364i |
| Binary 313 = | −0.3712 − 0.3098i | 0.3692 + 0.5729i | 0.5060 + 0.2138i |
| | −0.6346 + 0.1652i | 0.1273 − 0.0877i | −0.5611 + 0.4809i |
| | 0.3383 − 0.4709i | 0.5016 − 0.5099i | 0.0065 + 0.3900i |
| Binary 314 = | −0.2701 + 0.5847i | 0.4288 + 0.6328i | −0.0116 + 0.0254i |
| | −0.3800 + 0.4188i | −0.1459 − 0.4786i | −0.3899 + 0.5271i |
| | 0.4834 + 0.1778i | −0.3188 + 0.2524i | −0.7298 − 0.1916i |
| Binary 315 = | −0.6959 − 0.3164i | −0.0237 − 0.0146i | 0.2300 + 0.6016i |
| | 0.3740 + 0.3323i | −0.4746 − 0.4524i | 0.0345 + 0.5645i |
| | 0.1404 − 0.3816i | 0.2809 − 0.7003i | 0.4648 − 0.2219i |
| Binary 316 = | −0.0138 − 0.0242i | 0.4456 + 0.4650i | 0.5963 + 0.4783i |
| | −0.2004 − 0.6243i | 0.2510 + 0.5068i | −0.2805 − 0.4143i |
| | 0.5816 − 0.4807i | 0.3422 − 0.3850i | −0.2302 + 0.3351i |
| Binary 317 = | 0.4633 − 0.6080i | 0.0150 − 0.0235i | −0.3270 + 0.5549i |
| | −0.4072 + 0.2907i | 0.2313 + 0.6135i | −0.4199 + 0.3789i |
| | 0.3408 + 0.2218i | −0.5569 + 0.5091i | 0.4633 + 0.2251i |
| Binary 318 = | 0.2406 − 0.4194i | −0.5001 + 0.4630i | −0.1226 + 0.5354i |
| | −0.2729 − 0.5962i | 0.1085 + 0.1102i | −0.5710 − 0.4691i |
| | 0.5225 + 0.2514i | 0.5893 + 0.4054i | −0.3830 + 0.0741i |

TABLE 2-continued

Bit allocation of Coset Extension of $G_{63,37}$

| | | | |
|---|---|---|---|
| Binary 319 = | −0.3203 − 0.4462i | 0.0614 + 0.4796i | 0.6277 + 0.2654i |
| | 0.7295 − 0.1178i | 0.5776 + 0.3105i | 0.0558 − 0.1442i |
| | 0.1978 − 0.3362i | −0.5683 + 0.1151i | 0.1272 − 0.7039i |
| Binary 320 = | 0.1175 − 0.6333i | 0.2949 + 0.7053i | −0.0278 + 0.0013i |
| | 0.2649 − 0.4996i | −0.0482 − 0.4980i | −0.6469 − 0.1064i |
| | −0.5124 − 0.0531i | −0.3625 + 0.1842i | −0.1624 − 0.7369i |
| Binary 321 = | −0.7642 − 0.0212i | 0.0020 + 0.0278i | −0.0857 + 0.6384i |
| | 0.4737 + 0.1609i | −0.0903 + 0.6494i | −0.2397 + 0.5122i |
| | −0.0188 − 0.4062i | −0.7326 + 0.1807i | 0.5144 + 0.0275i |
| Binary 322 = | 0.5493 + 0.0004i | 0.2833 + 0.3918i | 0.4754 + 0.4884i |
| | −0.3303 + 0.6611i | 0.6557 − 0.0035i | 0.1074 − 0.1112i |
| | 0.1575 + 0.3569i | −0.4441 + 0.3729i | 0.3906 − 0.5992i |
| Binary 323 = | −0.0687 + 0.5450i | 0.3209 + 0.3617i | −0.6603 − 0.1689i |
| | −0.6149 − 0.4099i | 0.6521 − 0.0688i | −0.0337 + 0.1509i |
| | −0.3737 + 0.1119i | −0.4048 + 0.4152i | −0.0208 + 0.7150i |
| Binary 324 = | −0.6813 + 0.3468i | −0.0090 + 0.0264i | −0.4682 − 0.4423i |
| | 0.4930 − 0.0853i | −0.3354 + 0.5633i | −0.2760 − 0.4936i |
| | −0.2108 − 0.3477i | −0.7453 − 0.1180i | −0.3225 + 0.4016i |
| Binary 325 = | 0.0133 + 0.4833i | −0.3973 − 0.5538i | −0.0687 + 0.5450i |
| | 0.5438 + 0.3665i | −0.1228 + 0.0940i | −0.6149 − 0.4099i |
| | −0.5770 + 0.0579i | −0.4755 + 0.5343i | −0.3737 + 0.1119i |
| Binary 326 = | 0.2232 + 0.7311i | 0.0244 + 0.0134i | −0.5168 + 0.3843i |
| | 0.0016 − 0.5003i | 0.4965 + 0.4282i | −0.5341 + 0.1861i |
| | −0.3790 + 0.1472i | −0.2456 + 0.7135i | 0.3395 + 0.3874i |
| Binary 327 = | 0.2011 − 0.5112i | 0.3862 + 0.2909i | −0.4515 + 0.5105i |
| | 0.4947 + 0.5489i | 0.6256 − 0.1967i | 0.1189 + 0.0988i |
| | 0.3898 − 0.0162i | −0.3145 + 0.4872i | 0.6267 + 0.3447i |
| Binary 328 = | 0.0415 − 0.5477i | −0.2613 + 0.4068i | 0.3103 + 0.6068i |
| | 0.6346 + 0.3787i | 0.2429 + 0.6091i | 0.1354 − 0.0746i |
| | 0.3677 − 0.1304i | −0.5093 − 0.2772i | 0.5499 − 0.4574i |
| Binary 329 = | −0.3675 + 0.6703i | 0.0049 − 0.0274i | 0.0424 + 0.6427i |
| | 0.3593 − 0.3481i | 0.2477 − 0.6070i | −0.1335 + 0.5496i |
| | −0.3700 − 0.1686i | 0.7545 + 0.0056i | 0.5096 − 0.0750i |
| Binary 330 = | −0.5828 + 0.2743i | −0.0783 + 0.7604i | −0.0252 + 0.0120i |
| | −0.5603 + 0.0765i | 0.1959 − 0.4604i | −0.6375 + 0.1532i |
| | 0.2560 + 0.4470i | −0.4064 − 0.0116i | −0.4359 − 0.6159i |
| Binary 331 = | −0.5488 + 0.5322i | −0.0270 − 0.0070i | −0.5828 + 0.2743i |
| | 0.4460 − 0.2268i | −0.5868 − 0.2924i | −0.5603 + 0.0765i |
| | −0.3039 − 0.2701i | 0.0620 − 0.7520i | 0.2560 + 0.4470i |
| Binary 332 = | 0 | −0.9397 + 0.3420i | 0 |
| | 0 | 0 | −0.9397 + 0.3420i |
| | −0.9397 − 0.3420i | 0 | 0 |
| Binary 333 = | 0.6410 + 0.4166i | 0.0273 − 0.0054i | −0.1489 + 0.6266i |
| | −0.3203 − 0.3843i | 0.6556 + 0.0088i | −0.2895 + 0.4858i |
| | −0.1957 + 0.3564i | 0.2704 + 0.7044i | 0.5091 + 0.0785i |
| Binary 334 = | −0.5466 − 0.3407i | 0.4897 + 0.5870i | −0.0034 − 0.0277i |
| | −0.3683 − 0.4292i | −0.1928 − 0.4617i | 0.0578 − 0.6531i |
| | −0.2366 + 0.4575i | −0.2921 + 0.2829i | 0.7227 − 0.2170i |
| Binary 335 = | −0.4381 + 0.3313i | 0.2406 − 0.4194i | −0.5001 + 0.4630i |
| | −0.1359 − 0.7264i | −0.2729 − 0.5962i | 0.1085 + 0.1102i |
| | −0.3410 − 0.1894i | 0.5225 + 0.2514i | 0.5893 + 0.4054i |
| Binary 336 = | −0.1753 + 0.5206i | −0.1755 + 0.4505i | 0.6815 + 0.0007i |
| | −0.5215 − 0.5236i | 0.3587 + 0.5489i | −0.0046 − 0.1546i |
| | −0.3885 + 0.0356i | −0.5541 − 0.1707i | −0.1562 − 0.6980i |
| Binary 337 = | 0.1552 + 0.4579i | 0.5226 − 0.4375i | 0.4822 + 0.2631i |
| | 0.6276 + 0.1899i | −0.1029 − 0.1154i | −0.6062 + 0.4226i |
| | −0.5343 + 0.2254i | −0.5683 − 0.4343i | −0.0324 + 0.3888i |
| Binary 338 = | 0.4288 + 0.6328i | −0.0116 + 0.0254i | 0.1689 + 0.6215i |
| | −0.1459 − 0.4786i | −0.3899 + 0.5271i | −0.0219 + 0.5651i |
| | −0.3188 + 0.2524i | −0.7298 − 0.1916i | 0.4846 − 0.1745i |
| Binary 339 = | 0.0406 + 0.5478i | 0.4682 − 0.1205i | 0.5982 + 0.3266i |
| | −0.6839 − 0.2799i | 0.2363 − 0.6117i | 0.0699 − 0.1379i |
| | −0.3441 + 0.1837i | 0.1848 + 0.5496i | 0.1966 − 0.6877i |
| Binary 340 = | −0.3367 + 0.3470i | −0.3984 + 0.5529i | 0.4205 + 0.3534i |
| | 0.1173 + 0.6452i | 0.1282 + 0.0865i | −0.6779 + 0.2941i |
| | −0.4443 − 0.3726i | 0.6579 + 0.2806i | −0.1087 + 0.3746i |
| Binary 341 = | 0 | −0.6617 + 0.7498i | 0 |
| | 0 | 0 | −0.9988 − 0.0498i |
| | 0.8262 − 0.5633i | 0 | 0 |
| Binary 342 = | 0.5250 − 0.1615i | −0.3696 + 0.3118i | 0.6283 − 0.2641i |
| | −0.1207 + 0.7291i | 0.0525 + 0.6536i | −0.0643 − 0.1406i |
| | 0.2557 + 0.2946i | −0.4050 − 0.4150i | −0.4151 − 0.5825i |
| Binary 343 = | 0.7524 + 0.1349i | −0.0204 − 0.0190i | −0.4304 + 0.4791i |
| | −0.4444 − 0.2297i | −0.3755 − 0.5374i | −0.4866 + 0.2882i |
| | −0.0419 + 0.4044i | 0.4141 − 0.6308i | 0.4095 + 0.3124i |

TABLE 2-continued

Bit allocation of Coset Extension of $G_{63,37}$

| | | | |
|---|---|---|---|
| Binary 344 = | 0.4205 + 0.3534i | −0.0349 + 0.4822i | 0.0502 + 0.6797i |
| | −0.6779 + 0.2941i | 0.5046 + 0.4188i | 0.1538 − 0.0161i |
| | −0.1087 + 0.3746i | −0.5799 + 0.0002i | 0.6844 − 0.2079i |
| Binary 345 = | 1.0000 − 0.0000i | 0 | 0 |
| | 0 | 1.0000 + 0.0000i | 0 |
| | 0 | 0 | 1.0000 − 0.0000i |
| Binary 346 = | 0.2977 + 0.4617i | 0.4783 + 0.0708i | −0.6144 + 0.2951i |
| | −0.7345 + 0.0812i | 0.4553 − 0.4719i | 0.0712 + 0.1373i |
| | −0.2143 + 0.3259i | −0.0432 + 0.5782i | 0.4436 + 0.5611i |
| Binary 347 = | 0.4897 + 0.5870i | −0.0034 − 0.0277i | −0.6377 + 0.0903i |
| | −0.1928 − 0.4617i | 0.0578 − 0.6531i | −0.5580 − 0.0920i |
| | −0.2921 + 0.2829i | 0.7227 − 0.2170i | 0.1129 + 0.5026i |
| Binary 348 = | −0.3297 − 0.6897i | −0.0088 − 0.0265i | −0.2105 + 0.6087i |
| | 0.0729 + 0.4950i | −0.0728 − 0.6516i | −0.3365 + 0.4546i |
| | 0.3528 − 0.2020i | 0.6653 − 0.3559i | 0.4987 + 0.1288i |
| Binary 349 = | 0.8782 − 0.4783i | 0 | 0 |
| | 0 | 0.9215 + 0.3884i | 0 |
| | 0 | 0 | −0.5837 + 0.8119i |
| Binary 350 = | 0.2502 + 0.4890i | −0.3712 − 0.3098i | 0.3692 + 0.5729i |
| | −0.7389 + 0.0077i | −0.6346 + 0.1652i | 0.1273 − 0.0877i |
| | −0.2457 + 0.3030i | 0.3383 − 0.4709i | 0.5016 − 0.5099i |
| Binary 351 = | 0.5248 + 0.1623i | 0.4119 − 0.2532i | −0.2810 + 0.6209i |
| | −0.5104 + 0.5344i | 0.0455 − 0.6542i | 0.1428 + 0.0594i |
| | 0.0453 + 0.3875i | 0.3386 + 0.4707i | 0.7005 + 0.1447i |
| Binary 352 = | −0.5322 − 0.1360i | 0.3553 + 0.3279i | 0.6515 − 0.2002i |
| | 0.4832 − 0.5591i | 0.6420 − 0.1334i | −0.0499 − 0.1463i |
| | −0.0646 − 0.3847i | −0.3614 − 0.4535i | −0.3550 − 0.6209i |
| Binary 353 = | 0.5629 + 0.3130i | −0.4324 + 0.6304i | −0.0185 + 0.0208i |
| | 0.3892 + 0.4103i | 0.3922 − 0.3106i | −0.5279 + 0.3888i |
| | 0.2135 − 0.4688i | −0.3514 − 0.2046i | −0.6409 − 0.3982i |
| Binary 354 = | 0.4822 + 0.2631i | 0.4132 + 0.2510i | 0.1191 − 0.6711i |
| | −0.6062 + 0.4226i | 0.6029 − 0.2580i | −0.1530 − 0.0223i |
| | −0.0324 + 0.3888i | −0.2644 + 0.5161i | −0.7145 + 0.0326i |
| Binary 355 = | 0 | −0.9888 + 0.1490i | 0 |
| | 0 | 0 | −0.7331 − 0.6802i |
| | 0.9950 + 0.0996i | 0 | 0 |
| Binary 356 = | 0.6324 − 0.1220i | 0.0739 + 0.7609i | −0.0008 + 0.0279i |
| | 0.5619 + 0.0641i | 0.1007 − 0.4901i | −0.1545 + 0.6372i |
| | −0.1378 − 0.4963i | −0.4007 + 0.0692i | −0.7469 + 0.1069i |
| Binary 357 = | 0 | 0 | 0.4562 − 0.8899i |
| | −0.5837 − 0.8119i | 0 | 0 |
| | 0 | 0.8782 + 0.4783i | 0 |
| Binary 358 = | 0 | 0 | 0.0747 − 0.9972i |
| | −0.3185 + 0.9479i | 0 | 0 |
| | 0 | 0.5425 + 0.8400i | 0 |
| Binary 359 = | −0.2263 + 0.5005i | 0.3846 − 0.2930i | −0.0840 − 0.6763i |
| | −0.4668 − 0.5729i | −0.0199 − 0.6554i | −0.1528 + 0.0238i |
| | −0.3901 − 0.0032i | 0.3838 + 0.4346i | −0.6731 + 0.2418i |
| Binary 360 = | −0.0857 + 0.6384i | −0.5990 + 0.4749i | 0.0194 + 0.0200i |
| | −0.2397 + 0.5122i | 0.4663 − 0.1812i | 0.3483 + 0.5555i |
| | 0.5144 + 0.0275i | −0.2755 − 0.2990i | −0.4450 + 0.6094i |
| Binary 361 = | 0.4211 − 0.3528i | 0.4689 + 0.1181i | 0.6781 + 0.0686i |
| | 0.1719 + 0.7187i | 0.5000 − 0.4242i | 0.0108 − 0.1543i |
| | 0.3501 + 0.1721i | −0.1005 + 0.5711i | −0.0859 − 0.7101i |
| Binary 362 = | −0.3806 + 0.5196i | −0.3675 + 0.6703i | 0.0049 − 0.0274i |
| | −0.4555 + 0.3352i | 0.3593 − 0.3481i | 0.2477 − 0.6070i |
| | 0.4386 + 0.2701i | −0.3700 − 0.1686i | 0.7545 + 0.0056i |
| Binary 363 = | −0.0349 + 0.4822i | 0.0502 + 0.6797i | 0.5493 + 0.0004i |
| | 0.5046 + 0.4188i | 0.1538 − 0.0161i | −0.3303 + 0.6611i |
| | −0.5799 + 0.0002i | 0.6844 − 0.2079i | 0.1575 + 0.3569i |
| Binary 364 = | 0 | 0 | 0.6982 − 0.7159i |
| | −0.8533 + 0.5214i | 0 | 0 |
| | 0 | −0.1243 + 0.9922i | 0 |
| Binary 365 = | 0.2483 + 0.6347i | 0.0406 + 0.5478i | 0.4682 − 0.1205i |
| | 0.1422 − 0.0607i | −0.6839 − 0.2799i | 0.2363 − 0.6117i |
| | 0.5927 − 0.4004i | −0.3441 + 0.1837i | 0.1848 + 0.5496i |
| Binary 366 = | 0.6441 + 0.0057i | −0.6433 + 0.4129i | −0.0061 − 0.0272i |
| | 0.5381 + 0.1742i | 0.4820 − 0.1339i | −0.0075 − 0.6556i |
| | −0.0367 − 0.5138i | −0.2443 − 0.3250i | 0.6975 − 0.2879i |
| Binary 367 = | −0.1997 − 0.6123i | −0.0022 + 0.7644i | 0.0152 − 0.0234i |
| | −0.0063 − 0.5655i | 0.1490 − 0.4776i | 0.4641 − 0.4632i |
| | −0.4753 + 0.1984i | −0.4056 + 0.0289i | 0.6931 + 0.2983i |
| Binary 368 = | 0 | −0.9888 − 0.1490i | 0 |
| | 0 | 0 | −0.7331 + 0.6802i |
| | 0.2708 + 0.9626i | 0 | 0 |

TABLE 2-continued

Bit allocation of Coset Extension of $G_{63,37}$

| | | | |
|---|---|---|---|
| Binary 369 = | −0.7625 + 0.0549i | −0.0162 − 0.0227i | −0.6227 − 0.1645i |
| | 0.4874 + 0.1129i | −0.2616 − 0.6012i | −0.4784 − 0.3015i |
| | −0.0592 − 0.4023i | 0.5309 − 0.5362i | −0.0912 + 0.5070i |
| Binary 370 = | −0.6227 − 0.1645i | −0.5488 + 0.5322i | −0.0270 − 0.0070i |
| | −0.4784 − 0.3015i | 0.4460 − 0.2268i | −0.5868 − 0.2924i |
| | −0.0912 + 0.5070i | −0.3039 − 0.2701i | 0.0620 − 0.7520i |
| Binary 371 = | 0 | 0.9950 − 0.0996i | 0 |
| | 0 | 0 | −0.8533 + 0.5214i |
| | −0.7331 + 0.6802i | 0 | 0 |
| Binary 372 = | 0 | −0.9397 − 0.3420i | 0 |
| | 0 | 0 | −0.9397 − 0.3420i |
| | −0.5000 − 0.8660i | 0 | 0 |
| Binary 373 = | −0.6430 − 0.0378i | 0.2232 + 0.7311i | 0.0244 + 0.0134i |
| | −0.5287 − 0.2008i | 0.0016 − 0.5003i | 0.4965 + 0.4282i |
| | 0.0111 + 0.5150i | −0.3790 + 0.1472i | −0.2456 + 0.7135i |
| Binary 374 = | 0 | 0 | 1.0000 − 0.0000i |
| | 0.7660 + 0.6428i | 0 | 0 |
| | 0 | 0.7660 + 0.6428i | 0 |
| Binary 375 = | 0 | 0 | 0.7660 − 0.6428i |
| | 1.0000 + 0.0000i | 0 | 0 |
| | 0 | 1.0000 − 0.0000i | 0 |
| Binary 376 = | −0.7124 + 0.2772i | 0.0214 − 0.0178i | −0.3806 + 0.5196i |
| | 0.4990 − 0.0357i | 0.5800 − 0.3058i | −0.4555 + 0.3352i |
| | −0.1751 − 0.3670i | 0.5744 + 0.4893i | 0.4386 + 0.2701i |
| Binary 377 = | 0 | −0.5000 + 0.8660i | 0 |
| | 0 | 0 | −0.5000 + 0.8660i |
| | −0.9397 + 0.3420i | 0 | 0 |
| Binary 378 = | 0.3832 + 0.3935i | 0.2812 − 0.3933i | 0.6682 − 0.1343i |
| | −0.7038 + 0.2252i | −0.2122 − 0.6205i | −0.0351 − 0.1506i |
| | −0.1455 + 0.3619i | 0.4949 + 0.3022i | −0.2914 − 0.6532i |
| Binary 379 = | 0.5216 − 0.5589i | −0.0006 − 0.0279i | 0.5913 + 0.2554i |
| | −0.4341 + 0.2487i | 0.1225 − 0.6441i | 0.4282 + 0.3695i |
| | 0.3170 + 0.2546i | 0.7407 − 0.1440i | 0.1657 − 0.4877i |
| Binary 380 = | −0.8533 + 0.5214i | 0 | 0 |
| | 0 | −0.1243 + 0.9922i | 0 |
| | 0 | 0 | 0.9950 − 0.0996i |
| Binary 381 = | −0.0270 − 0.0070i | −0.5828 + 0.2743i | −0.0783 + 0.7604i |
| | −0.5868 − 0.2924i | −0.5603 + 0.0765i | 0.1959 − 0.4604i |
| | 0.0620 − 0.7520i | 0.2560 + 0.4470i | −0.4064 − 0.0116i |
| Binary 382 = | 0.3421 + 0.4297i | −0.4450 + 0.1890i | −0.2164 − 0.6463i |
| | −0.7228 + 0.1540i | −0.1425 + 0.6401i | −0.1450 + 0.0536i |
| | −0.1808 + 0.3457i | −0.2647 − 0.5159i | −0.6119 + 0.3704i |
| Binary 383 = | 0 | 0.8262 − 0.5633i | 0 |
| | 0 | 0 | −0.9888 + 0.1490i |
| | −0.1243 − 0.9922i | 0 | 0 |
| Binary 384 = | −0.0278 + 0.0013i | −0.3171 − 0.5606i | 0.6793 + 0.3507i |
| | −0.6469 − 0.1064i | −0.1182 − 0.5530i | −0.3570 − 0.3505i |
| | −0.1624 − 0.7369i | −0.4266 + 0.2887i | −0.1593 + 0.3741i |
| Binary 385 = | −0.4689 + 0.2861i | −0.4240 + 0.2324i | 0.5216 + 0.4386i |
| | −0.0629 − 0.7363i | −0.0780 + 0.6511i | 0.0958 − 0.1214i |
| | −0.3205 − 0.2224i | −0.3147 − 0.4870i | 0.3290 − 0.6351i |
| Binary 386 = | 0.9802 − 0.1981i | 0 | 0 |
| | 0 | 0.4562 − 0.8899i | 0 |
| | 0 | 0 | −0.9691 − 0.2468i |
| Binary 387 = | 0 | −0.8533 − 0.5214i | 0 |
| | 0 | 0 | −0.1243 − 0.9922i |
| | 0.6982 + 0.7159i | 0 | 0 |
| Binary 388 = | 0.2949 + 0.7053i | −0.0278 + 0.0013i | −0.3171 − 0.5606i |
| | −0.0482 − 0.4980i | −0.6469 − 0.1064i | −0.1182 − 0.5530i |
| | −0.3625 + 0.1842i | −0.1624 − 0.7369i | −0.4266 + 0.2887i |
| Binary 389 = | −0.4742 − 0.0946i | 0.1176 + 0.6713i | −0.4689 + 0.2861i |
| | −0.4783 + 0.4486i | 0.1514 − 0.0314i | −0.0629 − 0.7363i |
| | 0.0719 − 0.5754i | 0.6603 − 0.2750i | −0.3205 − 0.2224i |
| Binary 390 = | −0.0252 + 0.0120i | −0.2701 + 0.5847i | 0.4288 + 0.6328i |
| | −0.6375 + 0.1532i | −0.3800 + 0.4188i | −0.1459 − 0.4786i |
| | −0.4359 − 0.6159i | 0.4834 + 0.1778i | −0.3188 + 0.2524i |
| Binary 391 = | 0.4005 − 0.6512i | −0.0251 − 0.0122i | −0.5100 − 0.3934i |
| | −0.3762 + 0.3298i | −0.5173 − 0.4029i | −0.3237 − 0.4637i |
| | 0.3612 + 0.1868i | 0.2098 − 0.7248i | −0.2810 + 0.4317i |
| Binary 392 = | 0.2406 − 0.5975i | −0.4930 + 0.5842i | 0.0267 − 0.0081i |
| | 0.3587 − 0.4372i | 0.4212 − 0.2700i | 0.6532 − 0.0565i |
| | −0.4917 − 0.1535i | −0.3293 − 0.2385i | 0.3392 + 0.6740i |
| Binary 393 = | −0.3713 − 0.5263i | −0.7625 + 0.0549i | −0.0162 − 0.0227i |
| | −0.1727 − 0.5385i | 0.4874 + 0.1129i | −0.2616 − 0.6012i |
| | −0.3957 + 0.3297i | −0.0592 − 0.4023i | 0.5309 − 0.5362i |

TABLE 2-continued

Bit allocation of Coset Extension of $G_{63,37}$

| | | | |
|---|---|---|---|
| Binary 394 = | −0.9988 − 0.0498i | 0 | 0 |
| | 0 | 0.2708 − 0.9626i | 0 |
| | 0 | 0 | −0.6617 + 0.7498i |
| Binary 395 = | −0.4930 + 0.5842i | 0.0267 − 0.0081i | −0.1997 − 0.6123i |
| | 0.4212 − 0.2700i | 0.6532 − 0.0565i | −0.0063 − 0.5655i |
| | −0.3293 − 0.2385i | 0.3392 + 0.6740i | −0.4753 + 0.1984i |
| Binary 396 = | 0 | 0 | 0.3653 − 0.9309i |
| | 0.9215 + 0.3884i | 0 | 0 |
| | 0 | −0.5837 + 0.8119i | 0 |
| Binary 397 = | 0.3653 − 0.9309i | 0 | 0 |
| | 0 | 0.9556 − 0.2948i | 0 |
| | 0 | 0 | 0.0747 + 0.9972i |
| Binary 398 = | 0.5216 + 0.4386i | −0.1753 + 0.5206i | −0.1755 + 0.4505i |
| | 0.0958 − 0.1214i | −0.5215 − 0.5236i | 0.3587 + 0.5489i |
| | 0.3290 − 0.6351i | −0.3885 + 0.0356i | −0.5541 − 0.1707i |
| Binary 399 = | 0 | −0.3185 − 0.9479i | 0 |
| | 0 | 0 | 0.5425 − 0.8400i |
| | 0.0747 + 0.9972i | 0 | 0 |
| Binary 400 = | −0.2217 − 0.4297i | −0.6807 − 0.0347i | 0.5466 − 0.0543i |
| | −0.6489 − 0.0942i | −0.0031 + 0.1546i | −0.2628 + 0.6907i |
| | 0.4947 − 0.3025i | 0.1212 + 0.7049i | 0.1923 + 0.3394i |
| Binary 401 = | −0.9010 − 0.4339i | 0 | 0 |
| | 0 | 0.6235 + 0.7818i | 0 |
| | 0 | 0 | −0.2225 + 0.9749i |
| Binary 402 = | 0 | −0.9010 + 0.4339i | 0 |
| | 0 | 0 | 0.6235 − 0.7818i |
| | 0.4562 − 0.8899i | 0 | 0 |
| Binary 403 = | 0 | −0.8533 + 0.5214i | 0 |
| | 0 | 0 | −0.1243 + 0.9922i |
| | 0.8262 + 0.5633i | 0 | 0 |
| Binary 404 = | 0.3536 − 0.3298i | 0.4244 + 0.5333i | −0.5432 + 0.0814i |
| | −0.0850 − 0.6502i | 0.1180 − 0.1000i | 0.2280 − 0.7029i |
| | 0.4252 + 0.3943i | 0.4483 − 0.5573i | −0.2089 − 0.3294i |
| Binary 405 = | −0.6433 + 0.4129i | −0.0061 − 0.0272i | 0.4970 − 0.4096i |
| | 0.4820 − 0.1339i | −0.0075 − 0.6556i | 0.5241 − 0.2124i |
| | −0.2443 − 0.3250i | 0.6975 − 0.2879i | −0.3584 − 0.3700i |
| Binary 406 = | 0 | −0.0249 − 0.9997i | 0 |
| | 0 | 0 | −0.7971 − 0.6038i |
| | −0.9010 + 0.4339i | 0 | 0 |
| Binary 407 = | 0.0589 − 0.4799i | 0.6679 + 0.1357i | −0.3638 + 0.4116i |
| | −0.4831 − 0.4434i | 0.0261 − 0.1524i | −0.2771 − 0.6850i |
| | 0.5791 + 0.0287i | −0.0148 − 0.7151i | −0.3718 − 0.1181i |
| Binary 408 = | −0.4760 + 0.4339i | −0.7642 − 0.0212i | 0.0020 + 0.0278i |
| | −0.5129 + 0.2383i | 0.4737 + 0.1609i | −0.0903 − 0.6494i |
| | 0.3764 + 0.3517i | −0.0188 − 0.4062i | −0.7326 + 0.1807i |
| Binary 409 = | −0.4030 + 0.3733i | 0.0133 + 0.4833i | −0.3973 − 0.5538i |
| | −0.2076 − 0.7092i | 0.5438 + 0.3665i | −0.1228 + 0.0940i |
| | −0.3582 − 0.1545i | −0.5770 + 0.0579i | −0.4755 + 0.5343i |
| Binary 410 = | 0.7588 − 0.0929i | 0.0175 − 0.0217i | 0.2887 + 0.5757i |
| | −0.4924 − 0.0885i | 0.5079 − 0.4146i | 0.0905 + 0.5583i |
| | 0.0791 + 0.3988i | 0.6600 + 0.3658i | 0.4404 − 0.2671i |
| Binary 411 = | −0.5778 − 0.2846i | −0.7239 − 0.2455i | 0.0279 + 0.0001i |
| | −0.4092 − 0.3904i | 0.4052 + 0.2934i | 0.6408 + 0.1385i |
| | −0.1898 + 0.4788i | 0.1017 − 0.3937i | 0.1255 + 0.7441i |
| Binary 412 = | −0.6435 + 0.0264i | −0.5717 − 0.5075i | −0.0164 + 0.0226i |
| | −0.5461 − 0.1471i | 0.2595 + 0.4278i | −0.4866 + 0.4394i |
| | 0.0623 + 0.5113i | 0.2467 − 0.3232i | −0.6774 − 0.3324i |
| Binary 413 = | −0.4515 + 0.5105i | −0.1745 − 0.5208i | 0.4828 − 0.0254i |
| | 0.1189 + 0.0988i | 0.7318 + 0.1025i | 0.3528 − 0.5527i |
| | 0.6267 + 0.3447i | 0.2881 − 0.2630i | 0.0723 + 0.5753i |
| Binary 414 = | −0.6033 − 0.2256i | 0.7458 − 0.1680i | −0.0036 + 0.0276i |
| | −0.4460 − 0.3477i | −0.4988 − 0.0390i | −0.2172 + 0.6186i |
| | −0.1412 + 0.4954i | 0.1185 + 0.3890i | −0.7539 + 0.0320i |
| Binary 415 = | 0 | 0 | 0.9556 − 0.2948i |
| | −0.5837 + 0.8119i | 0 | 0 |
| | 0 | 0.8782 − 0.4783i | 0 |
| Binary 416 = | 0 | 0 | 0.9950 − 0.0996i |
| | −0.9888 − 0.1490i | 0 | 0 |
| | 0 | −0.7331 + 0.6802i | 0 |
| Binary 417 = | 0.4244 + 0.5333i | −0.5432 + 0.0814i | 0.0589 − 0.4799i |
| | 0.1180 − 0.1000i | 0.2280 − 0.7029i | −0.4831 − 0.4434i |
| | 0.4483 − 0.5573i | −0.2089 − 0.3294i | 0.5791 + 0.0287i |
| Binary 418 = | 0.0273 + 0.0056i | −0.4219 − 0.4867i | 0.6220 − 0.4445i |
| | 0.6007 + 0.2628i | −0.2254 − 0.5187i | −0.4748 + 0.1578i |
| | −0.0244 + 0.7542i | −0.3609 + 0.3675i | 0.2602 + 0.3124i |

TABLE 2-continued

Bit allocation of Coset Extension of $G_{63,37}$

| | | | |
|---|---|---|---|
| Binary 419 = | 0 | 0 | 0.9802 − 0.1981i |
| | 0.9215 − 0.3884i | 0 | 0 |
| | 0 | −0.5837 − 0.8119i | 0 |
| Binary 420 = | −0.2274 + 0.7298i | −0.0222 − 0.0169i | 0.1175 − 0.6333i |
| | 0.2832 − 0.4124i | −0.4272 − 0.4974i | 0.2649 − 0.4996i |
| | −0.3961 − 0.0919i | 0.3492 − 0.6689i | −0.5124 − 0.0531i |
| Binary 421 = | 0.4779 − 0.0733i | −0.3401 − 0.5906i | 0.3428 − 0.4292i |
| | 0.2960 − 0.5851i | −0.1316 + 0.0813i | 0.3109 + 0.6704i |
| | 0.1292 + 0.5653i | −0.5264 + 0.4843i | 0.3772 + 0.0994i |
| Binary 422 = | 0.5226 − 0.4375i | 0.4822 + 0.2631i | 0.4132 + 0.2510i |
| | −0.1029 − 0.1154i | −0.6062 + 0.4226i | 0.6029 − 0.2580i |
| | −0.5683 − 0.4343i | −0.0324 + 0.3888i | −0.2644 + 0.5161i |
| Binary 423 = | 0 | −0.5000 − 0.8660i | 0 |
| | 0 | 0 | −0.5000 − 0.8660i |
| | 0.1736 − 0.9848i | 0 | 0 |
| Binary 424 = | −0.4024 − 0.3739i | 0.4548 + 0.1642i | −0.5428 − 0.4121i |
| | 0.6917 − 0.2600i | 0.5398 − 0.3723i | −0.0897 + 0.1260i |
| | 0.1273 − 0.3687i | −0.1569 + 0.5582i | −0.2969 + 0.6507i |
| Binary 425 = | −0.0205 + 0.0189i | −0.6033 − 0.2256i | 0.7458 − 0.1680i |
| | −0.5640 + 0.3343i | −0.4460 − 0.3477i | −0.4988 − 0.0390i |
| | −0.5981 − 0.4601i | −0.1412 + 0.4954i | 0.1185 + 0.3890i |
| Binary 426 = | 0.4970 − 0.4096i | −0.2274 + 0.7298i | −0.0222 − 0.0169i |
| | 0.5241 − 0.2124i | 0.2832 − 0.4124i | −0.4272 − 0.4974i |
| | −0.3584 − 0.3700i | −0.3961 − 0.0919i | 0.3492 − 0.6689i |
| Binary 427 = | 0.2635 − 0.7176i | −0.0223 + 0.0167i | 0.3971 + 0.5071i |
| | −0.3034 + 0.3978i | −0.5945 + 0.2765i | 0.1993 + 0.5293i |
| | 0.3910 + 0.1115i | −0.5493 − 0.5173i | 0.3788 − 0.3490i |
| Binary 428 = | 0.6515 − 0.2002i | −0.4951 + 0.2379i | 0.4830 + 0.0228i |
| | −0.0499 − 0.1463i | 0.0107 − 0.7389i | 0.4061 − 0.5149i |
| | −0.3550 − 0.6209i | −0.2968 − 0.2532i | 0.0146 + 0.5797i |
| Binary 429 = | −0.0034 − 0.0277i | −0.6377 + 0.0903i | 0.7524 + 0.1349i |
| | 0.0578 − 0.6531i | −0.5580 − 0.0920i | −0.4444 − 0.2297i |
| | 0.7227 − 0.2170i | 0.1129 + 0.5026i | −0.0419 + 0.4044i |
| Binary 430 = | 0.0267 − 0.0081i | −0.1997 − 0.6123i | −0.0022 + 0.7644i |
| | 0.6532 − 0.0565i | −0.0063 − 0.5655i | 0.1490 − 0.4776i |
| | 0.3392 + 0.6740i | −0.4753 + 0.1984i | −0.4056 + 0.0289i |
| Binary 431 = | −0.5428 − 0.4121i | −0.5486 − 0.0278i | 0.4539 − 0.1666i |
| | −0.0897 + 0.1260i | 0.3628 − 0.6438i | 0.1742 − 0.6322i |
| | −0.2969 + 0.6507i | −0.1395 − 0.3643i | 0.2386 + 0.5285i |
| Binary 432 = | −0.1865 − 0.7413i | 0.0195 − 0.0199i | 0.0538 − 0.6418i |
| | −0.0266 + 0.4996i | 0.5466 − 0.3620i | 0.2139 − 0.5235i |
| | 0.3859 − 0.1281i | 0.6203 + 0.4297i | −0.5151 − 0.0018i |
| Binary 433 = | −0.9691 − 0.2468i | 0 | 0 |
| | 0 | 0.9802 − 0.1981i | 0 |
| | 0 | 0 | 0.4562 − 0.8899i |
| Binary 434 = | 0.1736 − 0.9848i | 0 | 0 |
| | 0 | 0.1736 − 0.9848i | 0 |
| | 0 | 0 | 0.1736 − 0.9848i |
| Binary 435 = | −0.4598 − 0.6107i | −0.0275 − 0.0043i | 0.3542 − 0.5379i |
| | 0.1696 + 0.4707i | −0.6130 − 0.2325i | 0.4382 − 0.3575i |
| | 0.3058 − 0.2679i | −0.0132 − 0.7544i | −0.4515 − 0.2479i |
| Binary 436 = | −0.4002 − 0.2713i | −0.6137 − 0.2964i | −0.2750 + 0.4755i |
| | −0.6150 + 0.2276i | −0.0629 + 0.1412i | −0.4074 − 0.6165i |
| | 0.2898 − 0.5023i | −0.1621 + 0.6966i | −0.3878 − 0.0420i |
| Binary 437 = | 0.6793 + 0.3507i | −0.0205 + 0.0189i | −0.6033 − 0.2256i |
| | −0.3570 − 0.3505i | −0.5640 + 0.3343i | −0.4460 − 0.3477i |
| | −0.1593 + 0.3741i | −0.5981 − 0.4601i | −0.1412 + 0.4954i |
| Binary 438 = | −0.3638 + 0.4116i | −0.2634 − 0.4055i | 0.5989 − 0.3253i |
| | −0.2771 − 0.6850i | −0.6551 − 0.0292i | −0.0780 − 0.1335i |
| | −0.3718 − 0.1181i | 0.4621 − 0.3503i | −0.4710 − 0.5383i |
| Binary 439 = | 0.9950 − 0.0996i | 0 | 0 |
| | 0 | −0.8533 + 0.5214i | 0 |
| | 0 | 0 | −0.1243 + 0.9922i |
| Binary 440 = | 0 | −0.7331 − 0.6802i | 0 |
| | 0 | 0 | 0.8262 − 0.5633i |
| | −0.8533 − 0.5214i | 0 | 0 |
| Binary 441 = | −0.0222 − 0.0169i | 0.1175 − 0.6333i | 0.2949 + 0.7053i |
| | −0.4272 − 0.4974i | 0.2649 − 0.4996i | −0.0482 − 0.4980i |
| | 0.3492 − 0.6689i | −0.5124 − 0.0531i | −0.3625 + 0.1842i |
| Binary 442 = | −0.9888 + 0.1490i | 0 | 0 |
| | 0 | −0.7331 − 0.6802i | 0 |
| | 0 | 0 | 0.8262 − 0.5633i |
| Binary 443 = | −0.3185 − 0.9479i | 0 | 0 |
| | 0 | 0.5425 − 0.8400i | 0 |
| | 0 | 0 | 0.6982 + 0.7159i |

TABLE 2-continued

Bit allocation of Coset Extension of $G_{63,37}$

| | | | |
|---|---|---|---|
| Binary 444 = | −0.4624 − 0.1413i | 0.2497 − 0.6342i | 0.3421 + 0.4297i |
| | −0.5206 + 0.3987i | −0.1456 − 0.0522i | −0.7228 + 0.1540i |
| | 0.1289 − 0.5654i | −0.7068 − 0.1096i | −0.1808 + 0.3457i |
| Binary 445 = | 0.5684 − 0.3030i | −0.7532 + 0.1306i | 0.0256 + 0.0109i |
| | 0.5558 − 0.1044i | 0.4962 + 0.0638i | 0.5367 + 0.3766i |
| | −0.2780 − 0.4337i | −0.0989 − 0.3944i | −0.1734 + 0.7344i |
| Binary 446 = | 0.5465 + 0.0551i | −0.0374 − 0.4821i | 0.4255 − 0.5324i |
| | −0.3944 + 0.6249i | −0.5614 − 0.3389i | −0.1237 − 0.0928i |
| | 0.1212 + 0.3708i | 0.5734 − 0.0866i | −0.6431 − 0.3131i |
| Binary 447 = | 0.1689 + 0.6215i | 0.7353 + 0.2091i | 0.0074 + 0.0269i |
| | −0.0219 + 0.5651i | −0.4194 − 0.2728i | 0.0402 + 0.6544i |
| | 0.4846 − 0.1745i | −0.0820 + 0.3982i | −0.6823 + 0.3223i |
| Binary 448 = | −0.6807 + 0.0333i | −0.4381 + 0.3313i | 0.2406 − 0.4194i |
| | 0.0123 + 0.1541i | −0.1359 − 0.7264i | −0.2729 − 0.5962i |
| | 0.1908 + 0.6893i | −0.3410 − 0.1894i | 0.5225 + 0.2514i |
| Binary 449 = | 0.0152 − 0.0234i | −0.5466 − 0.3407i | 0.4897 + 0.5870i |
| | 0.4641 − 0.4632i | −0.3683 − 0.4292i | −0.1928 − 0.4617i |
| | 0.6931 + 0.2983i | −0.2366 + 0.4575i | −0.2921 + 0.2829i |
| Binary 450 = | −0.2797 − 0.6215i | −0.5163 + 0.1875i | −0.4002 − 0.2713i |
| | −0.1390 + 0.0678i | 0.0842 − 0.7342i | −0.6150 + 0.2276i |
| | −0.5720 + 0.4295i | −0.2701 − 0.2815i | 0.2898 − 0.5023i |
| Binary 451 = | −0.1118 − 0.7562i | −0.0270 + 0.0068i | −0.6435 + 0.0264i |
| | −0.0762 + 0.4945i | −0.6552 + 0.0239i | −0.5461 − 0.1471i |
| | 0.3967 − 0.0891i | −0.3052 − 0.6901i | 0.0623 + 0.5113i |
| Binary 452 = | 0.4132 + 0.2510i | 0.1191 − 0.6711i | 0.5385 − 0.1084i |
| | 0.6029 − 0.2580i | −0.1530 − 0.0223i | −0.1927 + 0.7134i |
| | −0.2644 + 0.5161i | −0.7145 + 0.0326i | 0.2251 + 0.3186i |
| Binary 453 = | −0.2989 + 0.7036i | 0.0101 + 0.0260i | −0.6430 − 0.0378i |
| | 0.3228 − 0.3822i | 0.1052 + 0.6472i | −0.5287 − 0.2008i |
| | −0.3850 − 0.1309i | −0.6468 + 0.3886i | 0.0111 + 0.5150i |
| Binary 454 = | 0.5385 − 0.1084i | 0.4779 − 0.0733i | −0.3401 − 0.5906i |
| | −0.1927 + 0.7134i | 0.2960 − 0.5851i | −0.1316 + 0.0813i |
| | 0.2251 + 0.3186i | 0.1292 + 0.5653i | −0.5264 + 0.4843i |
| Binary 455 = | 0.5982 + 0.3266i | 0.3832 + 0.3935i | 0.2812 − 0.3933i |
| | 0.0699 − 0.1379i | −0.7038 + 0.2252i | −0.2122 − 0.6205i |
| | 0.1966 − 0.6877i | −0.1455 + 0.3619i | 0.4949 + 0.3022i |
| Binary 456 = | −0.5990 + 0.4749i | 0.0194 + 0.0200i | 0.3446 + 0.5441i |
| | 0.4663 − 0.1812i | 0.3483 + 0.5555i | 0.1456 + 0.5465i |
| | −0.2755 − 0.2990i | −0.4450 + 0.6094i | 0.4117 − 0.3096i |
| Binary 457 = | −0.6256 + 0.1534i | −0.7124 + 0.2772i | 0.0214 − 0.0178i |
| | −0.5644 − 0.0360i | 0.4990 − 0.0357i | 0.5800 − 0.3058i |
| | 0.1624 + 0.4888i | −0.1751 − 0.3670i | 0.5744 + 0.4893i |
| Binary 458 = | 0 | 0 | −0.0249 − 0.9997i |
| | −0.2225 − 0.9749i | 0 | 0 |
| | 0 | −0.9010 + 0.4339i | 0 |
| Binary 459 = | 0.9215 − 0.3884i | 0 | 0 |
| | 0 | −0.5837 − 0.8119i | 0 |
| | 0 | 0 | 0.8782 + 0.4783i |
| Binary 460 = | 0 | 0 | 0.9215 − 0.3884i |
| | 0.0747 − 0.9972i | 0 | 0 |
| | 0 | 0.3653 + 0.9309i | 0 |
| Binary 461 = | −0.4682 − 0.4423i | −0.2989 + 0.7036i | 0.0101 + 0.0260i |
| | −0.2760 − 0.4936i | 0.3228 − 0.3822i | 0.1052 + 0.6472i |
| | −0.3225 + 0.4016i | −0.3850 − 0.1309i | −0.6468 + 0.3886i |
| Binary 462 = | 0.3446 + 0.5441i | −0.1536 + 0.7489i | 0.0277 + 0.0029i |
| | 0.1456 + 0.5465i | 0.2407 − 0.4386i | 0.6239 + 0.2017i |
| | 0.4117 − 0.3096i | −0.4033 − 0.0520i | 0.0508 + 0.7528i |
| Binary 463 = | −0.4951 + 0.2379i | 0.4830 + 0.0228i | 0.3704 − 0.5721i |
| | 0.0107 − 0.7389i | 0.4061 − 0.5149i | −0.1323 − 0.0800i |
| | −0.2968 − 0.2532i | 0.0146 + 0.5797i | −0.6711 − 0.2475i |
| Binary 464 = | −0.4240 + 0.2324i | 0.5216 + 0.4386i | −0.1753 + 0.5206i |
| | −0.0780 + 0.6511i | 0.0958 − 0.1214i | −0.5215 − 0.5236i |
| | −0.3147 − 0.4870i | 0.3290 − 0.6351i | −0.3885 + 0.0356i |
| Binary 465 = | −0.8533 − 0.5214i | 0 | 0 |
| | 0 | −0.1243 − 0.9922i | 0 |
| | 0 | 0 | 0.9950 + 0.0996i |
| Binary 466 = | 0.7643 − 0.0169i | −0.0262 + 0.0094i | 0.5354 − 0.3581i |
| | −0.4812 − 0.1371i | −0.6496 + 0.0890i | 0.5427 − 0.1592i |
| | 0.0390 + 0.4047i | −0.3724 − 0.6563i | −0.3198 − 0.4038i |
| Binary 467 = | 0.2812 − 0.3933i | 0.6682 − 0.1343i | 0.5465 + 0.0551i |
| | −0.2122 − 0.6205i | −0.0351 − 0.1506i | −0.3944 + 0.6249i |
| | 0.4949 + 0.3022i | −0.2914 − 0.6532i | 0.1212 + 0.3708i |
| Binary 468 = | 0.5383 + 0.1093i | −0.2194 + 0.4308i | −0.5812 − 0.3560i |
| | −0.4547 + 0.5825i | 0.3023 + 0.5819i | −0.0767 + 0.1343i |
| | 0.0837 + 0.3810i | −0.5344 − 0.2251i | −0.2307 + 0.6770i |

TABLE 2-continued

Bit allocation of Coset Extension of $G_{63,37}$

| | | | |
|---|---|---|---|
| Binary 469 = | 0 | 0 | −0.4113 − 0.9115i |
| | −0.6617 + 0.7498i | 0 | 0 |
| | 0 | −0.9988 − 0.0498i | 0 |
| Binary 470 = | 0.5457 + 0.5353i | 0.0173 + 0.0219i | −0.0104 − 0.6440i |
| | −0.2378 − 0.4402i | 0.2912 + 0.5874i | 0.1607 − 0.5422i |
| | −0.2625 + 0.3105i | −0.5035 + 0.5620i | −0.5127 + 0.0495i |
| Binary 471 = | −0.6377 + 0.0903i | 0.7524 + 0.1349i | −0.0204 − 0.0190i |
| | −0.5580 − 0.0920i | −0.4444 − 0.2297i | −0.3755 − 0.5374i |
| | 0.1129 + 0.5026i | −0.0419 + 0.4044i | 0.4141 − 0.6308i |
| Binary 472 = | 0 | −0.6617 − 0.7498i | 0 |
| | 0 | 0 | −0.9988 + 0.0498i |
| | −0.4113 + 0.9115i | 0 | 0 |
| Binary 473 = | −0.0008 + 0.0279i | 0.4060 − 0.5000i | 0.5457 + 0.5353i |
| | −0.1545 + 0.6372i | 0.4716 − 0.3121i | −0.2378 − 0.4402i |
| | −0.7469 + 0.1069i | −0.4246 − 0.2916i | −0.2625 + 0.3105i |
| Binary 474 = | 0 | −0.7971 − 0.6038i | 0 |
| | 0 | 0 | −0.4113 + 0.9115i |
| | 0.6235 − 0.7818i | 0 | 0 |
| Binary 475 = | 0.6631 − 0.3803i | −0.0278 − 0.0015i | −0.0218 + 0.6437i |
| | −0.4881 + 0.1097i | −0.6331 − 0.1703i | −0.1875 + 0.5335i |
| | 0.2278 + 0.3368i | −0.0882 − 0.7494i | 0.5145 − 0.0239i |
| Binary 476 = | −0.5168 + 0.3843i | 0.6410 + 0.4166i | 0.0273 − 0.0054i |
| | −0.5341 + 0.1861i | −0.3203 − 0.3843i | 0.6556 + 0.0088i |
| | 0.3395 + 0.3874i | −0.1957 + 0.3564i | 0.2704 + 0.7044i |
| Binary 477 = | 0.1062 + 0.6353i | −0.5184 − 0.5619i | 0.0257 − 0.0107i |
| | −0.0781 + 0.5601i | 0.2156 + 0.4515i | 0.6443 − 0.1213i |
| | 0.4996 − 0.1254i | 0.2776 − 0.2971i | 0.4046 + 0.6369i |
| Binary 478 = | 0.1484 + 0.5289i | 0.1063 − 0.4717i | −0.4991 − 0.4641i |
| | −0.7258 − 0.1389i | −0.4365 − 0.4893i | −0.1018 + 0.1164i |
| | −0.3009 + 0.2483i | 0.5734 + 0.0862i | −0.3602 + 0.6179i |
| Binary 479 = | −0.1226 + 0.5354i | −0.0852 − 0.4759i | −0.0855 + 0.6762i |
| | −0.5710 − 0.4691i | −0.5923 − 0.2813i | 0.1539 + 0.0147i |
| | −0.3830 + 0.0741i | 0.5619 − 0.1433i | 0.7120 − 0.0682i |
| Binary 480 = | −0.9010 + 0.4339i | 0 | 0 |
| | 0 | 0.6235 − 0.7818i | 0 |
| | 0 | 0 | −0.2225 − 0.9749i |
| Binary 481 = | 0.0173 + 0.0219i | −0.0104 − 0.6440i | 0.7621 + 0.0593i |
| | 0.2912 + 0.5874i | 0.1607 − 0.5422i | −0.4651 − 0.1843i |
| | −0.5035 + 0.5620i | −0.5127 + 0.0495i | −0.0015 + 0.4066i |
| Binary 482 = | 0.3704 − 0.5721i | −0.2263 + 0.5005i | 0.3846 − 0.2930i |
| | −0.1323 − 0.0800i | −0.4668 − 0.5729i | −0.0199 − 0.6554i |
| | −0.6711 − 0.2475i | −0.3901 − 0.0032i | 0.3838 + 0.4346i |
| Binary 483 = | −0.5432 + 0.0814i | 0.0589 − 0.4799i | 0.6679 + 0.1357i |
| | 0.2280 − 0.7029i | −0.4831 − 0.4434i | 0.0261 − 0.1524i |
| | −0.2089 − 0.3294i | 0.5791 + 0.0287i | −0.0148 − 0.7151i |
| Binary 484 = | 0.3846 − 0.2930i | −0.0840 − 0.6763i | 0.1484 + 0.5289i |
| | −0.0199 − 0.6554i | −0.1528 + 0.0238i | −0.7258 − 0.1389i |
| | 0.3838 + 0.4346i | −0.6731 + 0.2418i | −0.3009 + 0.2483i |
| Binary 485 = | 0.1063 − 0.4717i | −0.4991 − 0.4641i | 0.4536 + 0.3098i |
| | −0.4365 − 0.4893i | −0.1018 + 0.1164i | −0.6453 + 0.3602i |
| | 0.5734 + 0.0862i | −0.3602 + 0.6179i | −0.0709 + 0.3836i |
| Binary 486 = | 0.6220 − 0.4445i | 0.0245 − 0.0132i | −0.6360 − 0.1016i |
| | −0.4748 + 0.1578i | 0.6291 − 0.1848i | −0.5061 − 0.2524i |
| | 0.2602 + 0.3124i | 0.4661 + 0.5934i | −0.0403 + 0.5135i |
| Binary 487 = | 0.4060 − 0.5000i | 0.5457 + 0.5353i | 0.0173 + 0.0219i |
| | 0.4716 − 0.3121i | −0.2378 − 0.4402i | 0.2912 + 0.5874i |
| | −0.4246 − 0.2916i | −0.2625 + 0.3105i | −0.5035 + 0.5620i |
| Binary 488 = | −0.3988 + 0.2734i | −0.6738 − 0.1023i | −0.4947 − 0.2387i |
| | −0.0128 + 0.6556i | −0.0185 + 0.1535i | 0.5844 − 0.4523i |
| | −0.3617 − 0.4532i | 0.0504 + 0.7135i | 0.0129 − 0.3899i |
| Binary 489 = | 0.6679 + 0.1357i | −0.3638 + 0.4116i | −0.2634 − 0.4055i |
| | 0.0261 − 0.1524i | −0.2771 − 0.6850i | −0.6551 − 0.0292i |
| | −0.0148 − 0.7151i | −0.3718 − 0.1181i | 0.4621 − 0.3503i |
| Binary 490 = | 0.0101 + 0.0260i | −0.6430 − 0.0378i | 0.2232 + 0.7311i |
| | 0.1052 + 0.6472i | −0.5287 − 0.2008i | 0.0016 − 0.5003i |
| | −0.6468 + 0.3886i | 0.0111 + 0.5150i | −0.3790 + 0.1472i |
| Binary 491 = | 0.7660 − 0.6428i | 0 | 0 |
| | 0 | 0.7660 − 0.6428i | 0 |
| | 0 | 0 | 0.7660 − 0.6428i |
| Binary 492 = | −0.0114 − 0.0254i | −0.1378 − 0.6292i | 0.4005 − 0.6512i |
| | −0.1373 − 0.6411i | 0.0501 − 0.5633i | −0.3762 + 0.3298i |
| | 0.6266 − 0.4204i | −0.4927 + 0.1501i | 0.3612 + 0.1868i |
| Binary 493 = | −0.5001 + 0.4630i | −0.1226 + 0.5354i | −0.0852 − 0.4759i |
| | 0.1085 + 0.1102i | −0.5710 − 0.4691i | −0.5923 − 0.2813i |
| | 0.5893 + 0.4054i | −0.3830 + 0.0741i | 0.5619 − 0.1433i |

TABLE 2-continued

Bit allocation of Coset Extension of $G_{63,37}$

| | | | |
|---|---|---|---|
| Binary 494 = | −0.1745 − 0.5208i | 0.4828 − 0.0254i | −0.0177 + 0.6813i |
| | 0.7318 + 0.1025i | 0.3528 − 0.5527i | 0.1546 − 0.0007i |
| | 0.2881 − 0.2630i | 0.0723 + 0.5753i | 0.7017 − 0.1388i |
| Binary 495 = | 0.6235 − 0.7818i | 0 | 0 |
| | 0 | −0.2225 − 0.9749i | 0 |
| | 0 | 0 | −0.9010 + 0.4339i |
| Binary 496 = | −0.0141 + 0.5491i | −0.4624 − 0.1413i | 0.2497 − 0.6342i |
| | −0.6526 − 0.3466i | −0.5206 + 0.3987i | −0.1456 − 0.0522i |
| | −0.3607 + 0.1486i | 0.1289 − 0.5654i | −0.7068 − 0.1096i |
| Binary 497 = | −0.4835 + 0.0013i | 0.6511 + 0.2016i | 0.5250 − 0.1615i |
| | −0.3799 + 0.5345i | 0.0412 − 0.1490i | −0.1207 + 0.7291i |
| | −0.0435 − 0.5782i | 0.0565 − 0.7130i | 0.2557 + 0.2946i |
| Binary 498 = | −0.1778 − 0.4496i | 0.5627 + 0.3845i | −0.1218 − 0.5356i |
| | −0.6363 − 0.1584i | 0.0833 − 0.1303i | 0.7180 + 0.1749i |
| | 0.5224 − 0.2517i | 0.2641 − 0.6647i | 0.3129 − 0.2330i |
| Binary 499 = | 0 | 0.9215 − 0.3884i | 0 |
| | 0 | 0 | −0.5837 − 0.8119i |
| | 0.3653 + 0.9309i | 0 | 0 |
| Binary 500 = | 0 | 0 | 0.8262 − 0.5633i |
| | −0.8533 − 0.5214i | 0 | 0 |
| | 0 | −0.1243 − 0.9922i | 0 |
| Binary 501 = | 0.0077 − 0.0268i | 0.2989 − 0.5705i | 0.7253 − 0.2414i |
| | 0.3069 − 0.5794i | 0.4004 − 0.3993i | −0.5002 + 0.0108i |
| | 0.7502 + 0.0807i | −0.4739 − 0.2017i | 0.1566 + 0.3752i |
| Binary 502 = | 0 | 0.4562 − 0.8899i | 0 |
| | 0 | 0 | −0.9691 − 0.2468i |
| | 0.8782 + 0.4783i | 0 | 0 |
| Binary 503 = | −0.2743 − 0.4759i | 0.1977 − 0.4412i | 0.1853 − 0.6559i |
| | 0.7376 − 0.0445i | −0.3309 − 0.5661i | −0.1500 − 0.0374i |
| | 0.2303 − 0.3148i | 0.5449 + 0.1982i | −0.7142 − 0.0387i |
| Binary 504 = | −0.2105 + 0.6087i | −0.6959 − 0.3164i | −0.0237 − 0.0146i |
| | −0.3365 + 0.4546i | 0.3740 + 0.3323i | −0.4746 − 0.4524i |
| | 0.4987 + 0.1288i | 0.1404 − 0.3816i | 0.2809 − 0.7003i |
| Binary 505 = | −0.0177 + 0.6813i | −0.4685 − 0.2868i | 0.3536 − 0.3298i |
| | 0.1546 − 0.0007i | 0.6265 − 0.3919i | −0.0850 − 0.6502i |
| | 0.7017 − 0.1388i | 0.0517 − 0.3867i | 0.4252 + 0.3943i |
| Binary 506 = | −0.3171 − 0.5606i | 0.6793 + 0.3507i | −0.0205 + 0.0189i |
| | −0.1182 − 0.5530i | −0.3570 − 0.3505i | −0.5640 + 0.3343i |
| | −0.4266 + 0.2887i | −0.1593 + 0.3741i | −0.5981 − 0.4601i |
| Binary 507 = | 0.5060 + 0.2138i | −0.4835 + 0.0013i | 0.6511 + 0.2016i |
| | −0.5611 + 0.4809i | −0.3799 + 0.5345i | 0.0412 − 0.1490i |
| | 0.0065 + 0.3900i | −0.0435 − 0.5782i | 0.0565 − 0.7130i |
| Binary 508 = | −0.6072 + 0.2149i | 0.4633 − 0.6080i | 0.0150 − 0.0235i |
| | −0.5652 + 0.0204i | −0.4072 + 0.2907i | 0.2313 + 0.6135i |
| | 0.2102 + 0.4702i | 0.3408 + 0.2218i | −0.5569 + 0.5091i |
| Binary 509 = | −0.5486 − 0.0278i | 0.4539 − 0.1666i | −0.6807 + 0.0333i |
| | 0.3628 − 0.6438i | 0.1742 − 0.6322i | 0.0123 + 0.1541i |
| | −0.1395 − 0.3643i | 0.2386 + 0.5285i | 0.1908 + 0.6893i |
| Binary 510 = | 0 | 0 | −0.9888 − 0.1490i |
| | −0.9988 + 0.0498i | 0 | 0 |
| | 0 | 0.2708 + 0.9626i | 0 |
| Binary 511 = | 0 | 0.7660 − 0.6428i | 0 |
| | 0 | 0 | 0.7660 − 0.6428i |
| | 1.0000 − 0.0000i | 0 | 0 |

What is claimed is:

1. A method of transmitting and receiving data, comprising the steps of:

(a) providing a set of at least $2^m$ nxn matrices that represent an extension of a fixed-point-free group, each said matrix including $n^2$ matrix elements, where m is a positive integer and n is an integer greater than 1;

(b) allocating each binary number between 0 and binary $2^m−1$ to a respective one of said matrices;

(c) mapping the data into said matrices according to said allocating; and (d) for each said matrix into which the data are mapped, transmitting said matrix elements of said each matrix.

2. The method of claim 1, wherein said transmitting includes, for each said matrix into which the data are mapped, successively for each column of said each matrix, transmitting each said matrix element of said each column via a different respective antenna.

3. The method of claim 1, wherein said transmitting includes, for each said matrix into which the data are mapped, transmitting each said matrix element of each column of said each matrix via a different respective antenna and transmitting each said matrix element of each row of said each matrix at a different respective frequency.

4. The method of claim 1, wherein said transmitting includes, for each said matrix into which the data are mapped, successively for each column of said each matrix, transmitting each said matrix element of said each column at a different respective frequency.

5. The method of claim 1, wherein said fixed-point-free group is a quaternion group.

6. The method of claim 5, wherein said extension is a super quaternion set.

7. The method of claim 1, wherein said fixed-point-free group is a $G_{m,r}$ group.

8. The method of claim 1, wherein said extension is a union of said fixed-point-free group and at least one coset determined by an element of an algebra in which said fixed-point-free group resides.

9. The method of claim 1, further comprising the step of:
(e) receiving said matrix elements of said each matrix via a known channel.

10. The method of claim 1, further comprising the step of:
(f) receiving said matrix elements of said each matrix via an unknown channel.

11. A transmitter for transmitting data, comprising:
(a) a coder for mapping the data into a set of $2^m$ nxn matrices obtained by providing a set of at least $2^m$ nxn matrices that represent an extension of a fixed-point-free group and allocating each binary number between 0 and binary $2^m-1$ to a respective one of said at least $2^m$ matrices, each said matrix into which the data are mapped including $n^2$ matrix elements, m being a positive integer, n being an integer greater than 1, said mapping being according to said allocating; and
(b) at least one antenna for transmitting said matrix elements.

12. The transmitter of claim 11, comprising n said antennas, each said antenna for transmitting said matrix elements of a respective row of each said matrix into which the data are mapped.

* * * * *